US012601205B1

(12) United States Patent
Gaietto et al.

(10) Patent No.: US 12,601,205 B1
(45) Date of Patent: Apr. 14, 2026

(54) ANTI-TAMPER CARD HOLDER

(71) Applicant: Pete Gaietto and Associates, Inc., Milford, OH (US)

(72) Inventors: Jordan Gaietto, Milford, OH (US); Jason Holmes, Milford, OH (US); Jonathan Delaney, Milford, OH (US)

(73) Assignee: Pete Gaietto and Associates, Inc., Milford, OH (US)

( * ) Notice: Subject to any disclaimer, the term of this patent is extended or adjusted under 35 U.S.C. 154(b) by 0 days.

(21) Appl. No.: 19/343,228

(22) Filed: Sep. 29, 2025

Related U.S. Application Data

(60) Provisional application No. 63/747,817, filed on Jan. 21, 2025.

(51) Int. Cl.
*E05B 73/00* (2006.01)
*A47F 5/00* (2006.01)
*A47F 7/00* (2006.01)

(52) U.S. Cl.
CPC ........ *E05B 73/0017* (2013.01); *A47F 5/0006* (2013.01); *A47F 7/0042* (2013.01)

(58) Field of Classification Search
CPC .. E05B 73/0017; A47F 5/0006; A47F 7/0042; A47F 1/128; A47F 5/0807; A47F 5/0861; A47F 5/0869
See application file for complete search history.

(56) References Cited

U.S. PATENT DOCUMENTS

| | | | | | |
|---|---|---|---|---|---|
| 1,856,239 | A * | 5/1932 | Buckley | D06F 57/12 | 211/4 |
| 5,823,358 | A * | 10/1998 | Leyden | A47F 5/0861 | 211/124 |
| 5,971,593 | A * | 10/1999 | McGrady | G07F 17/0092 | 700/242 |
| 8,341,987 | B2 * | 1/2013 | Nagelski | A47F 5/0861 | 70/57.1 |
| 9,820,587 | B1 * | 11/2017 | Cheng | A47F 5/0823 | |
| 11,643,850 | B2 * | 5/2023 | Eden | G02B 6/3885 | 385/78 |
| 2008/0209960 | A1 * | 9/2008 | Nagelski | A47F 5/0861 | 70/57.1 |
| 2013/0105419 | A1 * | 5/2013 | Kologe | A47F 5/0861 | 211/7 |

* cited by examiner

*Primary Examiner* — Ko H Chan
(74) *Attorney, Agent, or Firm* — FBT Gibbons, LLP

(57) ABSTRACT

An apparatus includes a hanger configured to slidably support a plurality of products, and a bracket fixedly secured to the hanger. The apparatus also includes a head cartridge movably supported by the bracket such that the head cartridge is movable between active position and inactive positions. The head cartridge includes a gate movable between a product-blocking position in which a throat defined between the gate and a front end of the hanger prevents any of the plurality of products from passing therethrough, and a product-releasing position in which the throat permits one of the plurality of products to pass therethrough. The apparatus also includes a lock movable between an unlocked position in which the lock permits the head cartridge to move between the active and inactive positions, and a locked position in which the lock prevents the head cartridge from moving between the active and inactive positions.

17 Claims, 52 Drawing Sheets

ANTI-TAMPER CARD HOLDER

PRIORITY

This application claims the benefit of U.S. Pat. App. No. 63/747,817, entitled "Anti-Tamper Card Holder," filed Jan. 21, 2025, the disclosure of which is incorporated by reference herein.

BACKGROUND

Stored-value cards (SVC), such as gift cards, are often presented for purchase on display fixtures in retail stores. For example, gift cards may be at least partially contained in corresponding packaging, which may include an opening (e.g., a hanger slot) for receiving at least part of a card holder (e.g., a hanger of the card holder) that is mounted to the fixture. Thus, a plurality of gift cards may hang from one or more card holders on the fixture for presentation to customers. A customer who desires to purchase a gift card may slide the desired gift card off of the corresponding card holder in order to remove the gift card from the fixture; and may then proceed to a point of sale (e.g., a cash register) to purchase the gift card.

Since fixtures that display gift cards for purchase are generally accessible to the public, the gift cards may be subject to tampering by bad actors. For example, bad actors may remove a gift card from the fixture and then modify the card and/or the card's packaging, and/or steal the serial number or code from the card; and subsequently return the tainted card to the card holder or load the tainted card onto another card holder. As another example, bad actors may load fraudulent cards onto the card holder. In some instances, bad actors may remove a large quantity of cards from a single card holder by sliding the cards off of the card holder at the same time.

Thus, it may be desirable to provide a card holder that resists card tampering. The card holders and associated systems and methods of the present disclosure seek to resist card tampering without unduly hindering removal of cards by legitimate customers and without unduly hindering stocking of cards by merchandisers.

While several card holders and associated systems and methods have been made and used, it is believed that no one prior to the inventor(s) has made or used the invention described in the appended claims.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
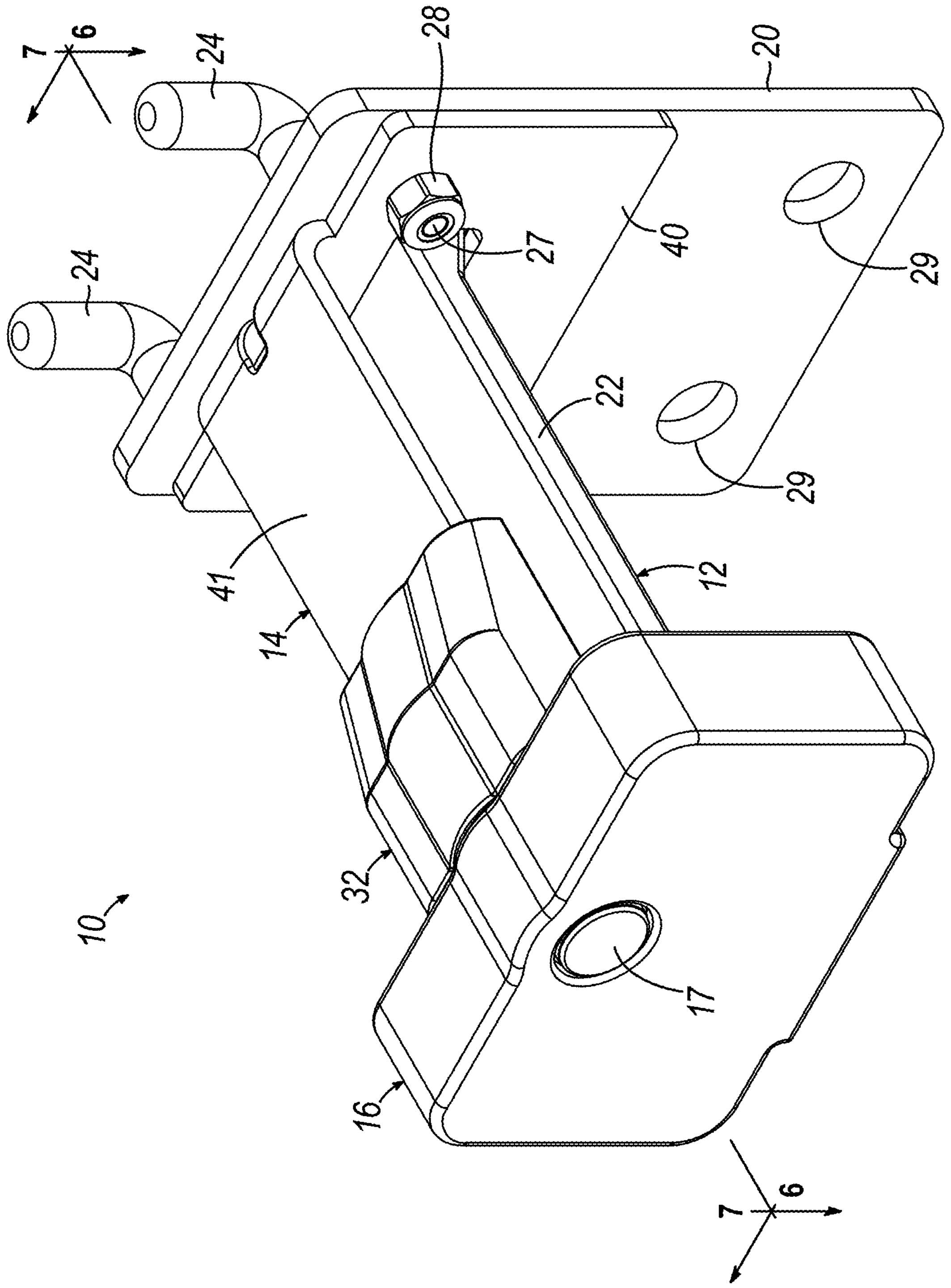
FIG. 1 depicts a front perspective view of an example of a card holder.
Figure 2:
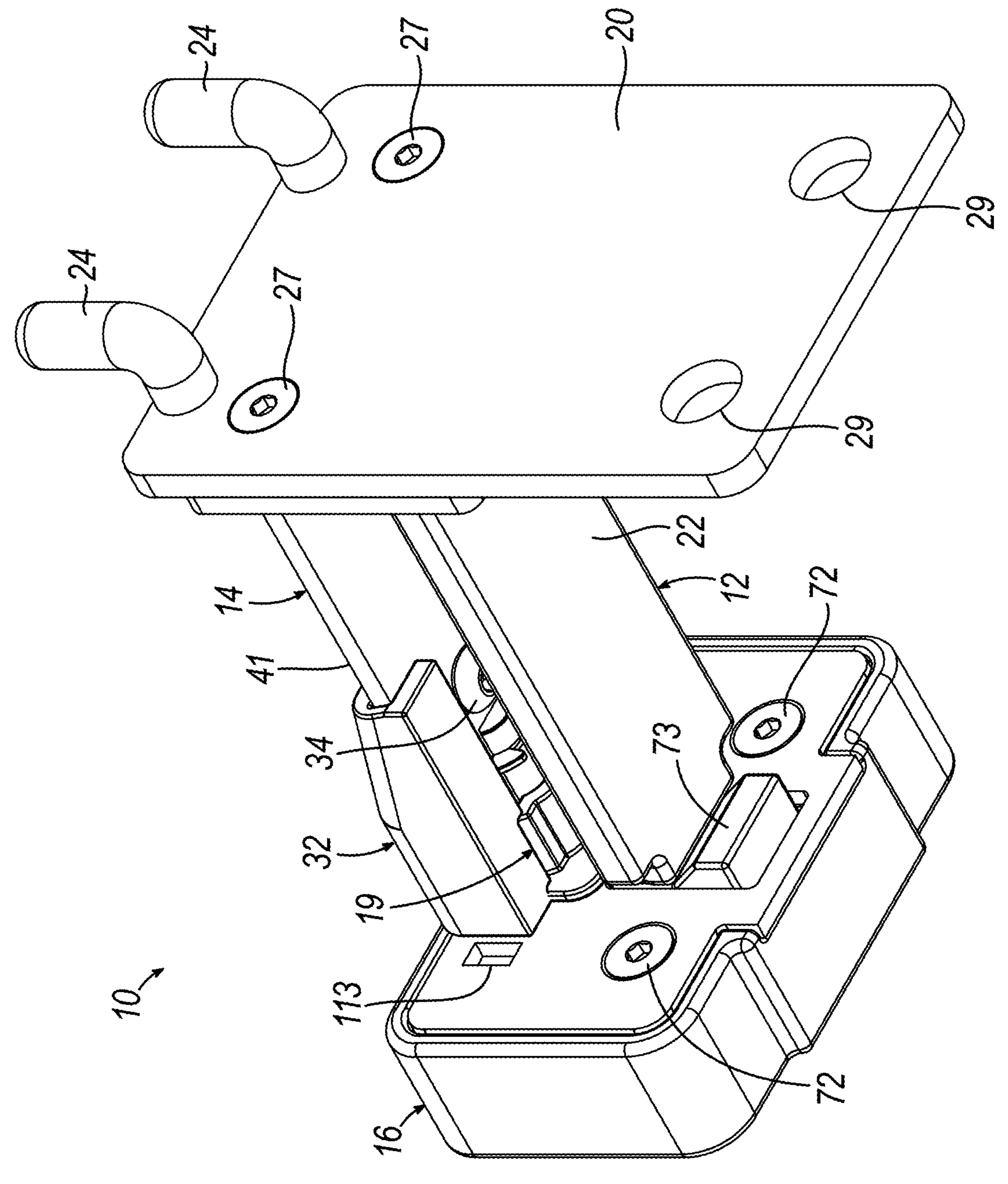
FIG. 2 depicts a rear perspective view of the card holder of FIG. 1.
Figure 3:
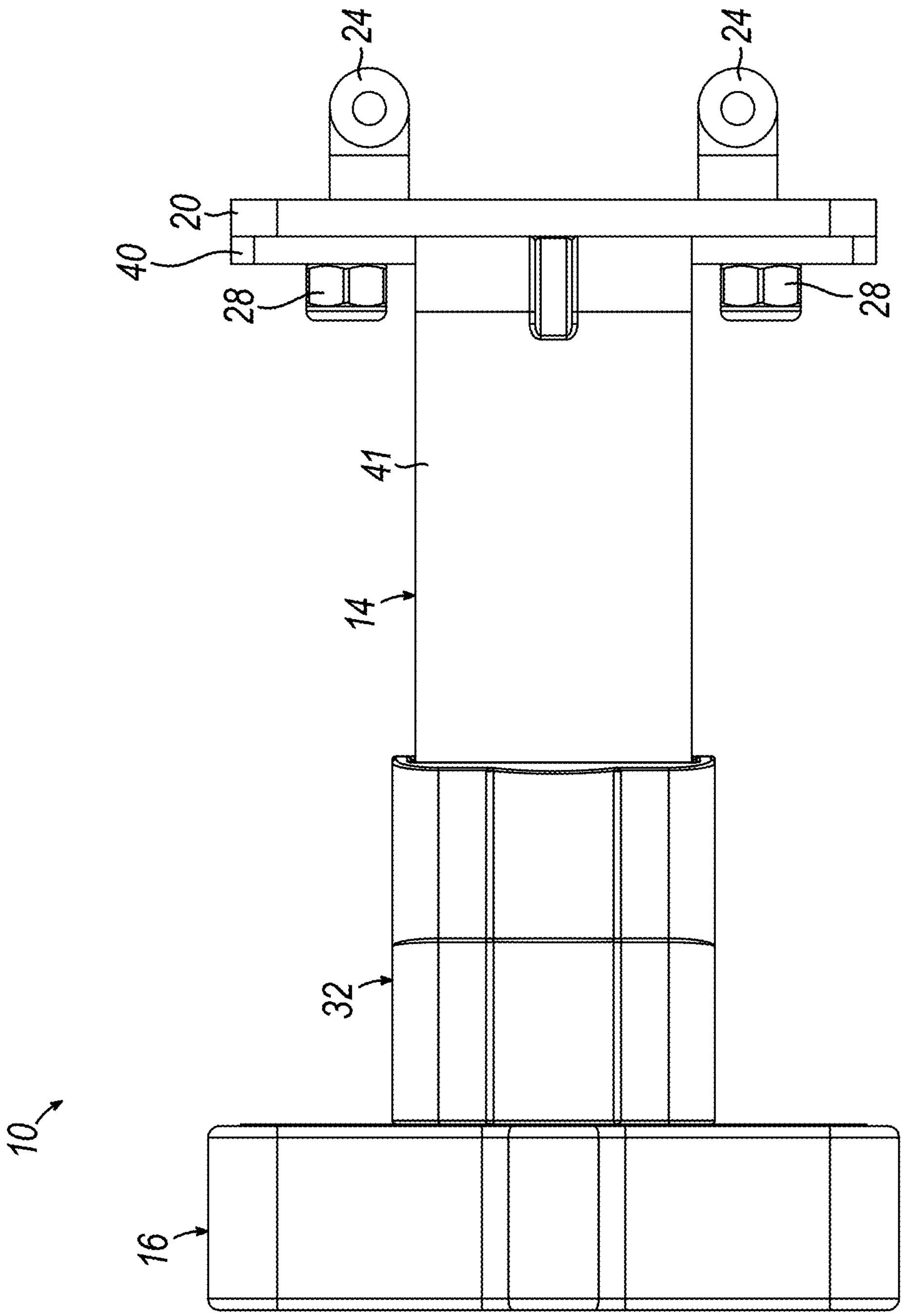
FIG. 3 depicts a top plan view of the card holder of FIG. 1.
Figure 4:
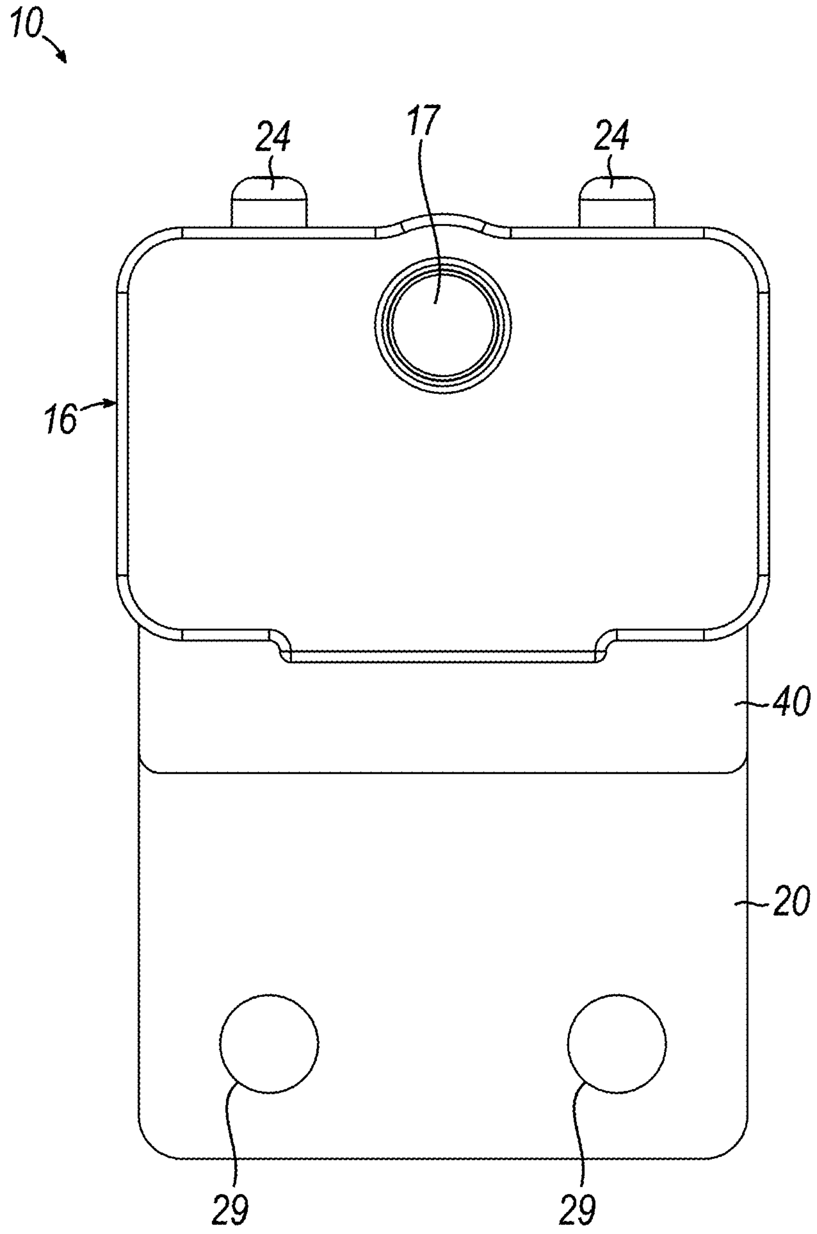
FIG. 4 depicts a front elevation view of the card holder of FIG. 1.
Figure 5:
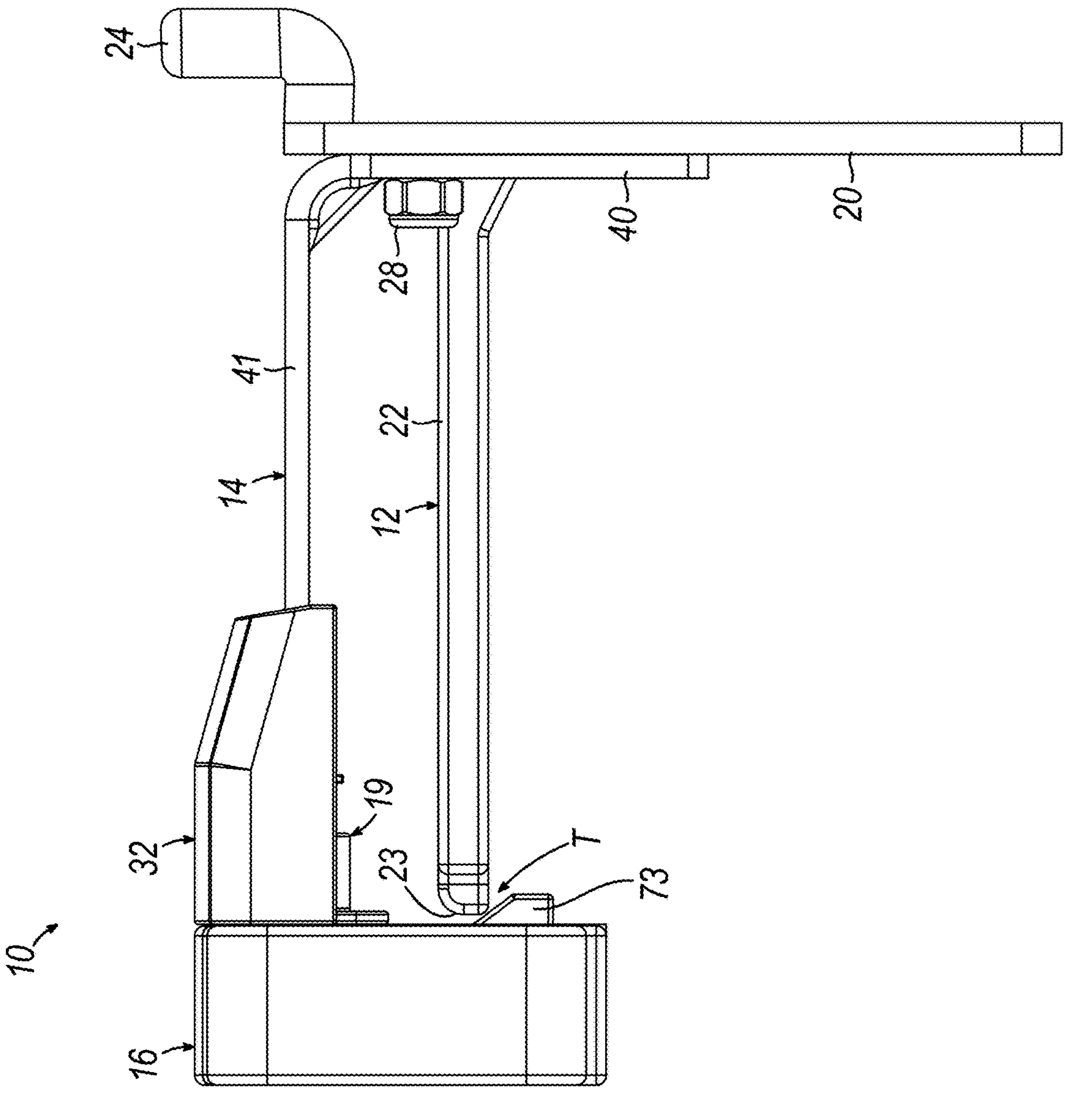
FIG. 5 depicts a side elevation view of the card holder of FIG. 1.
Figure 6A:
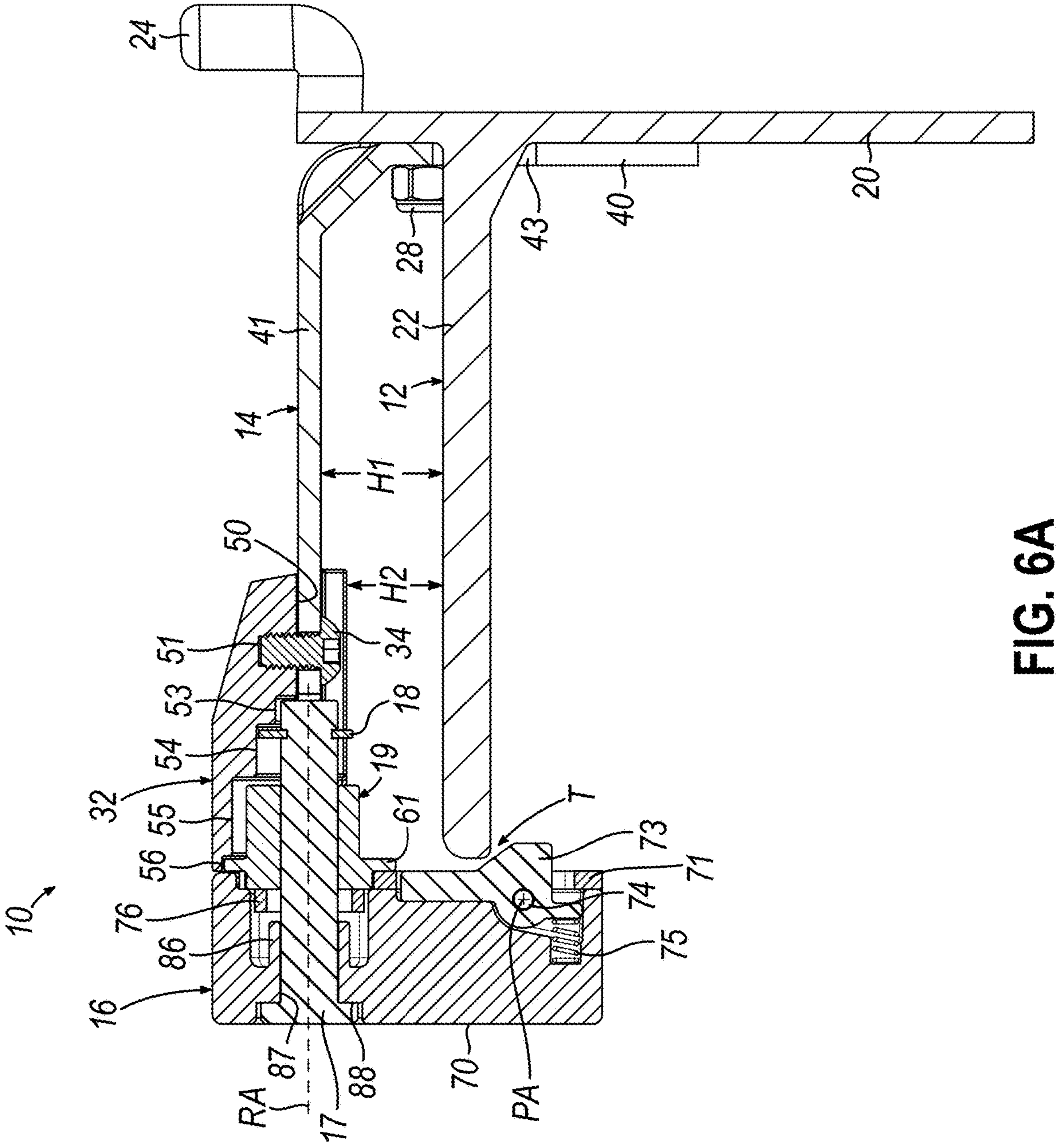
FIG. 6A depicts a cross-sectional side view of the card holder of FIG. 1, taken along line 6-6 in FIG. 1, showing a paddle of the card holder in a product-blocking position.
Figure 6B:
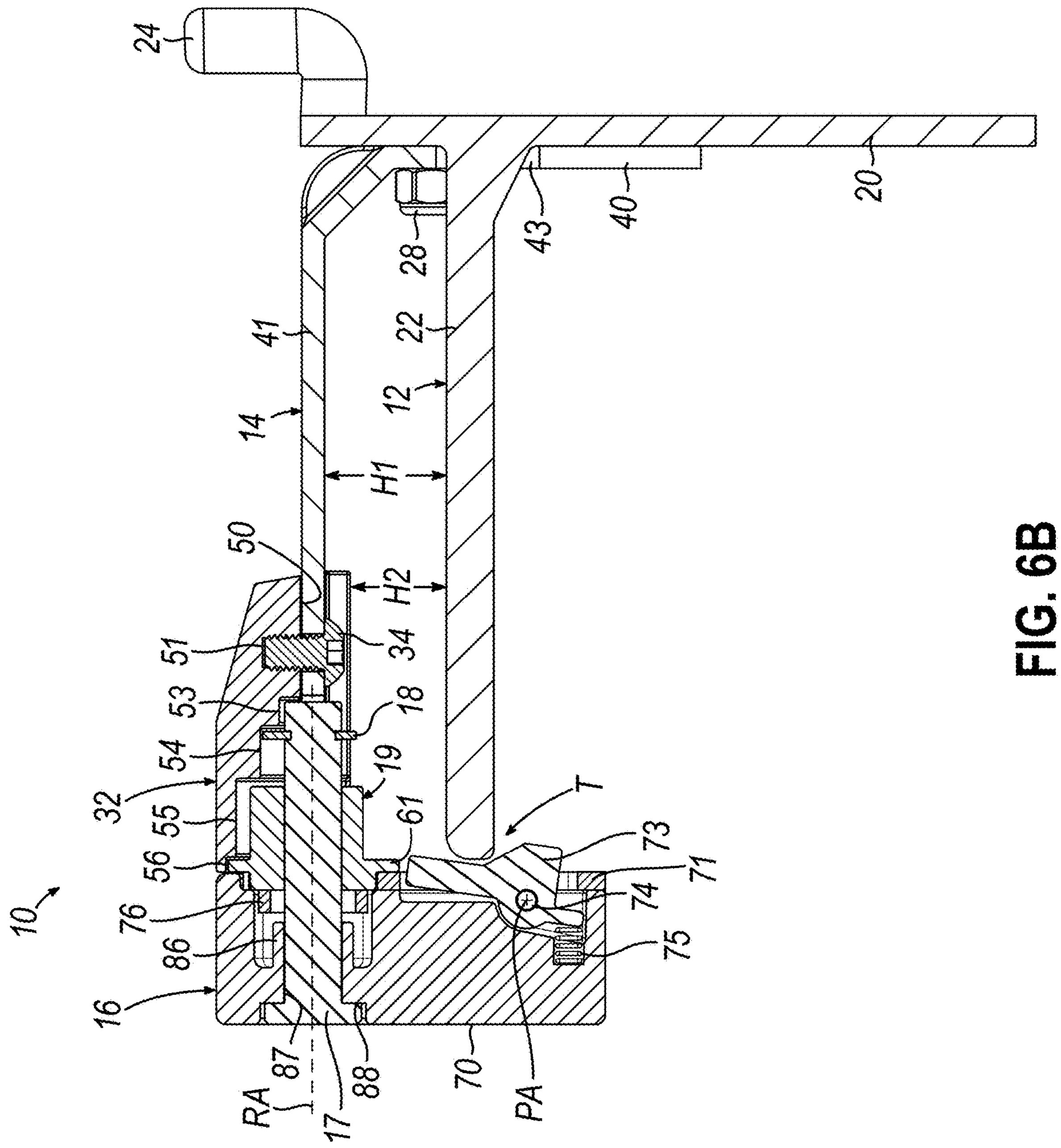
FIG. 6B depicts a cross-sectional side view of the card holder of FIG. 1, taken along line 6-6 in FIG. 1, showing the paddle in a product-releasing position.
Figure 7A:
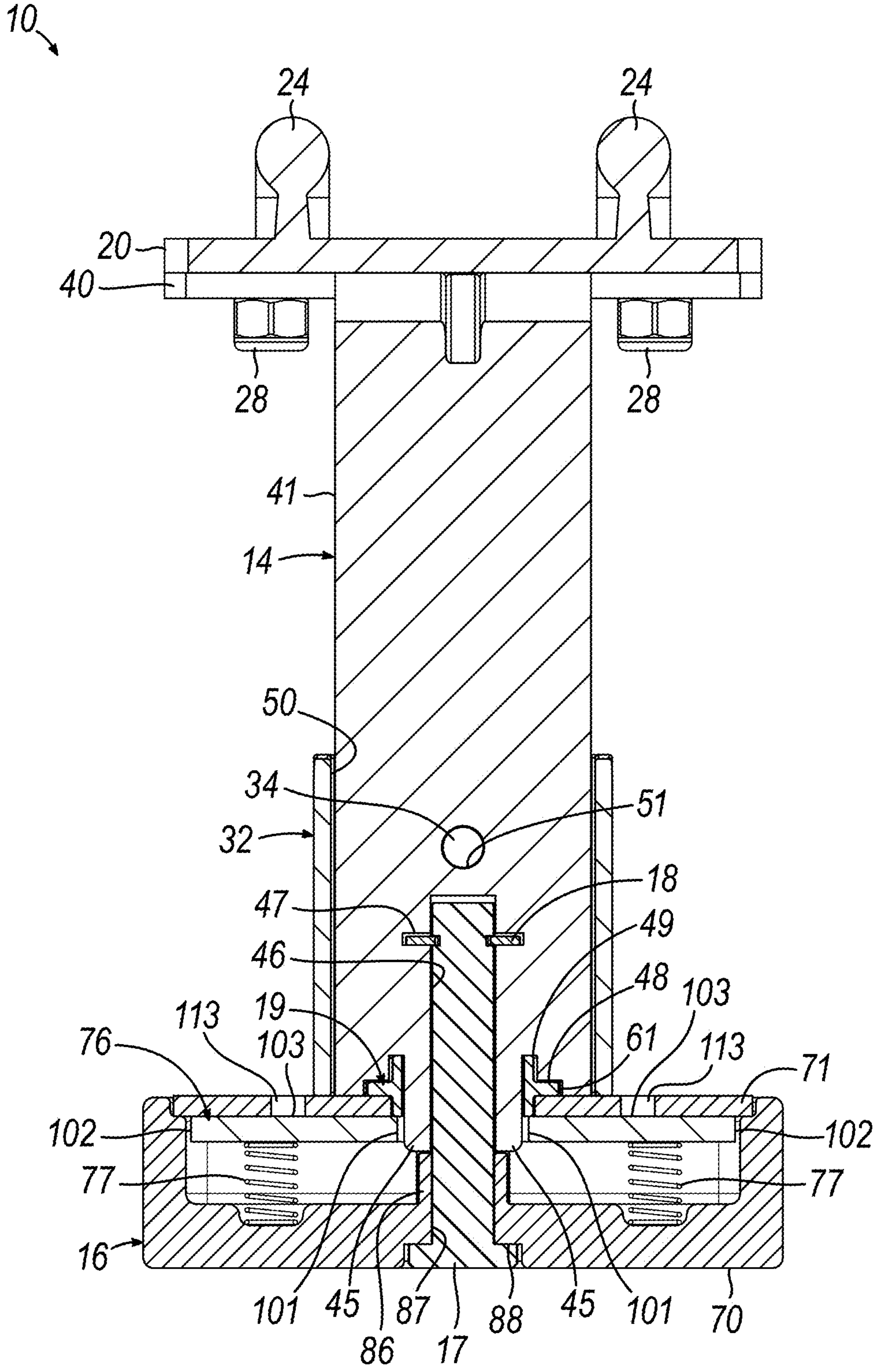
FIG. 7A depicts a cross-sectional top view of the card holder of FIG. 1, taken along line 7-7 in FIG. 1, showing a locking plate of the card holder in a locked position.
Figure 7B:
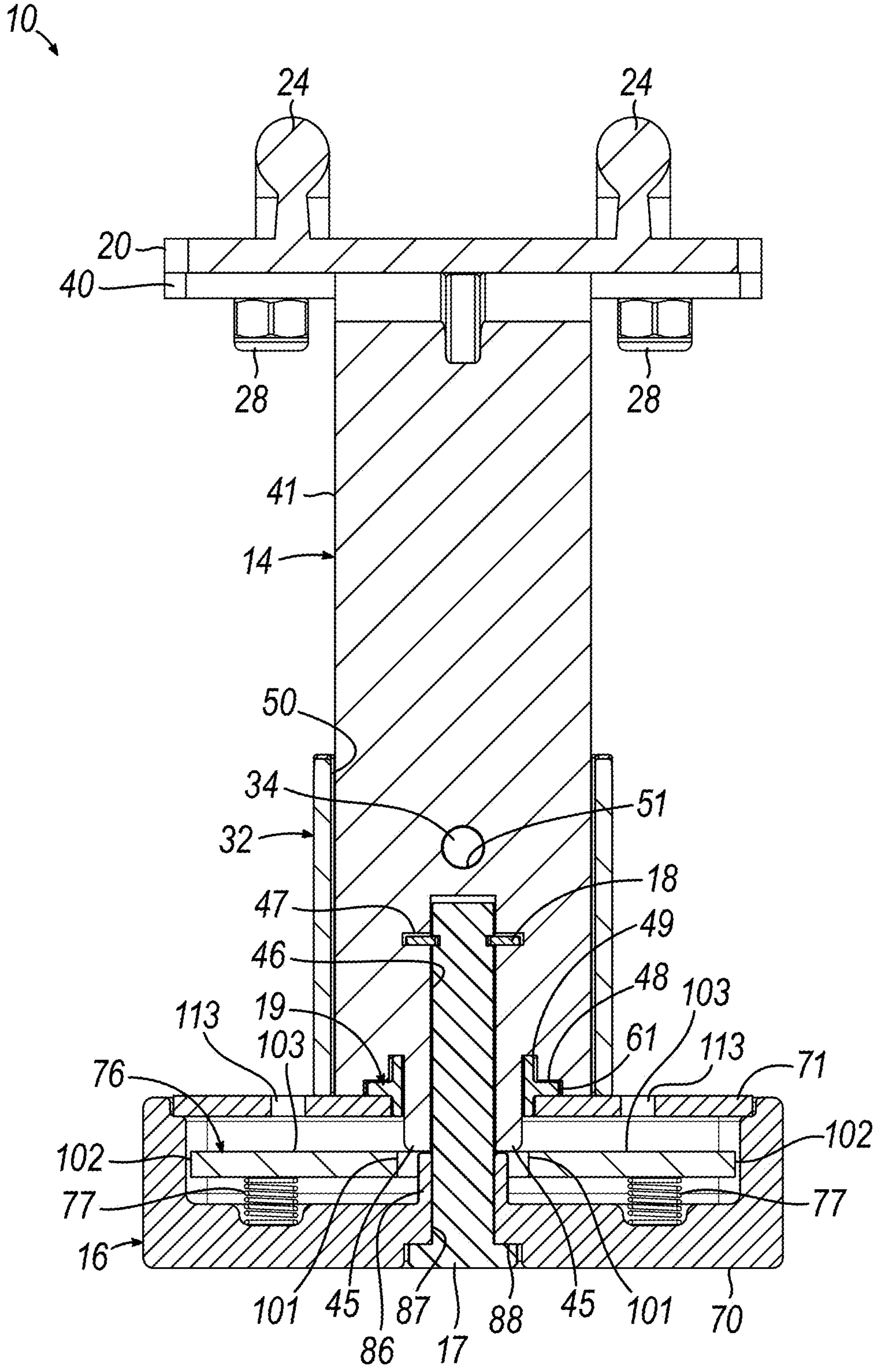
FIG. 7B depicts a cross-sectional top view of the card holder of FIG. 1, taken along line 7-7 in FIG. 1, showing the locking plate in an unlocked position.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

To the extent that spatial terms such as "top," "bottom," "upper," "lower," "vertical," "horizontal," or the like are used herein with reference to the drawings, it will be appreciated that such terms are used for exemplary description purposes only and are not intended to be limiting or absolute.

Furthermore, the terms "about," "approximately," and the like as used herein in connection with any numerical values or ranges of values are intended to encompass the exact value(s) referenced as well as a suitable tolerance that enables the referenced feature or combination of features to function for the intended purpose described herein.

I. EXAMPLES OF ANTI-TAMPER CARD HOLDERS

In some instances, it may be desirable to provide a card holder that resists card tampering while minimizing any interference with removal of cards by legitimate customers and while minimizing any interference with stocking of cards by merchandisers. For example, it may be desirable to provide a card holder that feeds out a limited number of cards at a time, such as a card holder that feeds out a single card at a time, to thereby inhibit removal of large amounts of cards by bad actors while permitting legitimate customers to remove cards one at a time. In addition, or alternatively, it may be desirable to provide a card holder that prevents unauthorized loading of cards (e.g., tainted and/or fraudulent cards) onto the card holder while permitting merchandisers to load legitimate cards onto the card holder. While the following description makes frequent reference to "card holders" and "cards" held thereby, it will be appreciated that the present disclosure encompasses other types of product holders and other types of products held thereby.

A. First Example of Anti-Tamper Card Holder

FIGS. 1-32D depict an example of a card holder (10) and associated components that may provide at least some, if not all, of the features and functionalities described above. As shown in FIGS. 1-8, card holder (10) of the present example includes a hook body (12), a bracket assembly (14), and a head cartridge (16). As described in greater detail below, head cartridge (16) is configured to selectively restrict access to hook body (12). In this regard, head cartridge (16) of the present example is rotatably coupled to bracket assembly (14) via a clevis pin (17) that is equipped with a retaining ring (18) and that is at least partially held within a pin retainer (19), such that head cartridge (16) is rotatable about a rotation axis (RA) (e.g., defined by pin (17)) between an active (e.g., secure) position (see FIGS. 1-7B and 32A-32C) and an inactive (e.g., loading) position (see FIG. 32D). As shown the rotation axis (RA) extends in a generally longitudinal (e.g. forward-rearward) direction. In the example shown, head cartridge (16) is configured to rotate about 180 degrees between the active and inactive positions. When in the active position, head cartridge (16) is disposed in front of hook body (12) such that an adjustable throat (e.g., an adjustable gap) (T) is defined therebetween (see FIGS. 5-6B, 32A, and 32C). As described in greater detail below, the throat (T) may be sized, shaped, or otherwise configured to prevent loading of products (e.g., cards) (P) onto hook body (12), and may be selectively enlarged, re-shaped, or otherwise adjusted to permit removal of a predetermined number of products (P) (e.g., a single product (P)) at a time. When in the inactive position, head cartridge

(16) is vertically offset from (e.g., above) the front of hook body (12) such that sufficient clearance is provided between head cartridge (16) and hook body (12) to allow unencumbered loading of products (P) onto hook body (12). Head cartridge (16) is configured to be selectively locked in the active position to prevent unauthorized rotation of head cartridge (16) from the active position to the inactive position.

Figure 8:
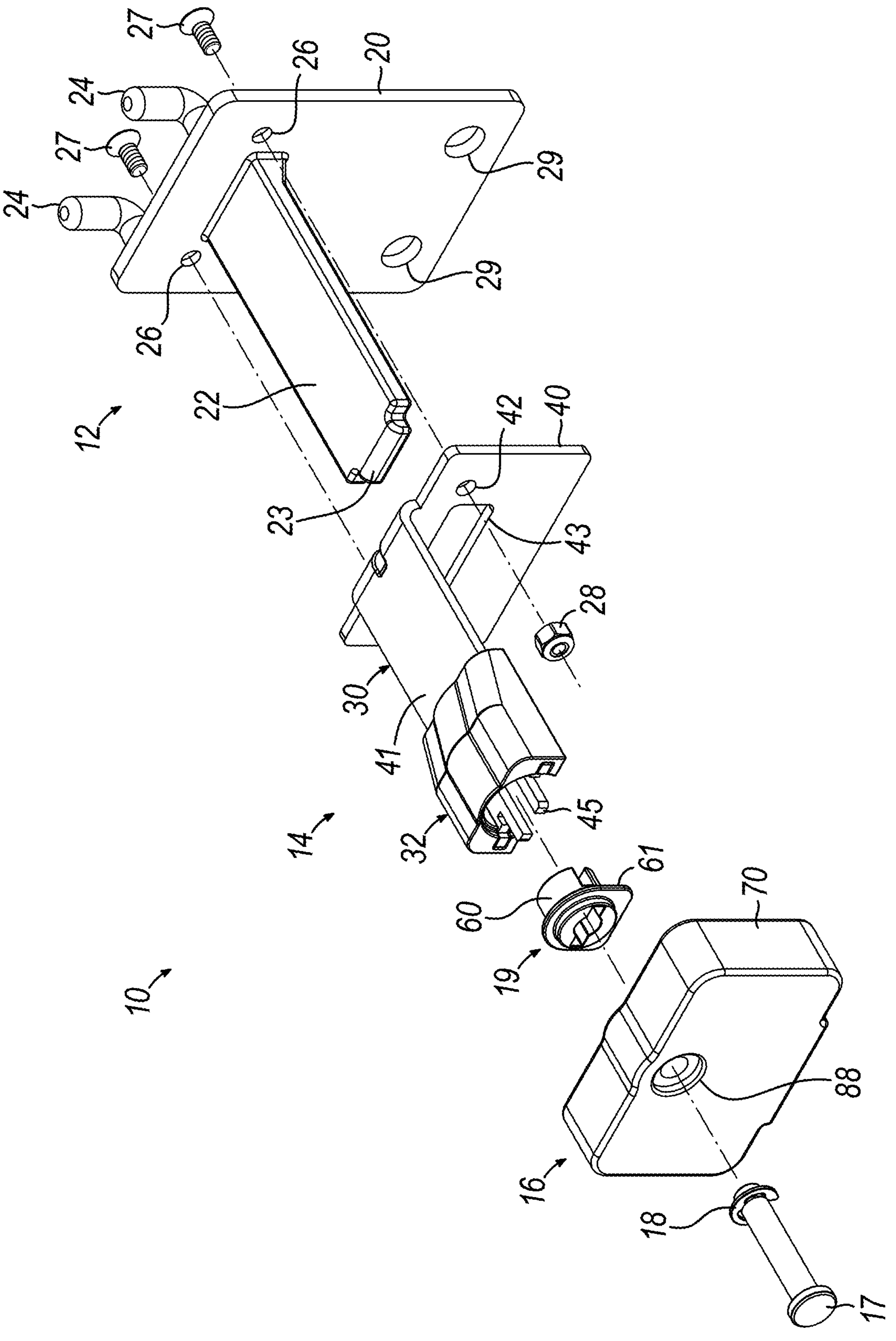
FIG. 8 depicts an exploded perspective view of the card holder of FIG. 1.
Figure 9:
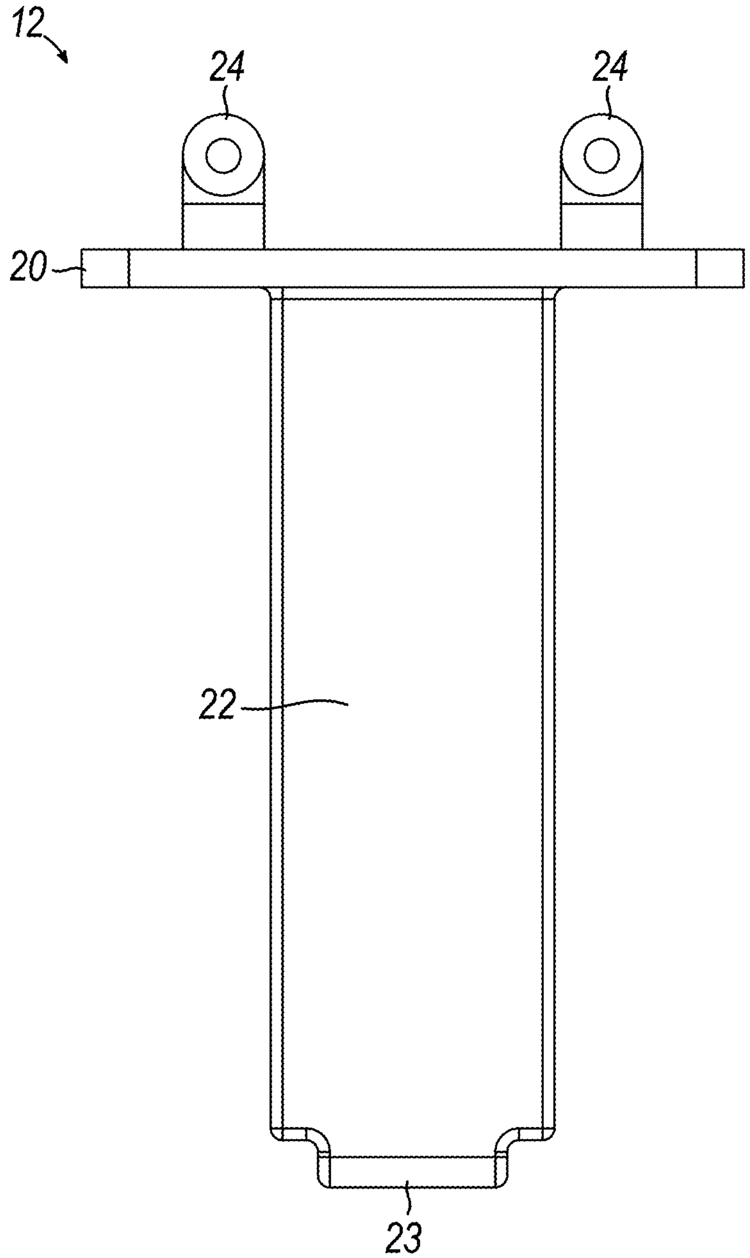
FIG. 9 depicts a top plan view of a hook body of the card holder of FIG. 1.
Figure 10:
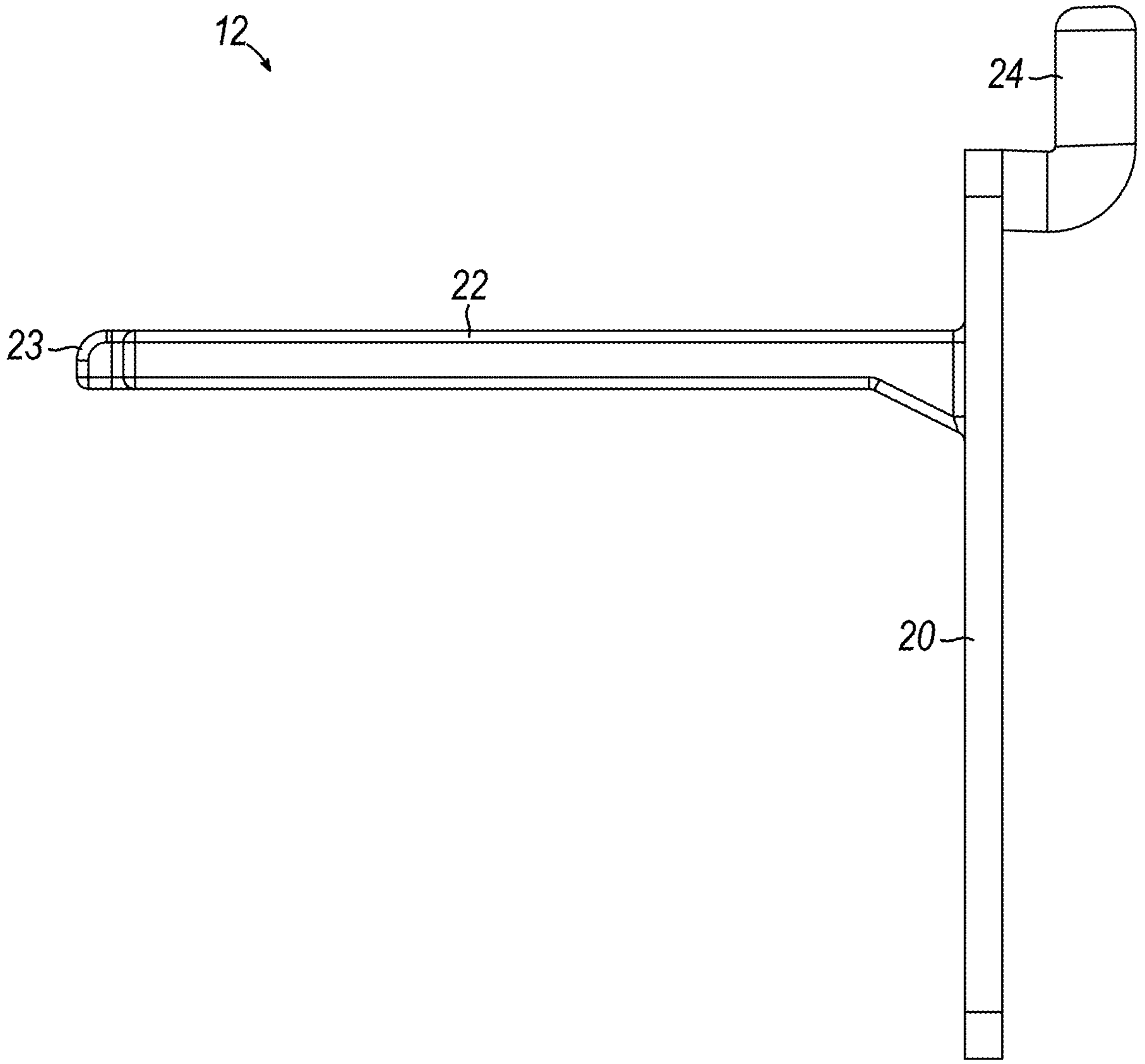
FIG. 10 depicts a side elevation view of the hook body of FIG. 9.

As shown in FIGS. 8-10, hook body (12) of the present example includes a substantially flat baseplate (20) and a hanger (22) extending forwardly from baseplate (20) to a front end (23). Hanger (22) is oriented generally orthogonally relative to baseplate (20), such that baseplate (20) is configured to be oriented generally vertically while hanger (22) is configured to be oriented generally horizontally when card holder (10) is mounted to a fixture (not shown). Hook body (12) also includes a pair of pegs (24) extending rearwardly and/or upwardly relative to baseplate (20) for receipt within corresponding holes of a pegboard (not shown) of the fixture for mounting card holder (10) to the fixture. Hanger (22) is sized and configured to be slidably received by the hanger slots of products (P) and/or the packaging of such products (P) so that such products (P) may hang from card holder (10) for presentation to customers. For example, each such product (P) may include one or more gift cards which may be at least partially contained in corresponding packaging; and the packaging may include a single hanger slot for receiving hanger (22). In the example shown, hook body (12) also includes a pair of upper bores (26) each extending through baseplate (20) and configured to receive respective fasteners in the form of screws (27) for facilitating secure attachment of bracket assembly (14) to hook body (12) via respective nuts (28); and a pair of lower bores (29) each extending through baseplate (20) and configured to receive respective fasteners such as Christmas tree clips (not shown) for facilitating secure attachment of hook body (12) to the fixture. In the example shown, the throat (T) is defined between front end (23) of hanger (22) and a portion of head cartridge (16), as described in greater detail below.

Figure 11:
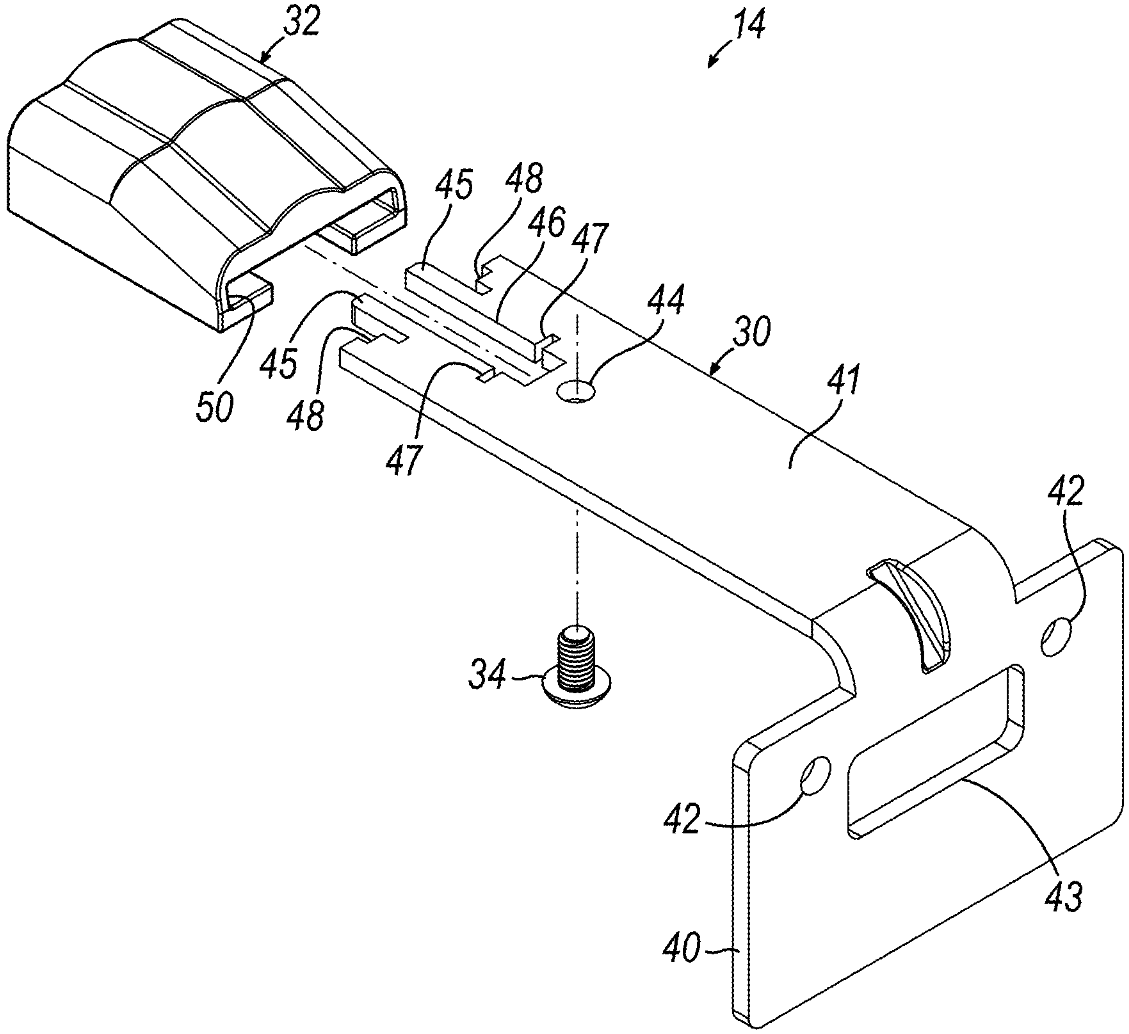
FIG. 11 depicts an exploded perspective view of a bracket assembly of the card holder of FIG. 1.

As shown in FIGS. 8 and 11, bracket assembly (14) of the present example includes a bracket (30) and a bracket cover (32) securely coupled to each other via a fastener in the form of a screw (34). As described in greater detail below, bracket (30) is configured to extend above and generally parallel to hanger (22) of hook body (12), and is further configured to rotatably support head cartridge (16) (e.g., via pin (17)); while bracket cover (32) is configured to securely capture pin retainer (19) by sandwiching a portion of pin retainer (19) against head cartridge (16), and is further configured to limit the amount of vertical clearance provided above hanger (22).

Figure 12:
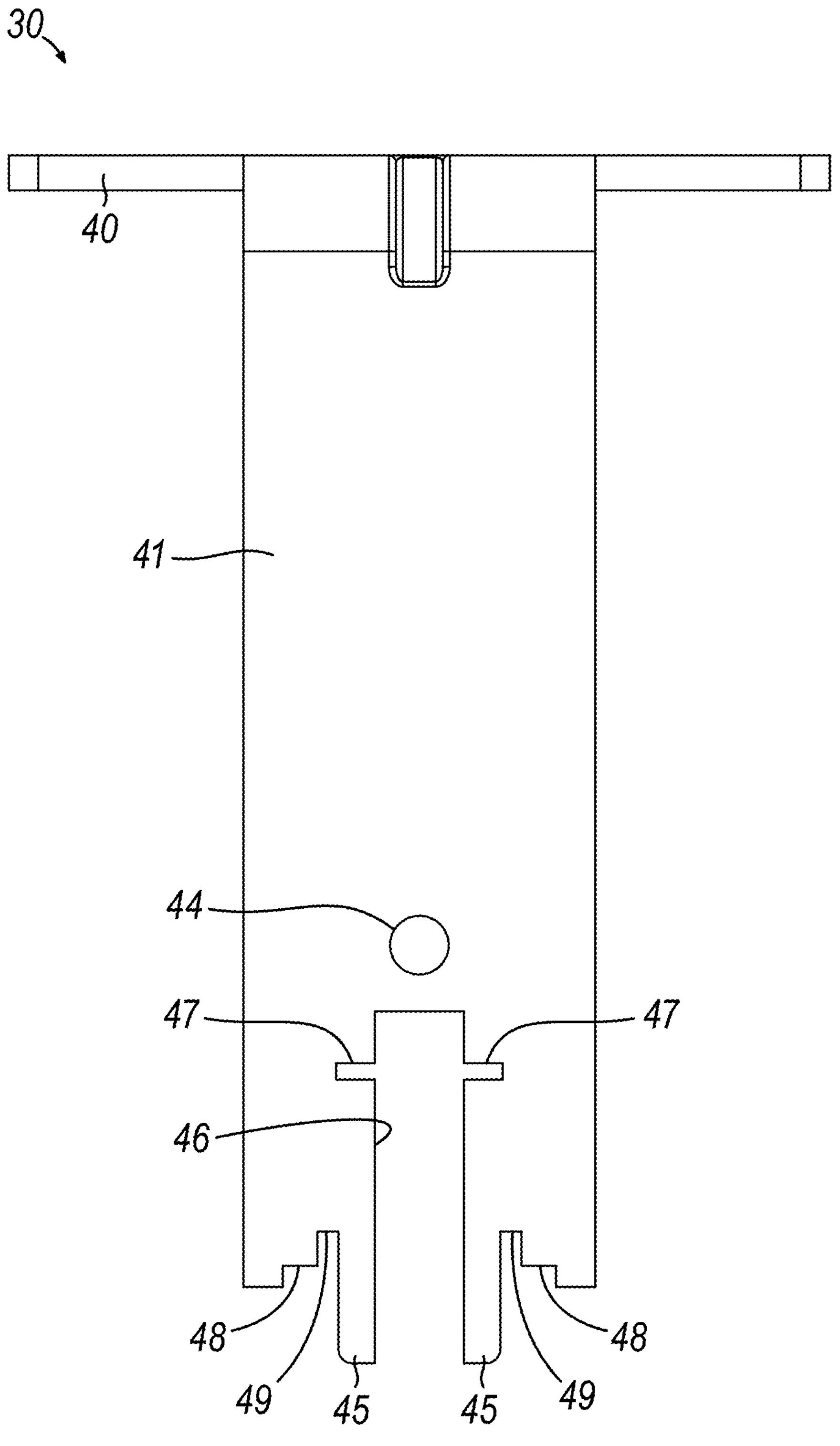
FIG. 12 depicts a top plan view of a bracket of the bracket assembly of FIG. 11.
Figure 13:
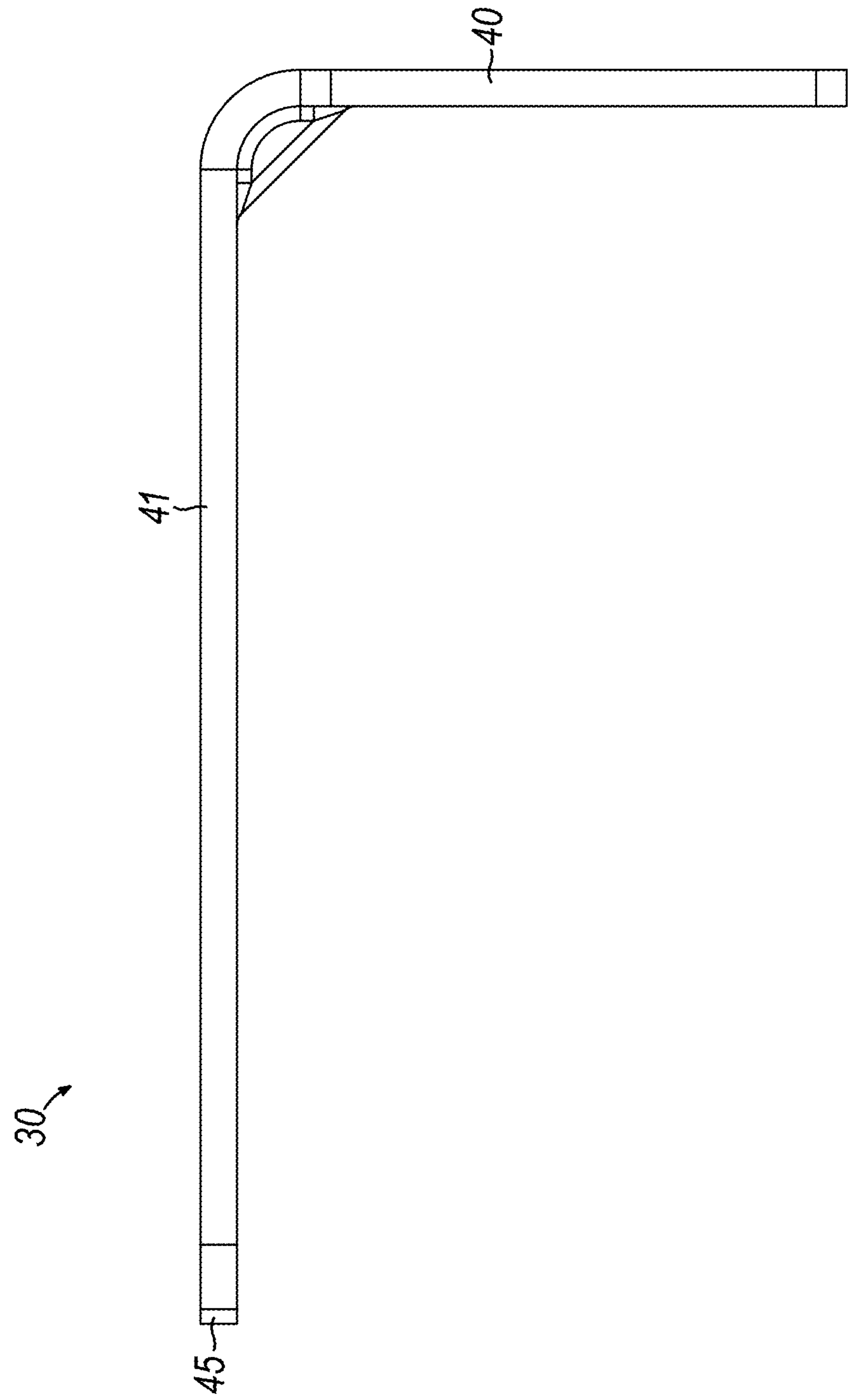
FIG. 13 depicts a side elevation view of the bracket of FIG. 12.
Figure 14:
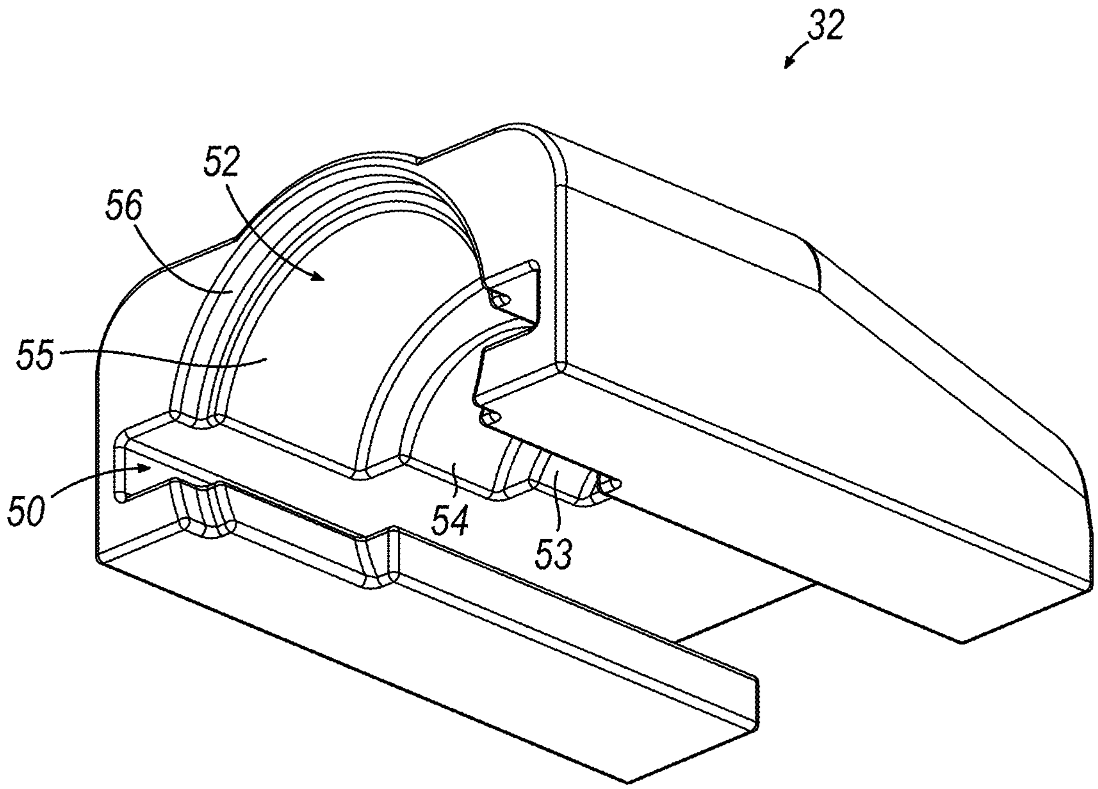
FIG. 14 depicts a bottom perspective view of a bracket cover of the bracket assembly of FIG. 11.
Figure 15:
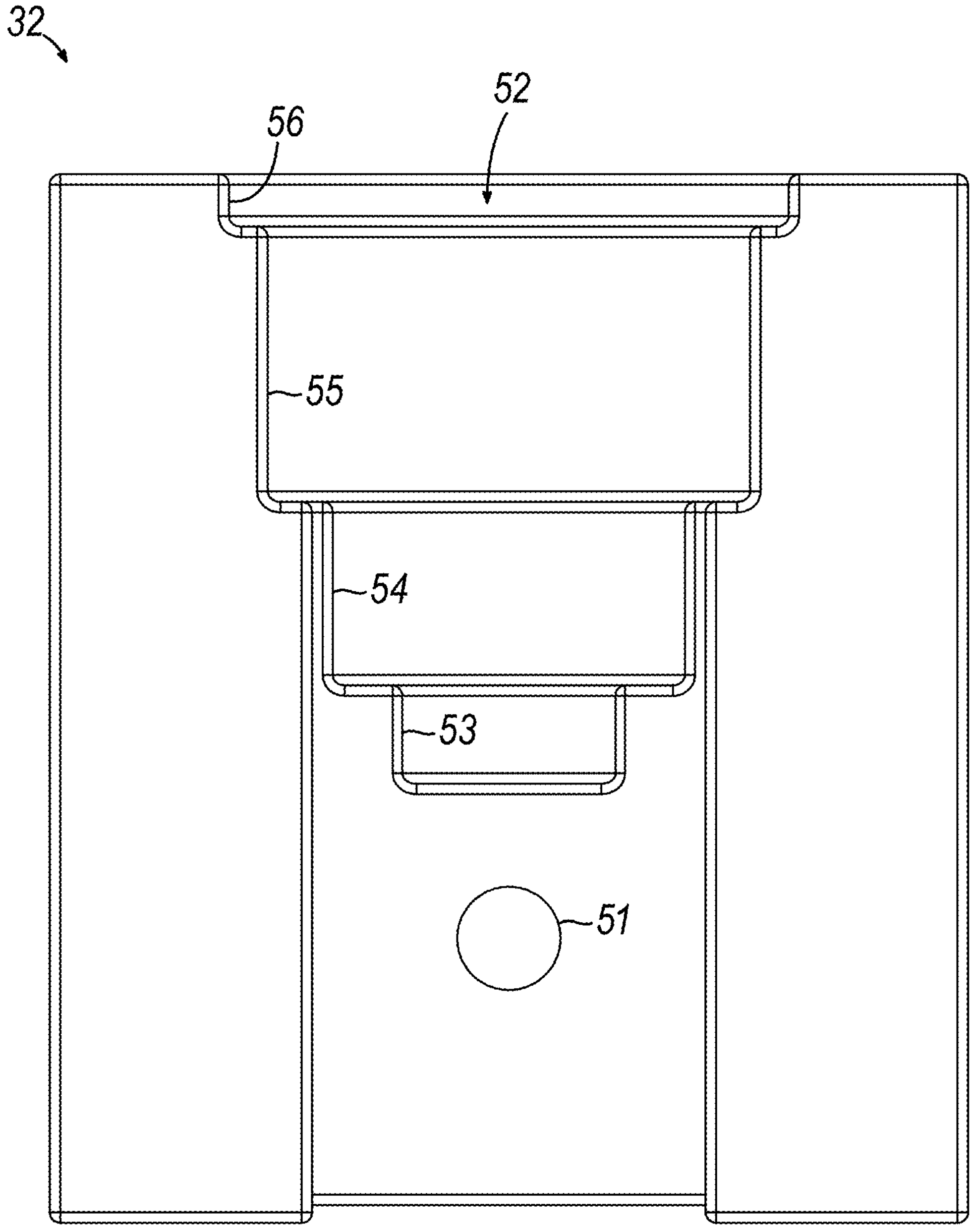
FIG. 15 depicts a bottom plan view of the bracket cover of FIG. 14.
Figure 16:
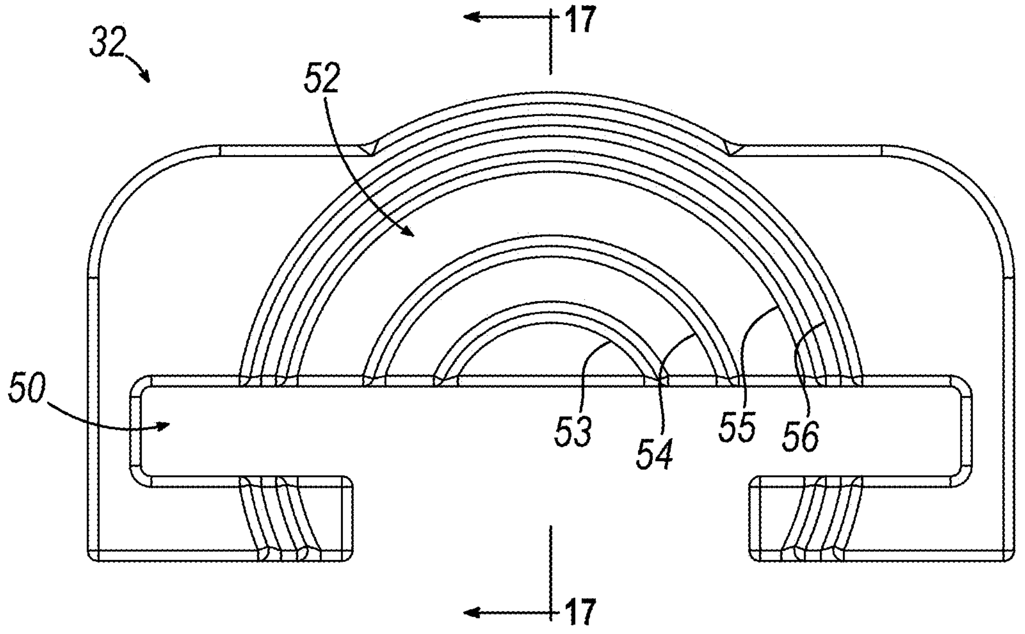
FIG. 16 depicts a front elevation view of the bracket cover of FIG. 14.
Figure 17:
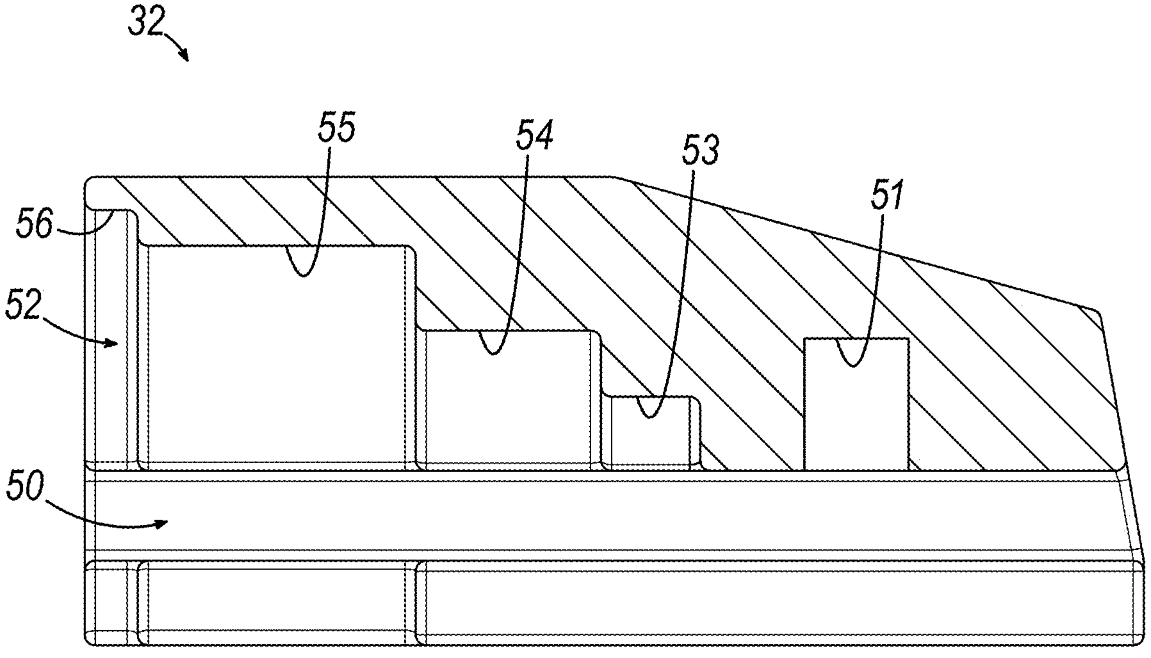
FIG. 17 depicts a cross-sectional side view of the bracket cover of FIG. 14, taken along line 17-17 in FIG. 16.

As shown in FIGS. 12 and 13, bracket (30) of the present example includes a substantially flat baseplate (40) and an elongate support plate (41) extending forwardly from baseplate (40). Support plate (41) is oriented generally orthogonally relative to baseplate (40), such that baseplate (40) is configured to be oriented generally vertically while support plate (41) is configured to be oriented generally horizontally when card holder (10) is mounted to the fixture. In the example shown, bracket (30) includes a pair of bores (42) each extending through baseplate (40) and configured to receive respective screws (27) for facilitating secure attachment of bracket assembly (14) to hook body (12) via respective nuts (28); and an aperture (43) extending through baseplate (40). Aperture (43) is sized and configured to receive hanger (22) of hook body (12). Bracket (30) also includes a bore (44) extending through support plate (41) and configured to receive screw (34) for facilitating secure attachment of bracket cover (32) to bracket (30). Support plate (41) of the present example defines a pair of front rails (45) spaced apart from each other by a central slot (46) that is sized and configured to accommodate a rear portion of pin (17). A pair of lateral slots (47) extend laterally outwardly from central slot (46) and are sized and configured to accommodate retaining ring (18). Bracket (30) of the present example also includes a pair of front recesses (48) and a pair of rear recesses (49), the purposes of which are described below.

As shown in FIGS. 14-17, bracket cover (32) of the present example includes an elongate slot (50) extending horizontally through bracket cover (32), from a front end of bracket cover (32) to a rear end of bracket cover (32), and configured to slidably receive at least a front portion of support plate (41). Bracket cover (32) also includes a threaded bore (51) extending upwardly from slot (50), and configured to receive screw (34) for facilitating secure attachment of bracket cover (32) to bracket (30). Bracket cover (32) of the present example also includes a multi-stage bore (52) extending rearwardly from the front end of bracket cover (32), and including a generally semi-cylindrical rear portion (53) sized and configured to accommodate a rear end of pin (17); a generally semi-cylindrical first intermediate portion (54) sized and configured to accommodate retaining ring (18); a generally semi-cylindrical second intermediate portion (55) sized and configured to accommodate a portion of pin retainer (19); and a generally semi-cylindrical front portion (56) sized and configured to accommodate another portion of pin retainer (19). As shown, front portion (56) is wider than second intermediate portion (55), second intermediate portion (55) is wider than first intermediate portion (54), and first intermediate portion (54) is wider than rear portion (53).

In the example shown, a lower surface of support plate (41) is spaced apart from an upper surface of hanger (22) by a first height (H1), and a lower surface of bracket cover (32) is spaced apart from the upper surface of hanger (22) by a second height (H2) that is less than the first height (H1), such that bracket cover (32) may limit the amount of vertical clearance provided above hanger (22). In some instances, the second height (H2) may be selected based on a distance between the hanger slot of the products (P) (or their packaging) and the top of the products (P) (or their packaging). For example, the second height (H2) may be selected to be only slightly greater than the distance between the hanger slot of the products (P) (or their packaging) and the top of the products (P) (or their packaging), such that when the hanger slots of multiple products (P) (or their packaging) receive hanger (22), the tops of at least some products (P) (or their packaging) may be positioned immediately below the lower surface of bracket cover (32). Thus, any attempt to deflect (e.g., bend) front end (23) of hanger (22) upwardly would cause the tops of at least some products (P) (or their packaging) to engage the lower surface of bracket cover (32), thereby resisting such deflection. In this manner, the interaction between bracket cover (32) and the products (P) that are hanging from hanger (22) may deter any attempts to circumvent head cartridge (16) by manipulating the throat (T) via upward deflection of front end (23) of hanger (22).

Figure 18:
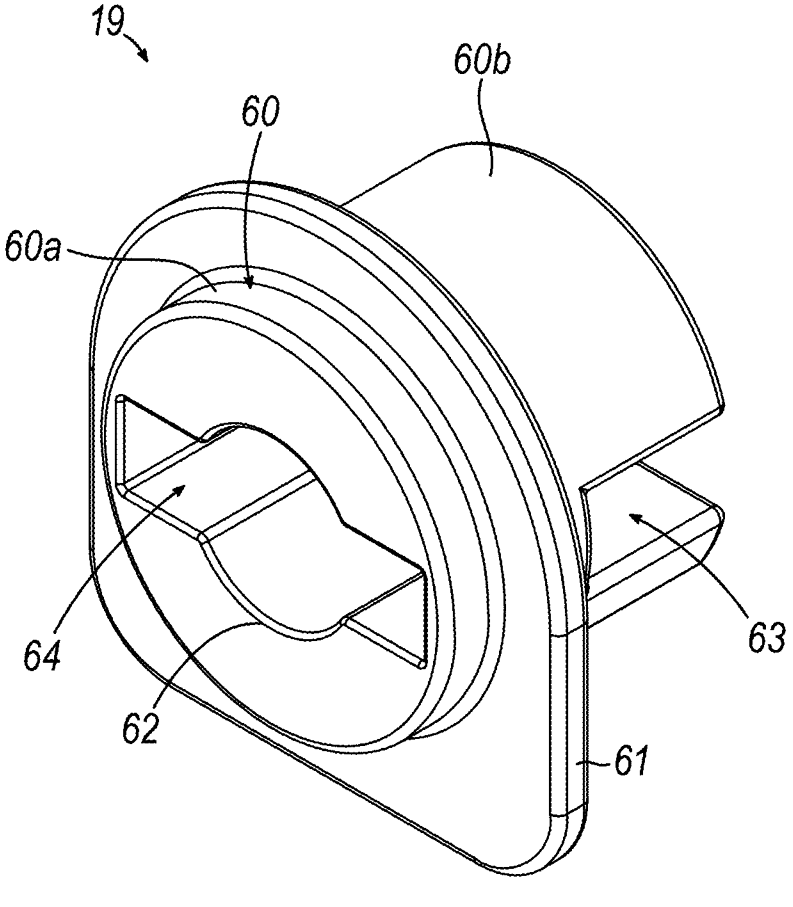
FIG. 18 depicts a perspective view of a pin retainer of the card holder of FIG. 1.
Figure 19:
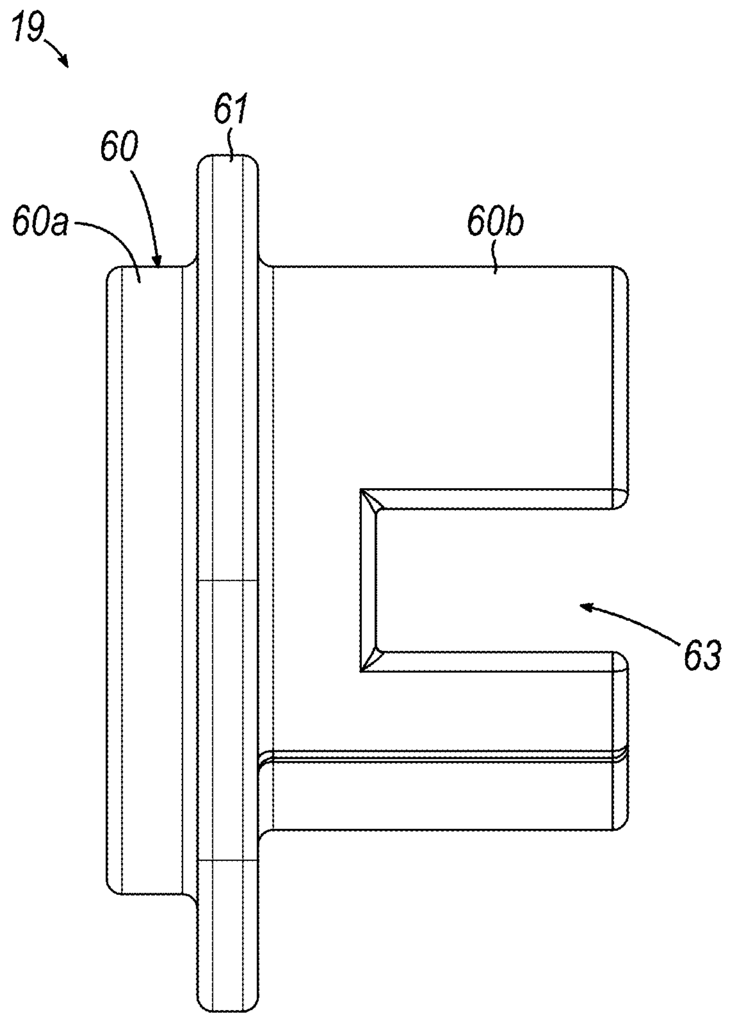
FIG. 19 depicts a side elevation view of the pin retainer of FIG. 18.
Figure 20:
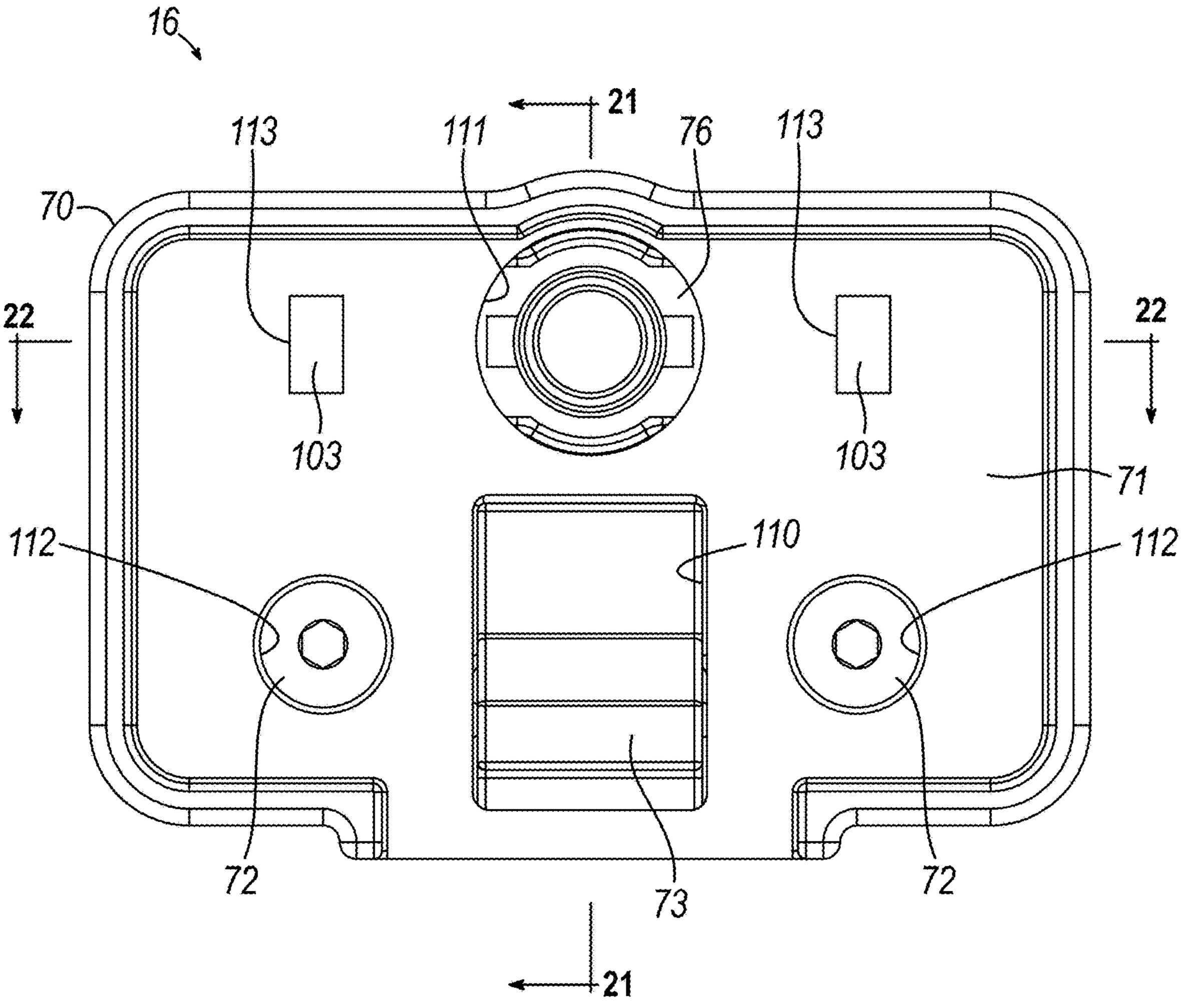
FIG. 20 depicts a rear elevation view of a head cartridge of the card holder of FIG. 1.
Figure 21:
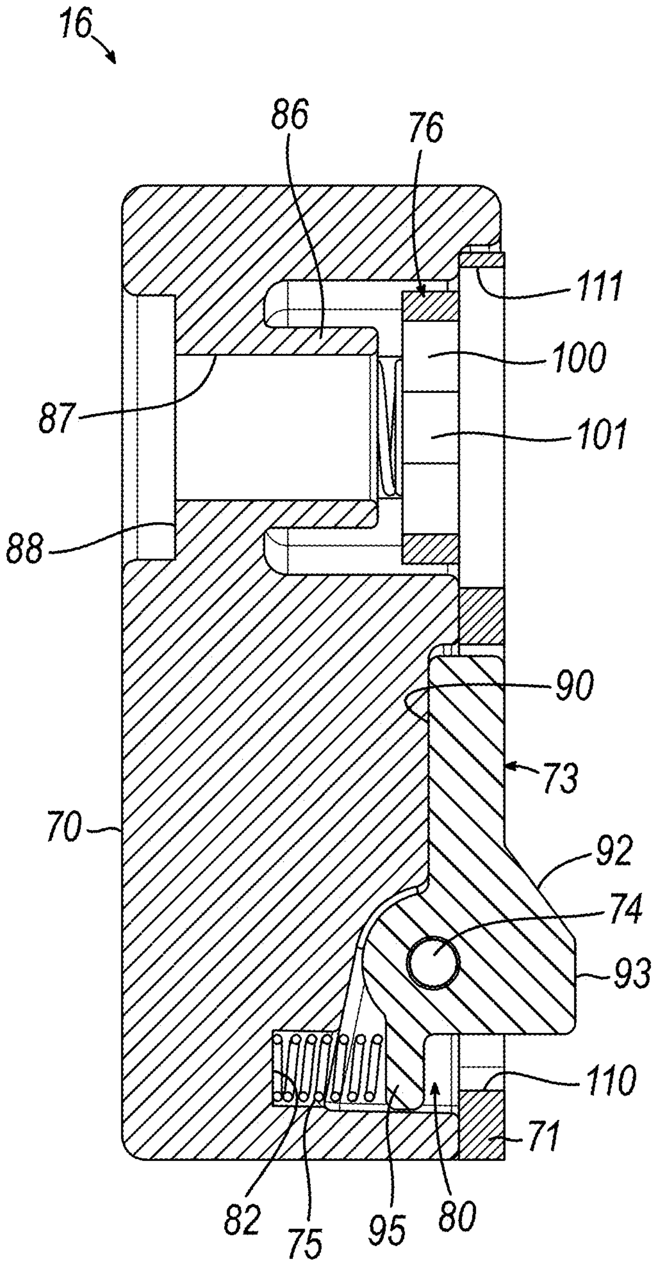
FIG. 21 depicts a cross-sectional side view of the head cartridge of FIG. 20, taken along line 21-21 in FIG. 20.
Figure 22:
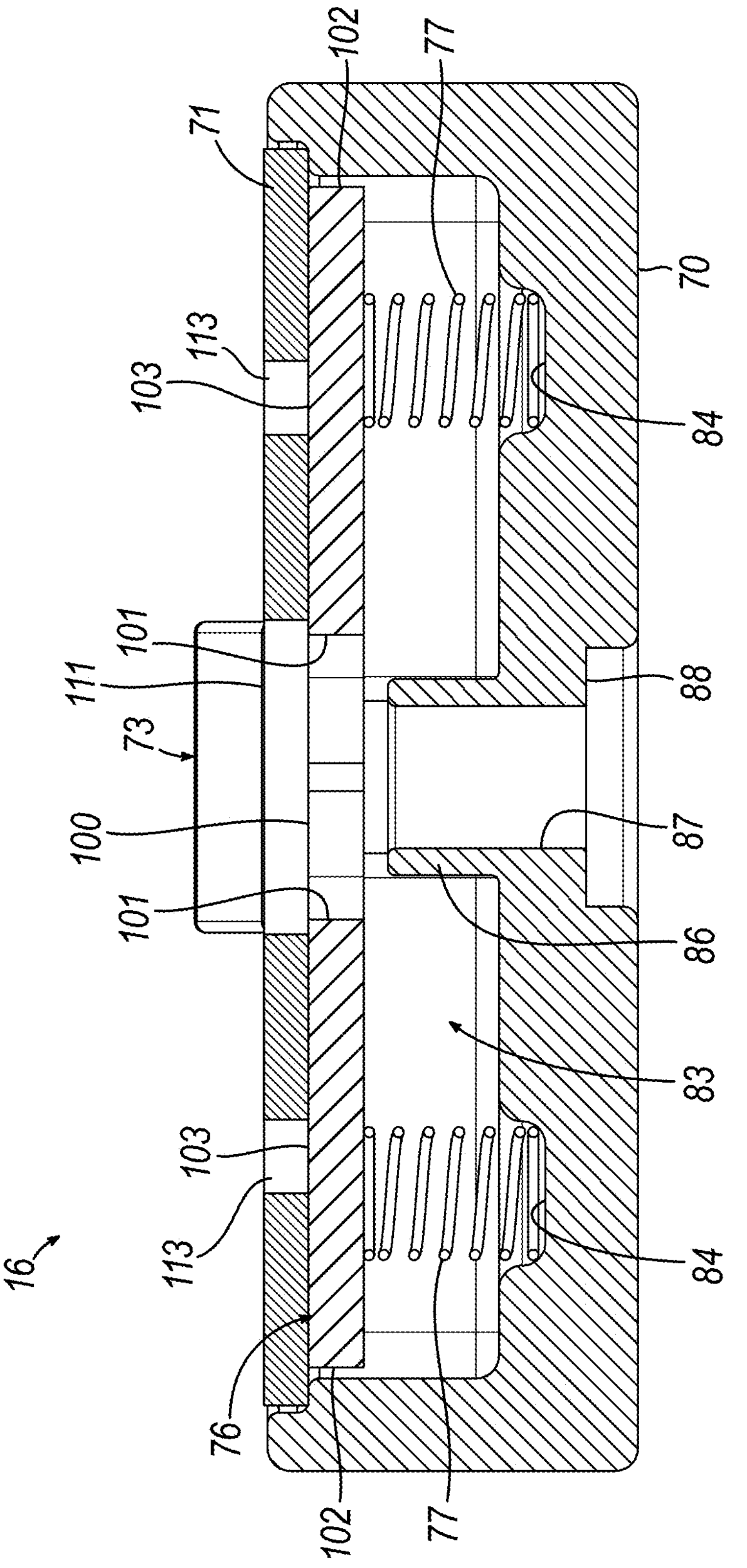
FIG. 22 depicts a cross-sectional side view of the head cartridge of FIG. 20, taken along line 22-22 in FIG. 20.

As shown in FIGS. 18 and 19, pin retainer (19) of the present example includes a generally cylindrical body (60) having a front portion (60*a*) that is configured to be at least partially received within a corresponding portion of head cartridge (16); a rear portion (60*b*) that is configured to be at least partially received within rear recesses (49) of bracket (30), and that is further configured to be at least partially received within second intermediate portion (55) of bore (52) of bracket cover (32); and a flange (61) extending radially outwardly from the front portion (60*a*) of body (60) and configured to be at least partially received within front recesses (48) of bracket (30), and further configured to be at least partially received within front portion (56) of bore (52) of bracket cover (32), such that flange (61) is configured to be sandwiched between a rear surface of front portion (56) of bore (52) and a rear surface of head cartridge (16). Pin retainer (19) also includes a central bore (62) extending through body (60) and configured to receive pin (17). Pin retainer (19) of the present example also includes a rear slot (63) extending laterally across a rear portion of body (60) and configured to receive respective portions of support plate (41) of bracket (30) (e.g., such that a front end of rear slot (63) seats against a rear surface of rear recess (49)); and a front slot (64) extending laterally outwardly from either side of central bore (62) and configured to receive rails (45) of bracket (30), such that pin retainer (19) may be fixed against rotation relative to bracket (30).

As shown in FIGS. 20-23, head cartridge (16) of the present example includes a housing (70) and a back plate (71) securely coupled to each other via a pair of fasteners in the form of screws (72). Head cartridge (16) also includes a gate in the form of a paddle (73) pivotably coupled to housing (70) via a substantially cylindrical rod (74), such that paddle (73) is pivotable about a pivot axis (PA) (e.g., defined by rod (74)) between a product-blocking position (see FIGS. 5, 6A, and 32A) and a product-releasing position (see FIGS. 6B and 32B); and a resilient biasing member in the form of a compression spring (75) configured to resiliently bias paddle (73) toward the blocking position. As shown, the pivot axis (PA) extends in a generally lateral (e.g. left-right) direction, such that the pivot axis (PA) is oriented in a direction that is generally orthogonal to the direction in which the rotation axis (RA) is oriented. Head cartridge (16) of the present example further includes a lock in the form of a locking plate (76) slidably coupled to housing (70) such that locking plate (76) is slidable between a rearward, locked position (see FIGS. 7A, 22, and 32A-32B) and a forward, unlocked position (see FIGS. 7B and 32C-32D); and a pair of resilient biasing members in the form of compression springs (77) configured to resiliently bias locking plate (76) toward the locked position (e.g., in a rearward direction).

Figure 23:
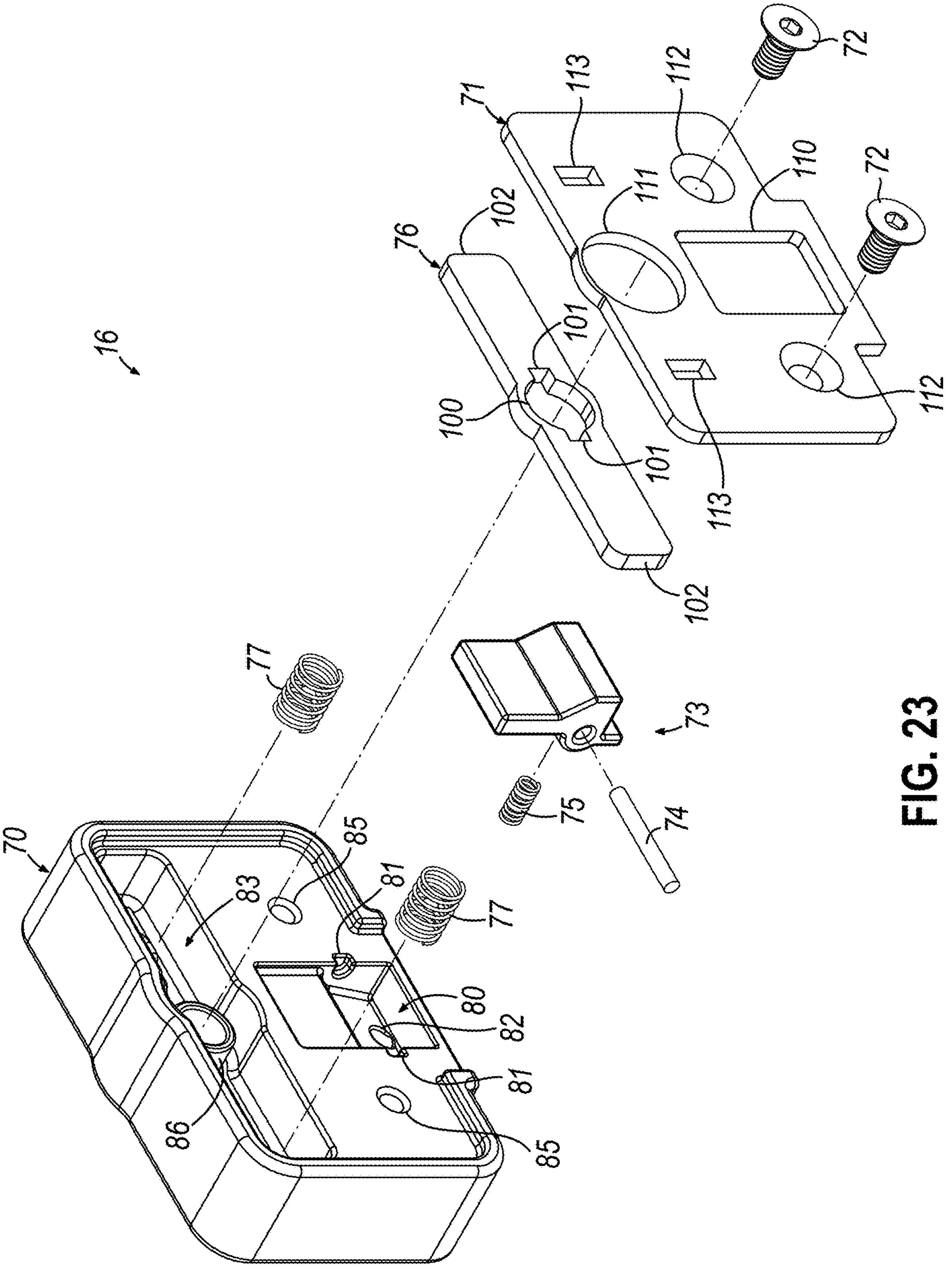
FIG. 23 depicts an exploded perspective view of the head cartridge of FIG. 20.

As shown in FIG. 23, housing (70) of the present example includes a paddle receptacle (80) configured to at least partially receive paddle (73) and to permit pivoting of paddle (73) therein relative to rod (74); a pair of laterally-opposed rod mounts (81) extending laterally outwardly from receptacle (80) and configured to receive respective ends of rod (74); and a bore (82) extending forwardly from receptacle (80) and configured to receive spring (75). Housing (70) also includes a locking plate receptacle (83) configured to receive locking plate (76) and to permit translation of locking plate (76) therein in a forward and/or rearward direction; and a pair of bores (84) extending forwardly from receptacle (83) and configured to receive respective springs (77). Housing (70) of the present example further includes a pair of threaded bores (85) extending forwardly from a rear surface of housing (70) and configured to receive respective screws (72) for facilitating secure attachment of back plate (71) to housing (70). Housing (70) also includes a collar (86) extending rearwardly from a front end of locking plate receptacle (83) and configured to be slidably received by a corresponding portion of locking plate (76) (e.g., at least when in the unlocked position). In some versions, a rear end of collar (86) may be configured to confront and/or abut front ends of rails (45). Collar (86) at least partially defines a bore (87) configured to receive pin (17). In the example shown, housing (70) also includes a counterbore (88) extending rearwardly from a front surface of housing (70) to bore (87) and configured to receive a head of pin (17). In some versions, a bracket with a graphic channel (not shown) may clip onto housing (70) (e.g., over the front surface of housing (70)) and may carry one or more labels for displaying product information and/or instructions for removing products (P) individually from card holder (10).

Figure 24:
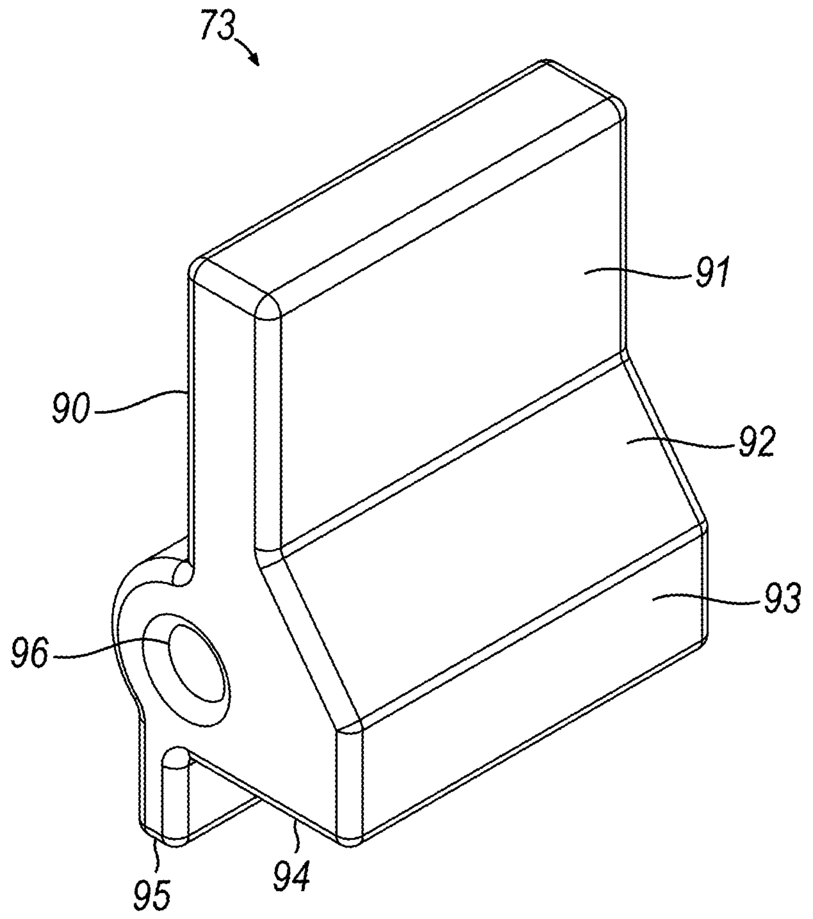
FIG. 24 depicts a perspective view of a paddle of the head cartridge of FIG. 20.
Figure 25:
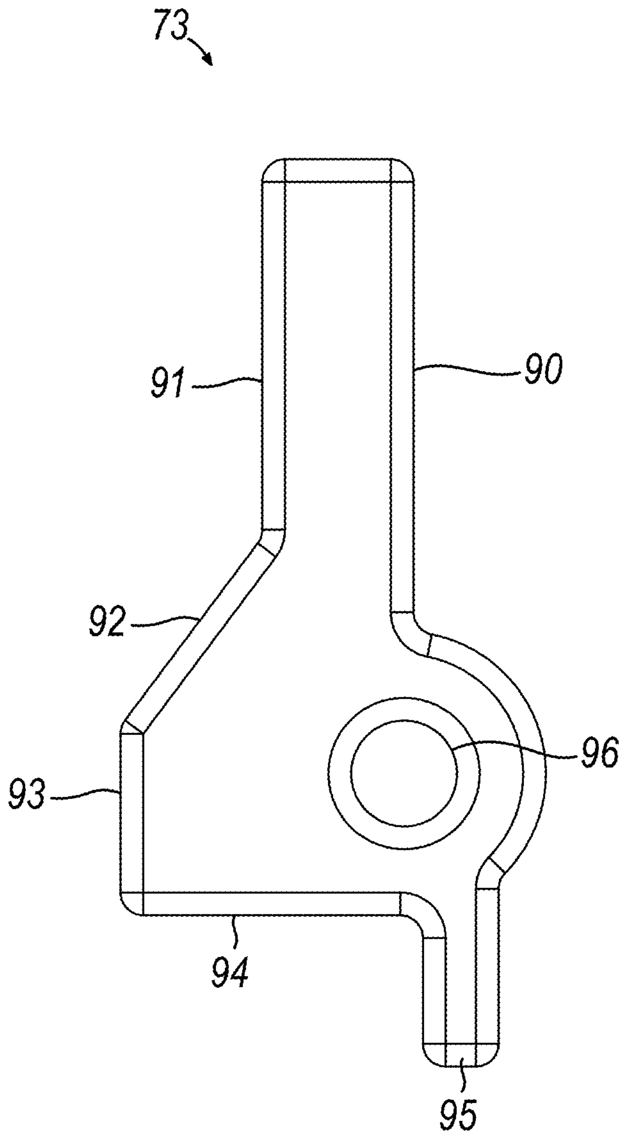
FIG. 25 depicts a side elevation view of the paddle of FIG. 24.

As shown in FIGS. 23-25, paddle (73) of the present example includes a generally vertical front surface (90), a generally vertical first rear surface (91), an oblique second rear surface (92) extending downwardly and rearwardly from first rear surface (91), a generally vertical third rear surface (93) extending downwardly from second rear surface (92), a lower surface (94) extending forwardly from a lower end of third rear surface (93), and a lower tab (95) extending downwardly from lower surface (94). Paddle (73) also includes a bore (96) configured to receive rod (74). Spring (75) may be configured to engage a front surface of lower tab (95) for resiliently biasing paddle (73) toward the blocking position; and front surface (90) may be configured to abut a rear-facing surface of paddle receptacle (80) when paddle (73) is in the blocking position to limit pivoting of paddle (73). Second rear surface (92) may be configured to be cammingly engaged by a product (P) as the product (P) is slid forwardly along hanger (22) and/or as the product (P) is pulled downwardly relative to front end (23) of hanger (22), to thereby pivot paddle (73) from the blocking position toward the releasing position for releasing the product (P) from card holder (10); while first and/or second rear surfaces (91, 92) may inhibit multiple products (P) from being released from card holder (10) simultaneously.

In this regard, first and/or second rear surfaces (91, 92) may cooperate with front end (23) of hanger (22) to at least partially define the throat (T) between head cartridge (16) and hook body (12). The distance(s) between front end (23) of hanger (22) and first and/or second rear surfaces (91, 92) of paddle (73) may vary based on the angular position of paddle (73) about the pivot axis (PA), such that the configuration (e.g., size and/or shape) of the throat (T) may likewise vary based on the angular position of paddle (73) about the pivot axis (PA) to thereby vary the degree to which the throat (T) is constricted. For example, when paddle (73) is in the blocking position, the distance(s) between front end (23) of hanger (22) and first and/or second rear surfaces (91, 92) of paddle (73) may be less than a thickness of a product (P), such that the throat (T) may be sufficiently small to prevent the passage of a product (P) therethrough; and when paddle (73) is in the releasing position, the distance(s) between front end (23) of hanger (22) and first and/or second rear surfaces (91, 92) of paddle (73) may be at least slightly greater than a thickness of a product (P) while being less than a combined thickness of more than one product (P), such that the throat (T) may be sufficiently large to permit the passage of a single product (P) therethrough while still being sufficiently small to prevent the passage of multiple products (P) therethrough. In addition, or alternatively, when paddle (73) is in the blocking position, the shape of the throat (T) may be sufficiently tortuous to prevent the passage of a product (P) therethrough; and when paddle (73) is in the releasing position, the shape of the throat (T) may be sufficiently direct to permit the passage of a single product (P) therethrough while still being sufficiently tortuous to prevent the passage of multiple products (P) therethrough.

Figure 26:
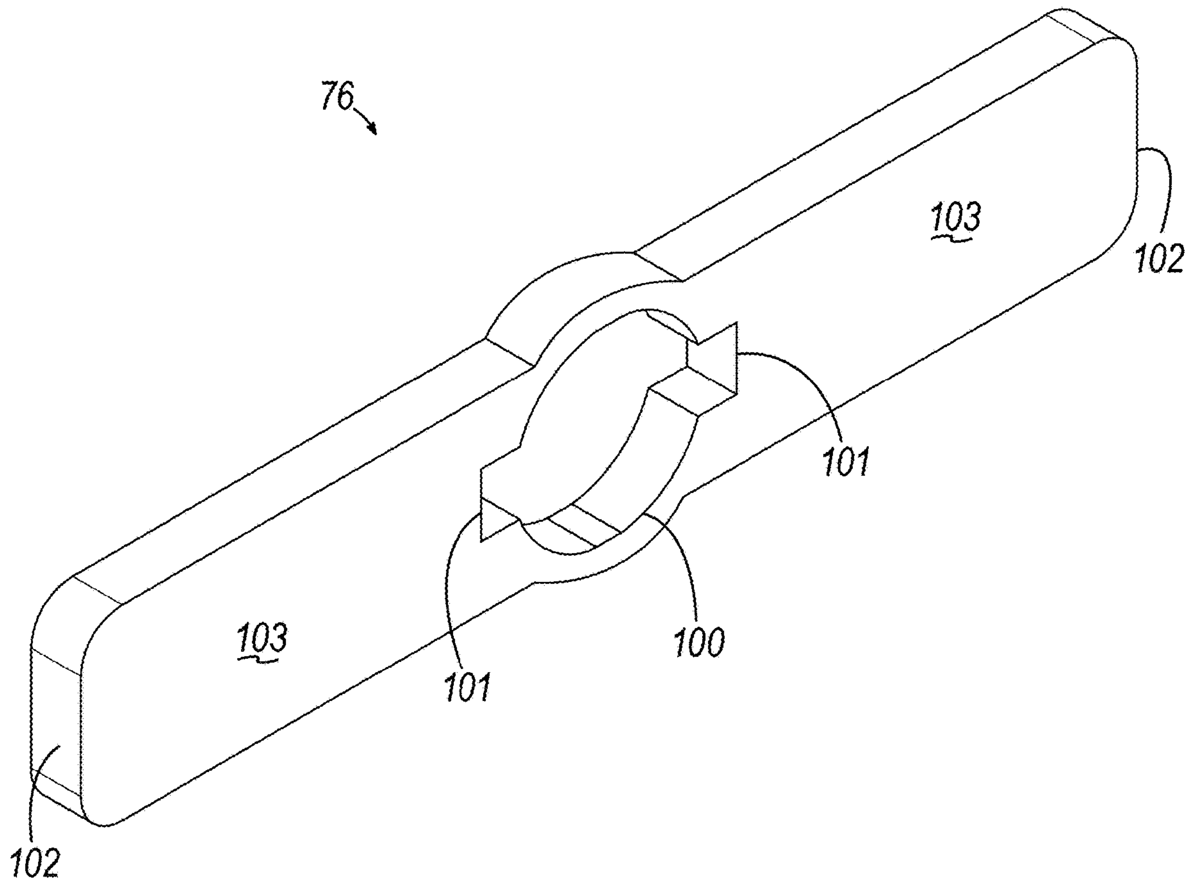
FIG. 26 depicts a perspective view of a locking plate of the head cartridge of FIG. 20.
Figure 27:
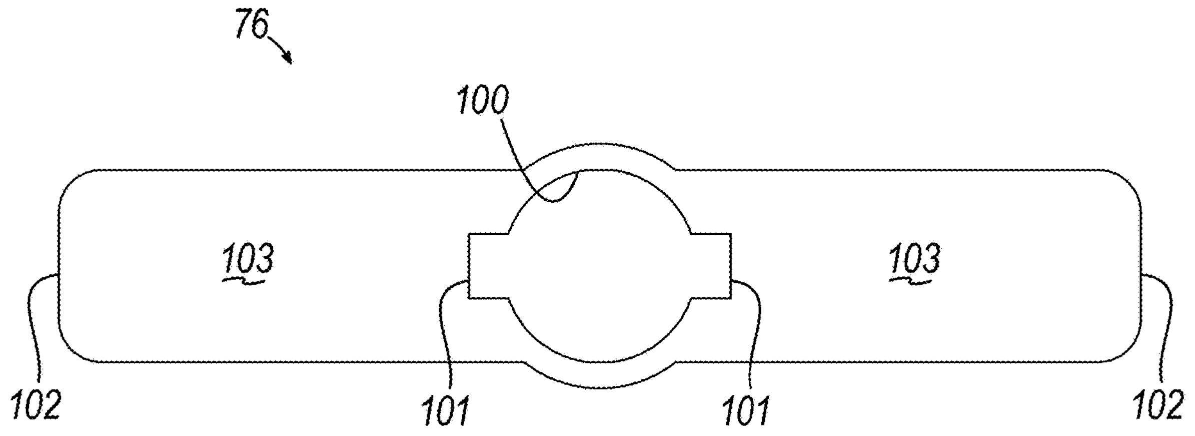
FIG. 27 depicts a front elevation view of the locking plate of FIG. 26.

As shown in FIGS. 23, 26, and 27, locking plate (76) of the present example includes a central bore (100) configured to accommodate pin (17) (e.g., when locking plate (76) is in the locked position) and collar (86) (e.g., when locking plate (76) is in the unlocked position); a pair of lateral slots (101) extending laterally outwardly from central bore (100) and configured to slidably receive respective rails (45) of bracket (30) when locking plate (76) is in the locked position, and configured to release the respective rails (45) of bracket (30) when locking plate (76) is in the unlocked position; and a pair of wings (102) extending outwardly relative to bore (100) and configured to engage respective springs (77) for resiliently biasing locking plate (76) toward the locked position. Each wing (102) includes a respective rearwardly-facing actuation surface (103) configured to facilitate actuation of locking plate (176) from the locked position to the unlocked position, as described in greater detail below.

Figure 28:
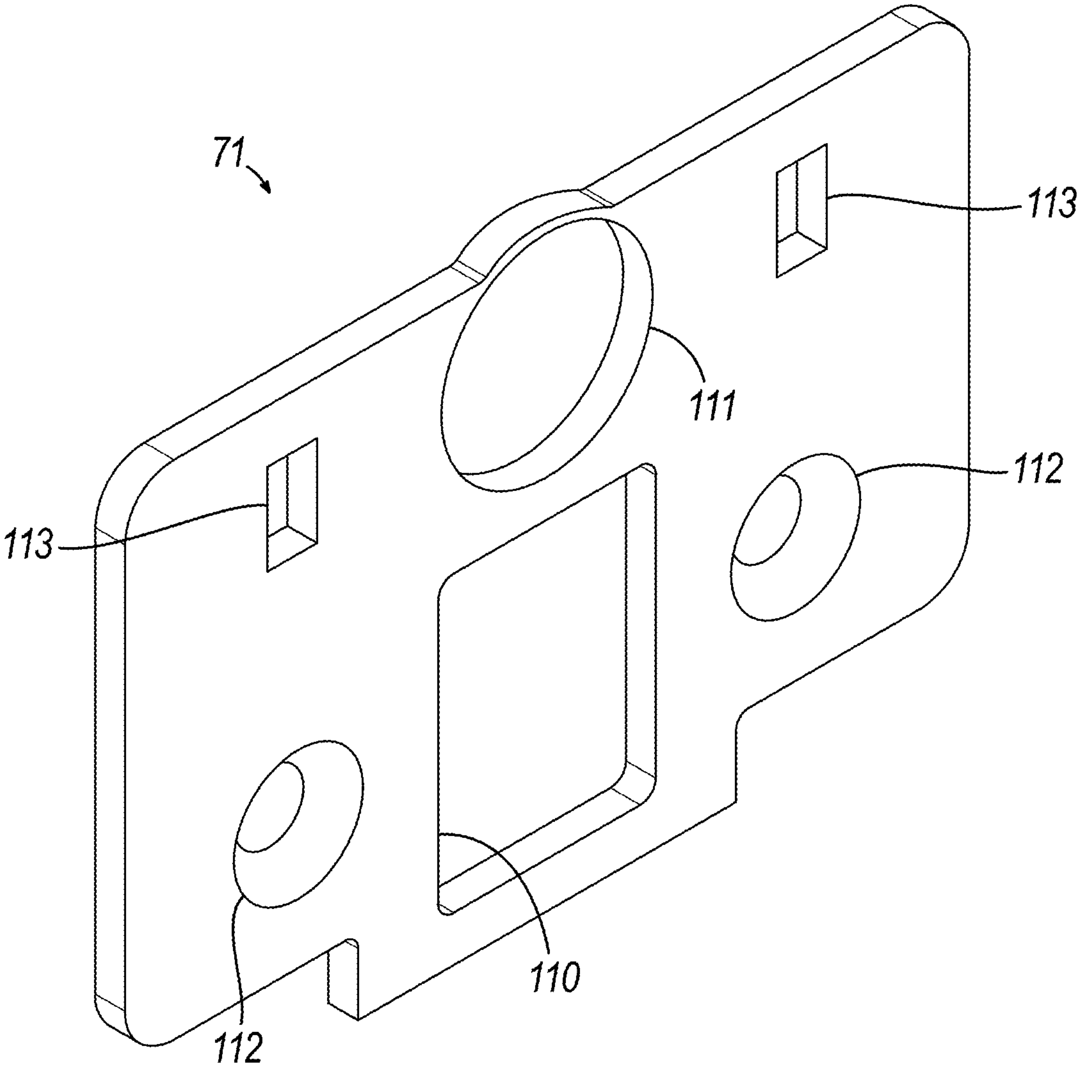
FIG. 28 depicts a perspective view of a back plate of the head cartridge of FIG. 20.
Figure 29:
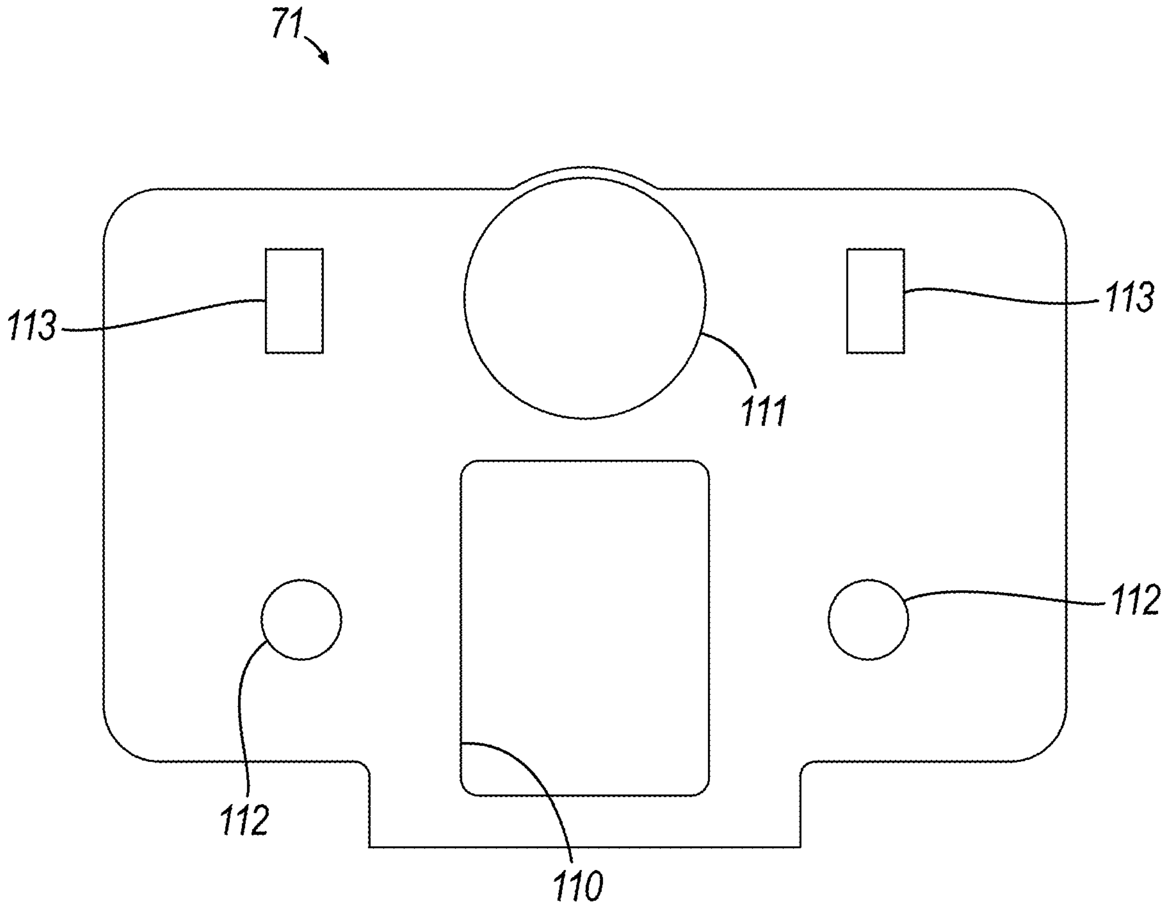
FIG. 29 depicts a rear elevation view of the back plate of FIG. 28.

As shown in FIGS. 23, 28, and 29, back plate (71) of the present example includes an aperture (110) aligned with paddle receptacle (80) and configured to permit paddle (73) to extend rearwardly out of housing (70); a bore (111) aligned with collar (86) of housing (70) and central bore (100) of locking plate (76), and configured to receive front portion (60*a*) of pin retainer (19); a pair of bores (112) aligned with bores (85) of housing (70) and configured to receive respective screws (72) for facilitating secure attachment of back plate (71) to housing (70); and a pair of apertures (113) aligned with respective actuation surfaces (103) of locking plate (76) and configured to provide limited access thereto for facilitating sliding of locking plate (76) from the locked position toward the unlocked position.

Figure 30:
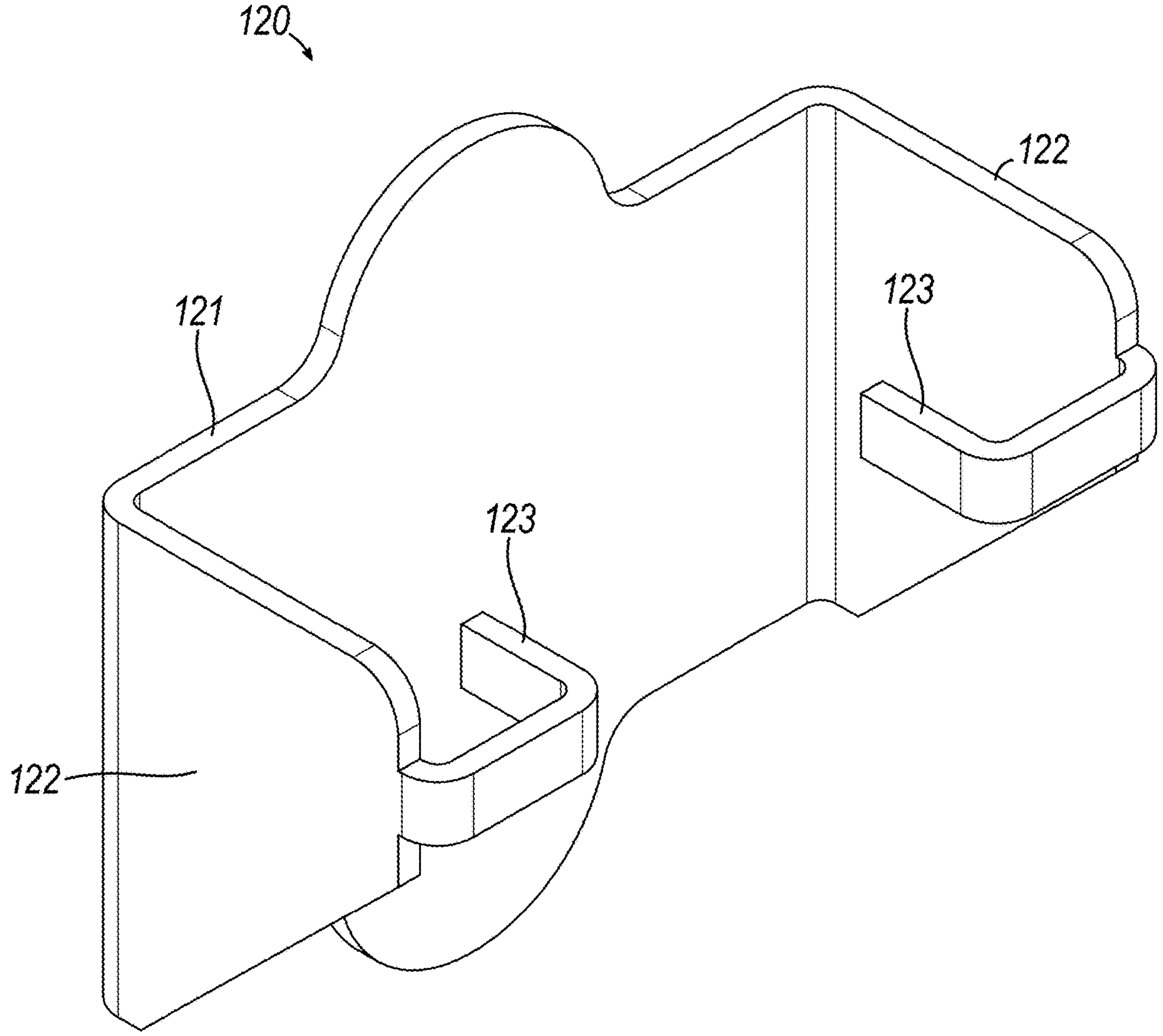
FIG. 30 depicts a perspective view of an example of a security key for use with the card holder of FIG. 1.
Figure 31:
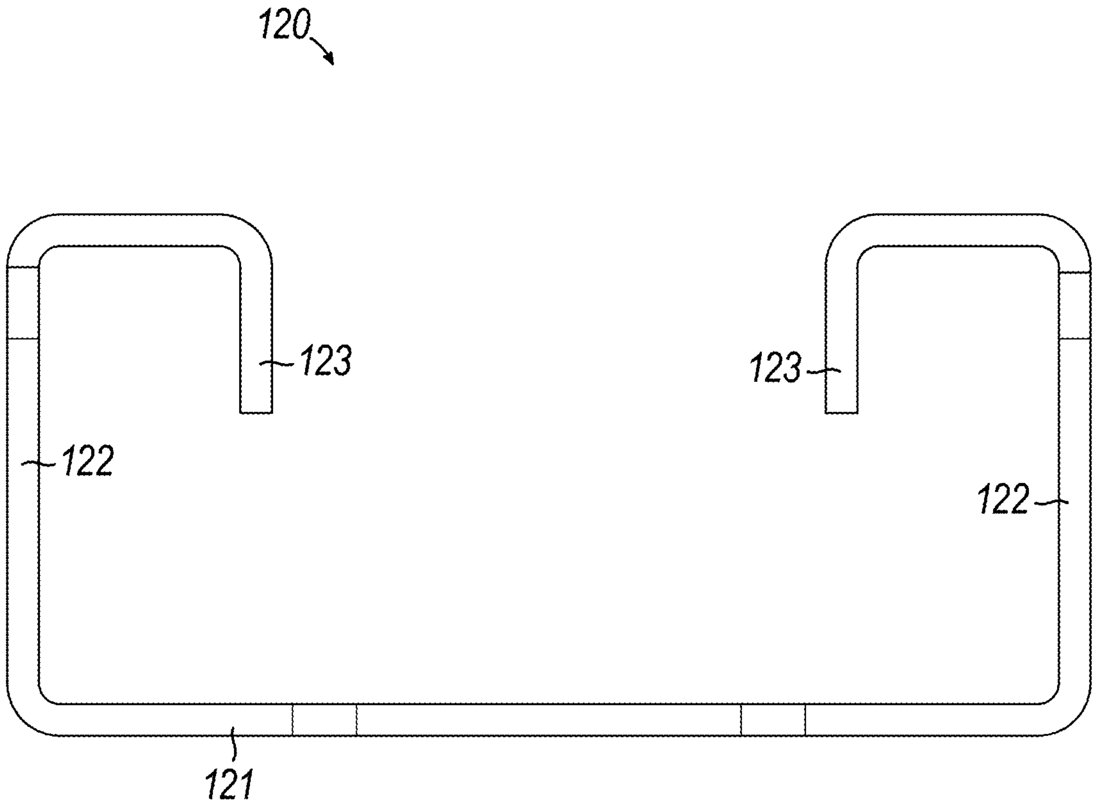
FIG. 31 depicts a top plan view of the security key of FIG. 30.

FIGS. 30 and 31 depict an example of a security key (120) that is configured for use with card holder (10). Security key (120) of the present example includes a front plate (121); a pair of arms (122) extending rearwardly from opposite sides of front plate (121); and a pair of fingers (123) extending laterally inwardly and forwardly from rear ends of respective arms (122). Fingers (123) are sized and configured to be simultaneously received within corresponding apertures (113) of back plate (71) for accessing the actuation surfaces (103) of the corresponding wings (102) of locking plate (76), such that fingers (123) are configured to slide locking plate (76) in a forward direction from the locked position toward the unlocked position in which slots (101) release rails (45) to permit rotation of head cartridge (16) from the active position to the inactive position. Front plate (121) may be configured to confront and/or engage the front surface of housing (70) while fingers (123) may be configured to generally wrap around a rear surface of back plate (71) and extend through the corresponding apertures (113) to simultaneously push the corresponding actuation surfaces (103) forward when security key (120) is engaged with card holder (10).

In one example of a method of assembly, card holder (10) may be assembled by first assembling head cartridge (16). This may include positioning springs (75, 77) within the corresponding bores (82, 84) of housing (70), and then placing locking plate (76) within locking plate receptacle (83) over the corresponding springs (77). This may also include positioning rod (74) within bore (96) of paddle (73), and then placing paddle (73) within paddle receptacle (80) such that the ends of rod (74) are received within the respective rod mounts (81). Back plate (71) may then be securely attached to housing (70) via screws (72).

Next, bracket assembly (14) may be assembled by sliding bracket cover (32) onto bracket (30). This may include sliding bracket cover (32) rearwardly such that threaded bore (51) of bracket cover (32) is temporarily rearward of bore (44) of bracket (30).

Next, pin retainer (19) may be placed onto bracket assembly (14), such that rear slot (63) receives respective portions of support plate (41) of bracket (30), front slot (64) receives respective rails (45) of bracket (30), and flange (61) is at least partially received within front recesses (48) of bracket (30) and within front portion (56) of bore (52) of bracket cover (32). In some versions, the front end of rear slot (63) may seat against the rear surface of rear recess (49).

Next, head cartridge (16) may be aligned with bracket assembly (14) and pin retainer (19). Pin (17) may then be inserted through collar (86) of housing (70), central bore (100) of locking plate (76), central bore (62) of pin retainer (19), and central slot (46) of bracket (30); and secured via retaining ring (18). Bracket cover (32) may then be slid forward to align threaded bore (51) of bracket cover (32) with bore (44) of bracket (30), and bracket cover (32) may be securely attached to bracket (30) via screw (34).

Finally, hanger (22) may be inserted forwardly through aperture (43) of bracket assembly (14); and baseplates (20, 40) may be securely attached to each other via nuts (28) and screws (27).

Figure 32A:
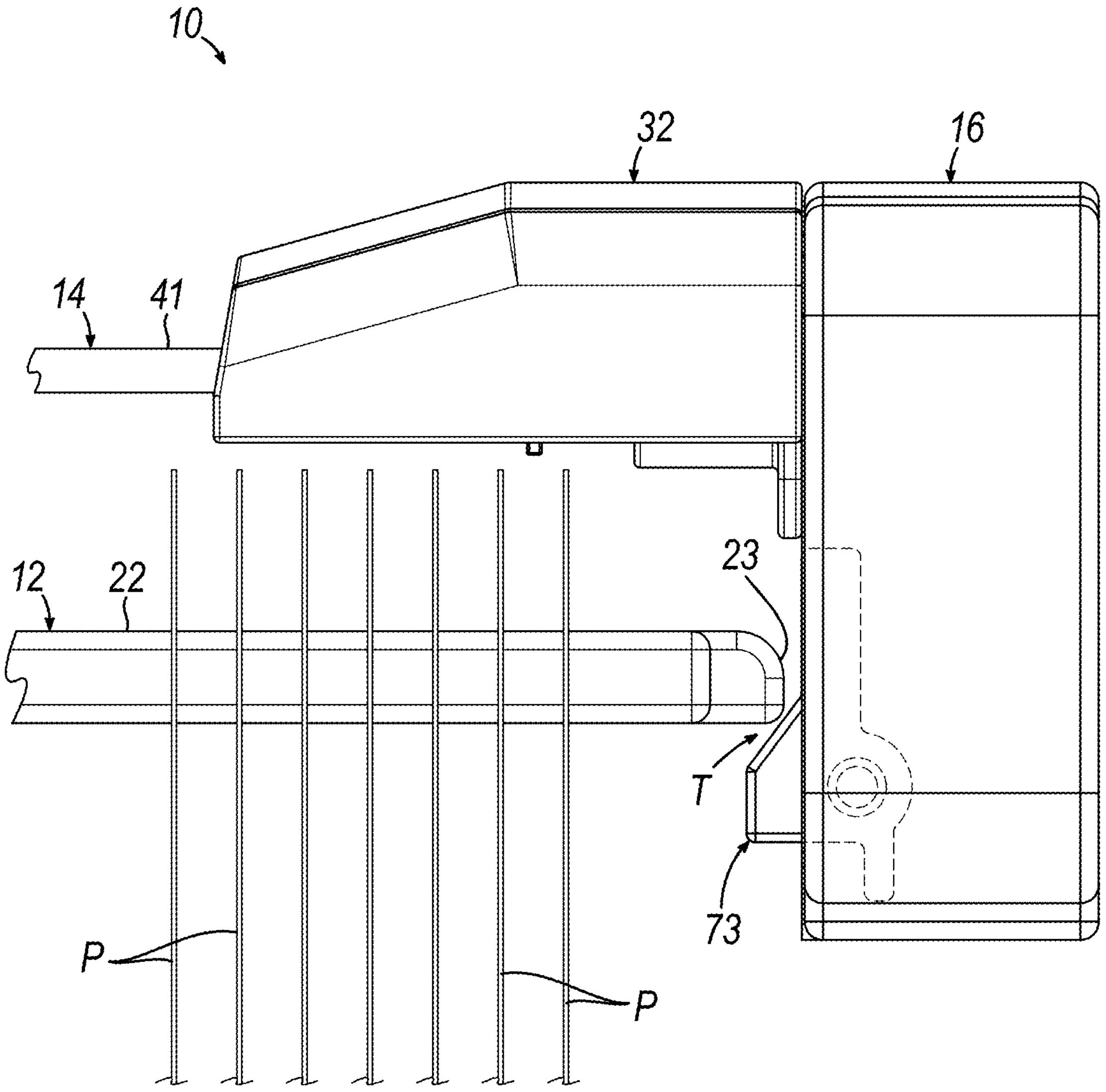
FIG. 32A depicts a side elevation view of the card holder of FIG. 1, showing the card holder loaded with a plurality of products in the form of cards.
Figure 32B:
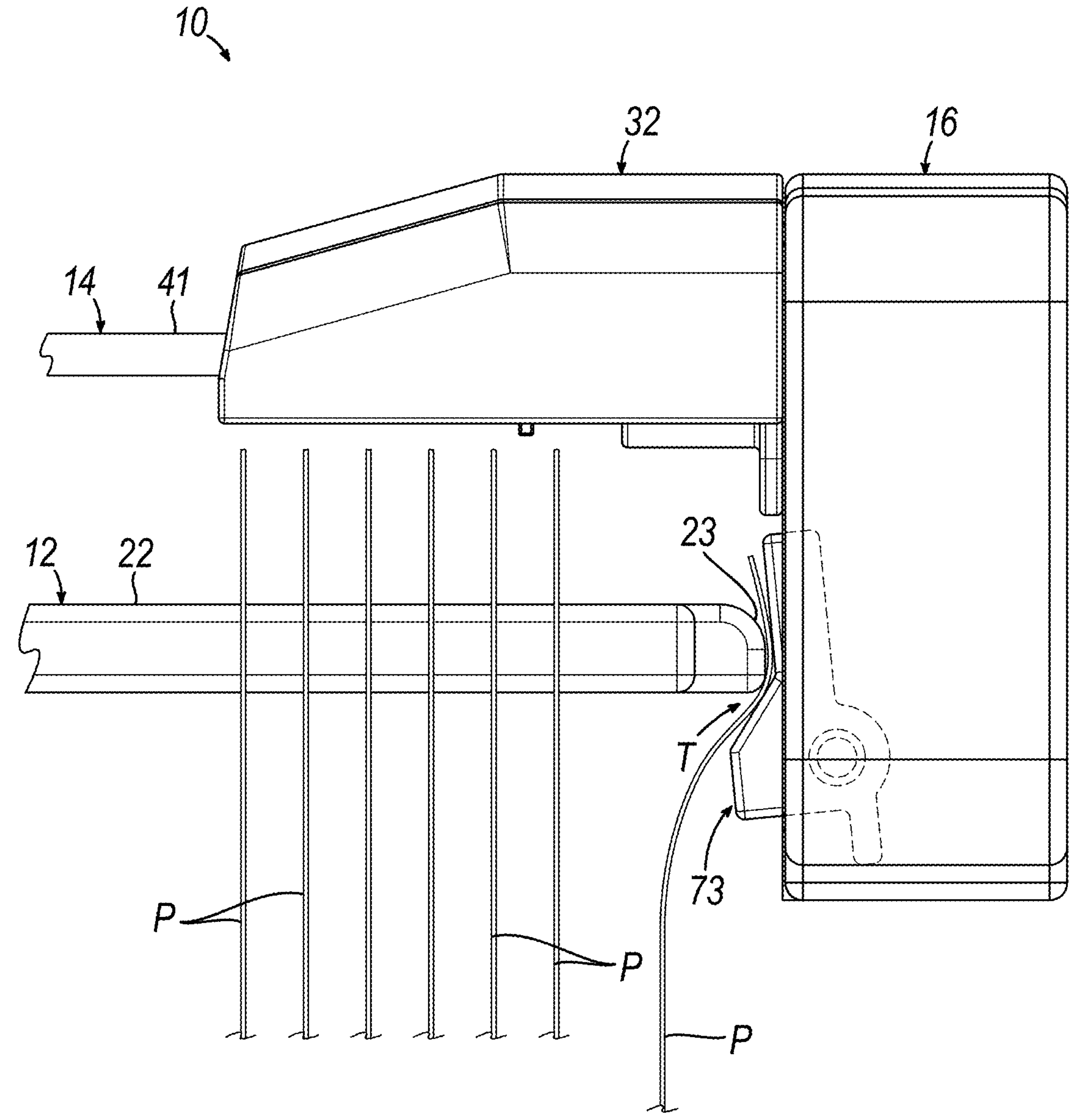
FIG. 32B depicts a side elevation view of the card holder of FIG. 1, showing one of the cards being removed from the card holder.

Referring now to FIGS. 32A-32D, in an example of a method of use, a plurality of products (P) may initially be supported by hanger (22), as shown in FIG. 32A. A single product (P) may then be slid forwardly along hanger (22) toward front end (23) and pulled downwardly such that the product (P) cammingly engages second rear surface (92) of paddle (73) to thereby pivot paddle (73) from the blocking position toward the releasing position for releasing the product (P) from card holder (10), as shown in FIG. 32B. In the example shown, when paddle (73) is in the releasing position, the throat (T) is sufficiently large and/or sufficiently direct to permit the passage of a single product (P) therethrough, while still being sufficiently small and/or sufficiently tortuous to prevent the passage of multiple products (P) therethrough to inhibit bulk removal of products (P). In the example shown, when paddle (73) is in the releasing position, the throat (T) is configured such that each product (P) bends at least slightly during removal of the product (P). In some versions, when paddle (73) is in the releasing position, the throat (T) may be configured such that each product (P) does not bend during removal of the product (P), or such that each product (P) bends during removal of the product (P) to a lesser degree than that shown in FIG. 32B. Paddle (73) may then resiliently return to the blocking position as shown in FIG. 32A to prevent unauthorized loading of products (P) onto card holder (10).

Figure 32C:
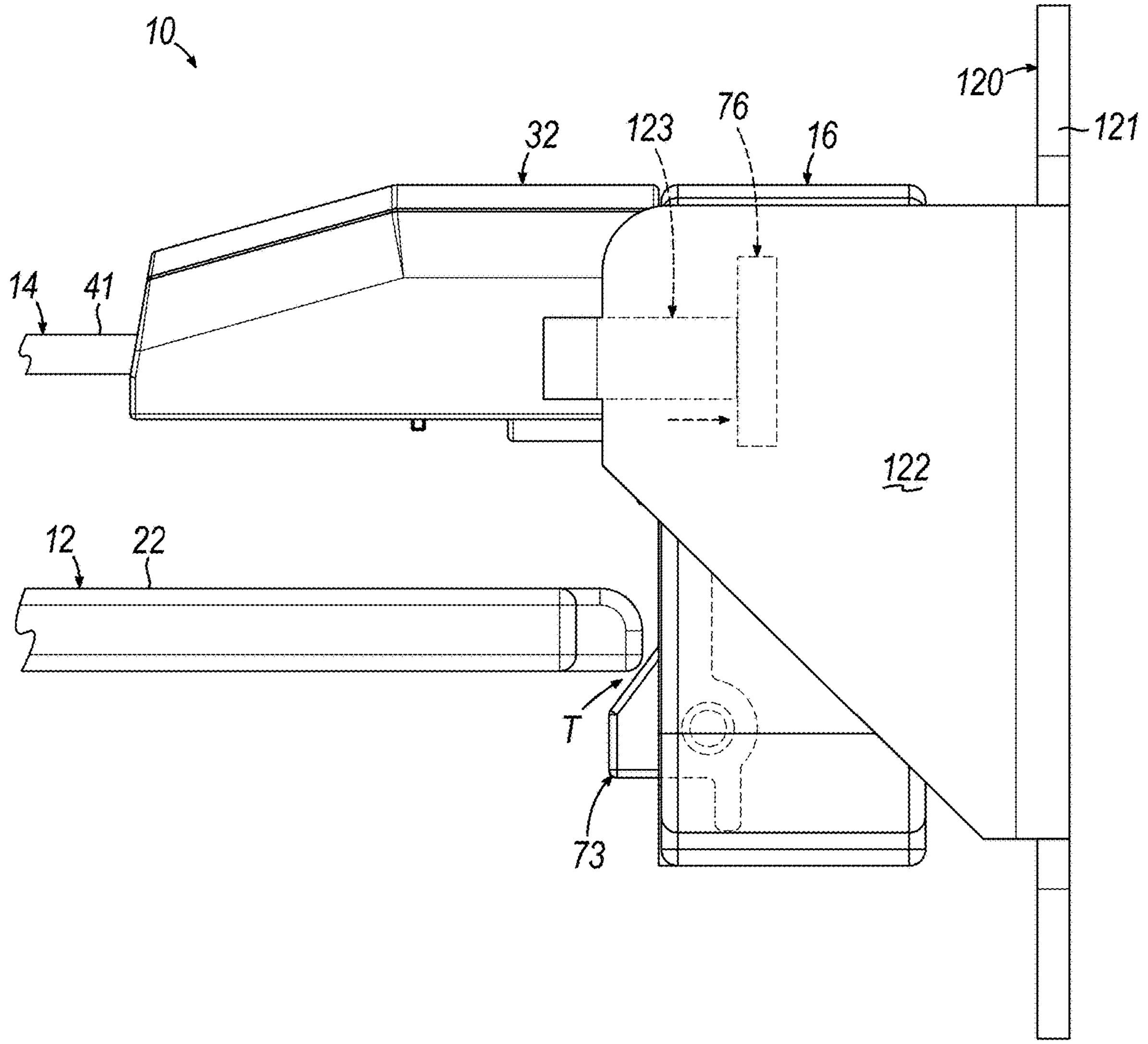
FIG. 32C depicts a side elevation view of the card holder of FIG. 1, showing the security key of FIG. 30 engaged with the head cartridge to unlock the card holder.
Figure 32D:
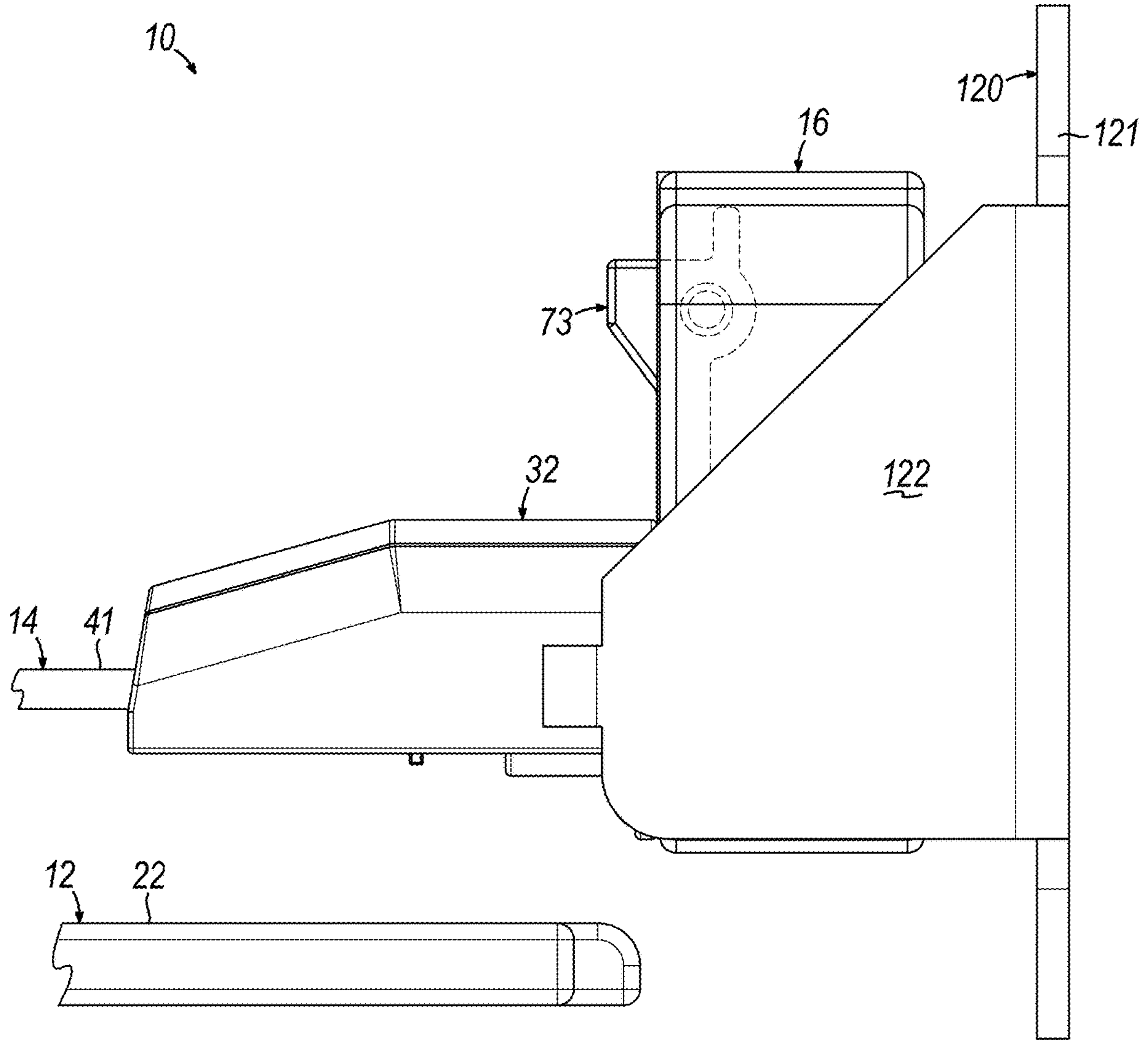
FIG. 32D depicts a side elevation view of the card holder of FIG. 1, showing the security key of FIG. 30 and the head cartridge rotated to the loading position.
Figure 33:
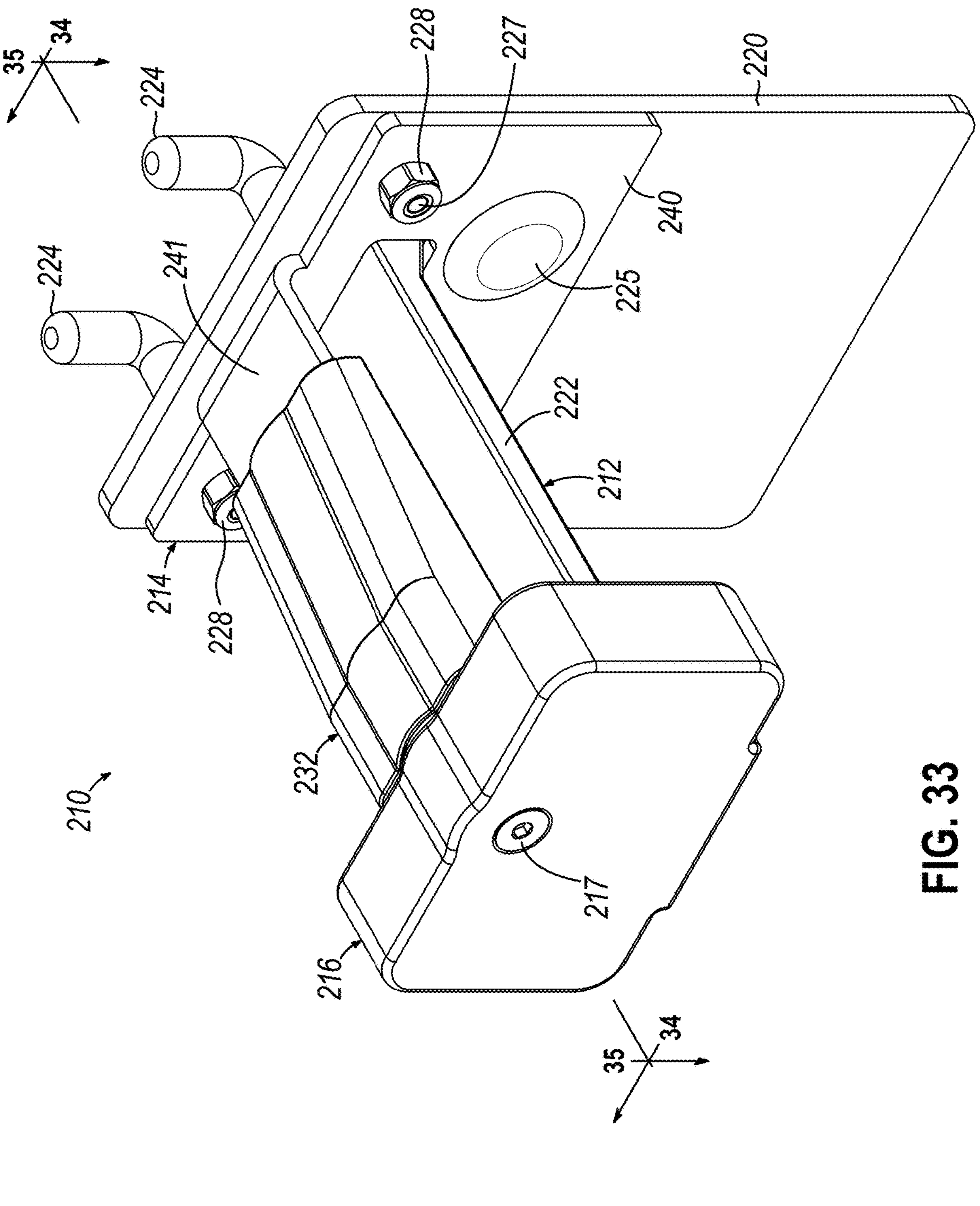
FIG. 33 depicts a front perspective view of another example of a card holder.
Figure 34A:
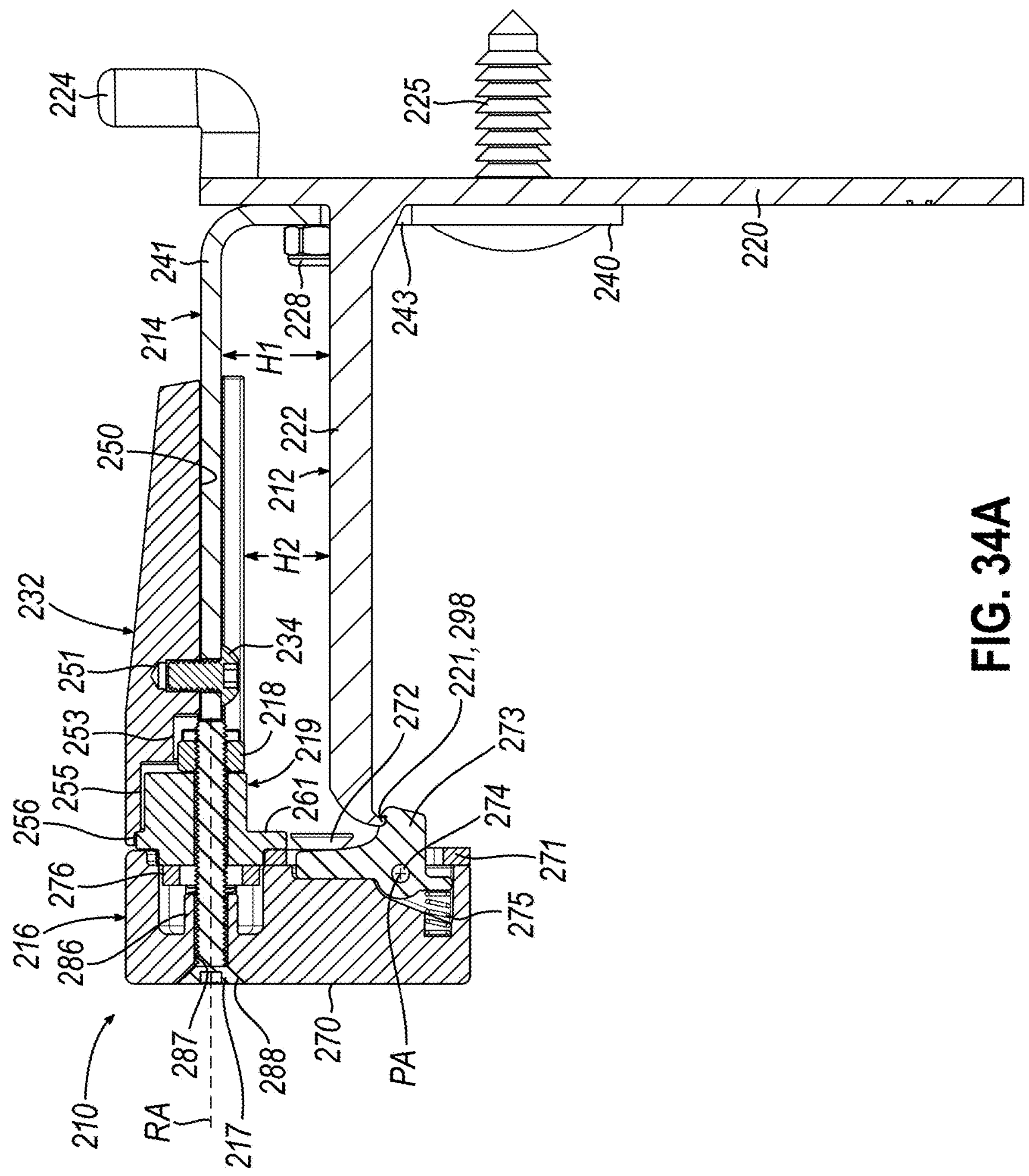
FIG. 34A depicts a cross-sectional side view of the card holder of FIG. 33, taken along line 34-34 in FIG. 33, showing a paddle of the card holder in a product-blocking position.
Figure 34B:
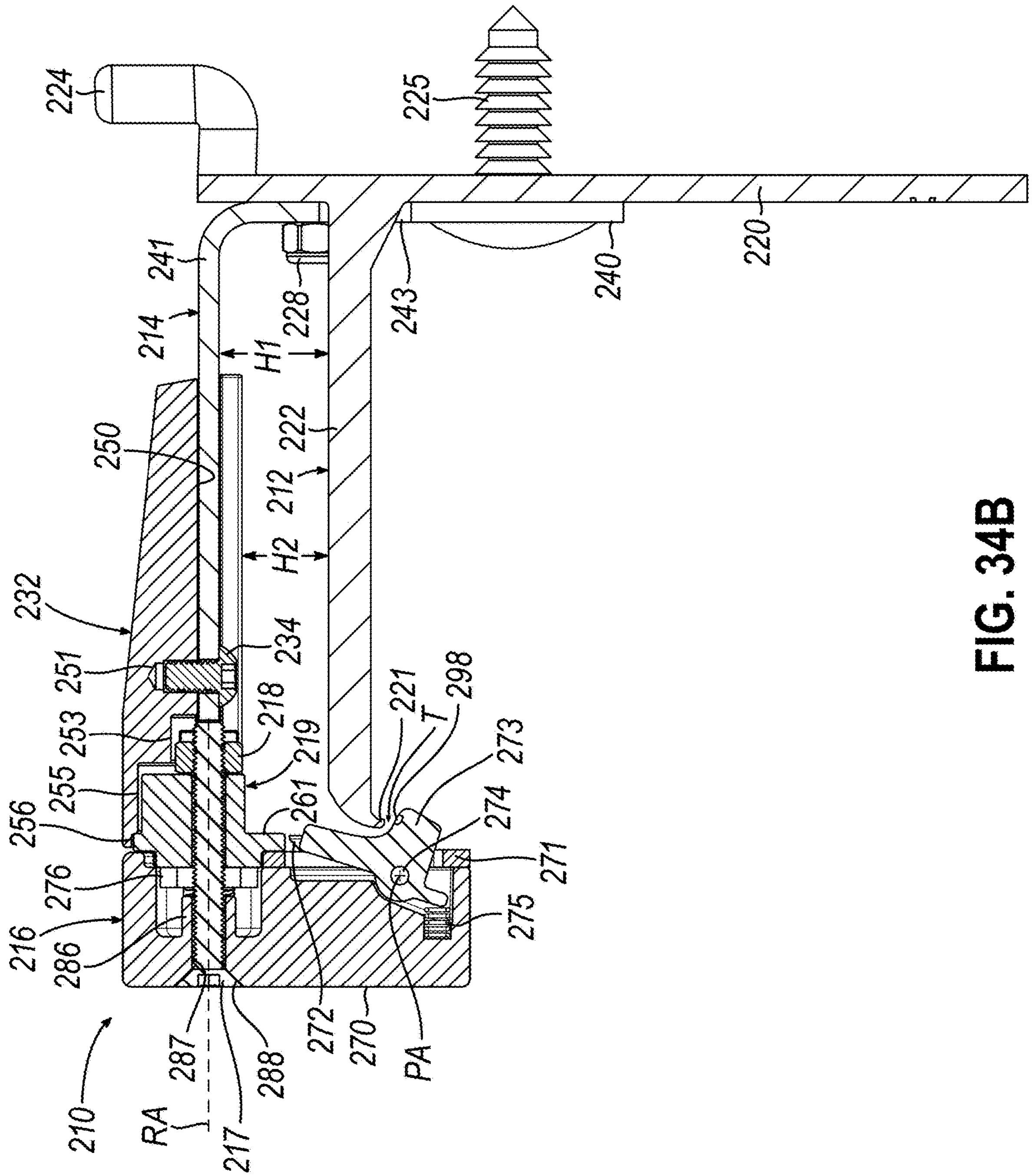
FIG. 34B depicts a cross-sectional side view of the card holder of FIG. 33, taken along line 34-34 in FIG. 33, showing the paddle in a product-releasing position.
Figure 35A:
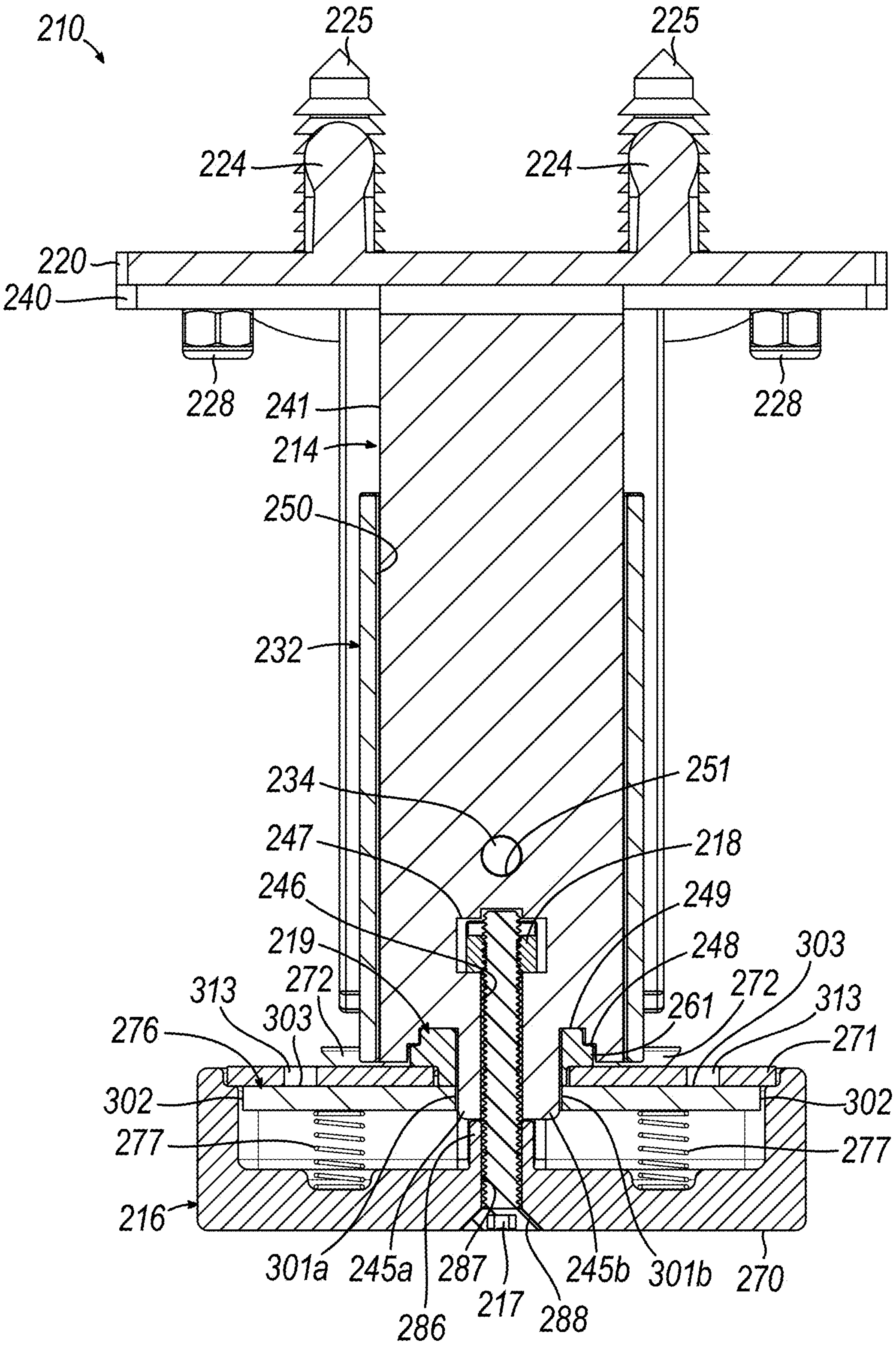
FIG. 35A depicts a cross-sectional top view of the card holder of FIG. 33, taken along line 35-35 in FIG. 33, showing a locking plate of the card holder in a locked position.
Figure 35B:
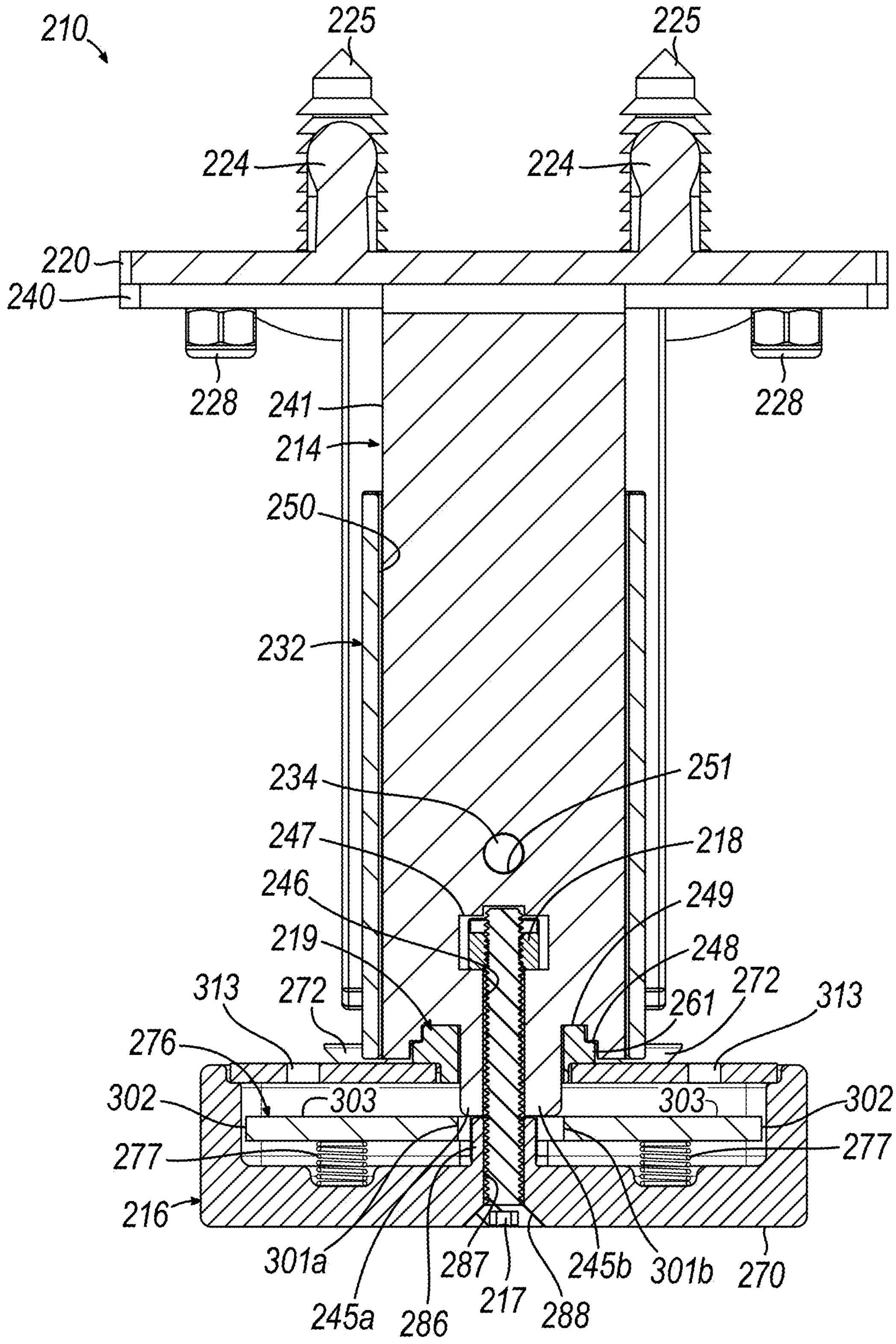
FIG. 35B depicts a cross-sectional top view of the card holder of FIG. 33, taken along line 35-35 in FIG. 33, showing the locking plate in an unlocked position.

When the merchandiser desires to load products (P) onto card holder (10), such as after depletion of products (P) from card holder (10), security key (120) may be engaged with card holder (10) while head cartridge (16) is initially in the active position to thereby slide locking plate (76) from the locked position to the unlocked position, as shown in FIG. 32C. Head cartridge (16) may then be rotated from the active position to the inactive position for enabling the merchandiser to load products (P) onto hanger (22), as shown in FIG. 32D. Head cartridge (16) may then be rotated from the inactive position back to the active position shown in FIG. 32C, and security key (120) may be removed from card holder (10) to permit locking plate (76) to resiliently return to the locked position.

B. Second Example of Anti-Tamper Card Holder

FIGS. 33-46 depict another example of a card holder (210) and associated components that may provide at least some, if not all, of the features and functionalities described above. Card holder (210) may be similar to card holder (10) described above, except as otherwise described below. In this regard, as shown in FIGS. 33-36, card holder (210) of the present example includes a hook body (212), a bracket assembly (214), and a head cartridge (216). Head cartridge (216) of the present example is rotatably coupled to bracket assembly (214) via a bolt (217) that is equipped with a locknut (218) and that is at least partially held within a bolt retainer (219), such that head cartridge (216) is rotatable about a rotation axis (RA) (e.g., defined by bolt (217)) between an active position and an inactive position. When in the active position, head cartridge (216) is disposed in front of hook body (212) such that an adjustable throat (T) is defined therebetween. When in the inactive position, head cartridge (216) is vertically offset from (e.g., above) the front of hook body (212) such that sufficient clearance is provided between head cartridge (216) and hook body (212) to allow unencumbered loading of products (P) onto hook body (212). Head cartridge (216) is configured to be selectively locked in the active position to prevent unauthorized rotation of head cartridge (216) from the active position to the inactive position. In the example shown, head cartridge (216) may not be locked in the inactive position.

Figure 36:
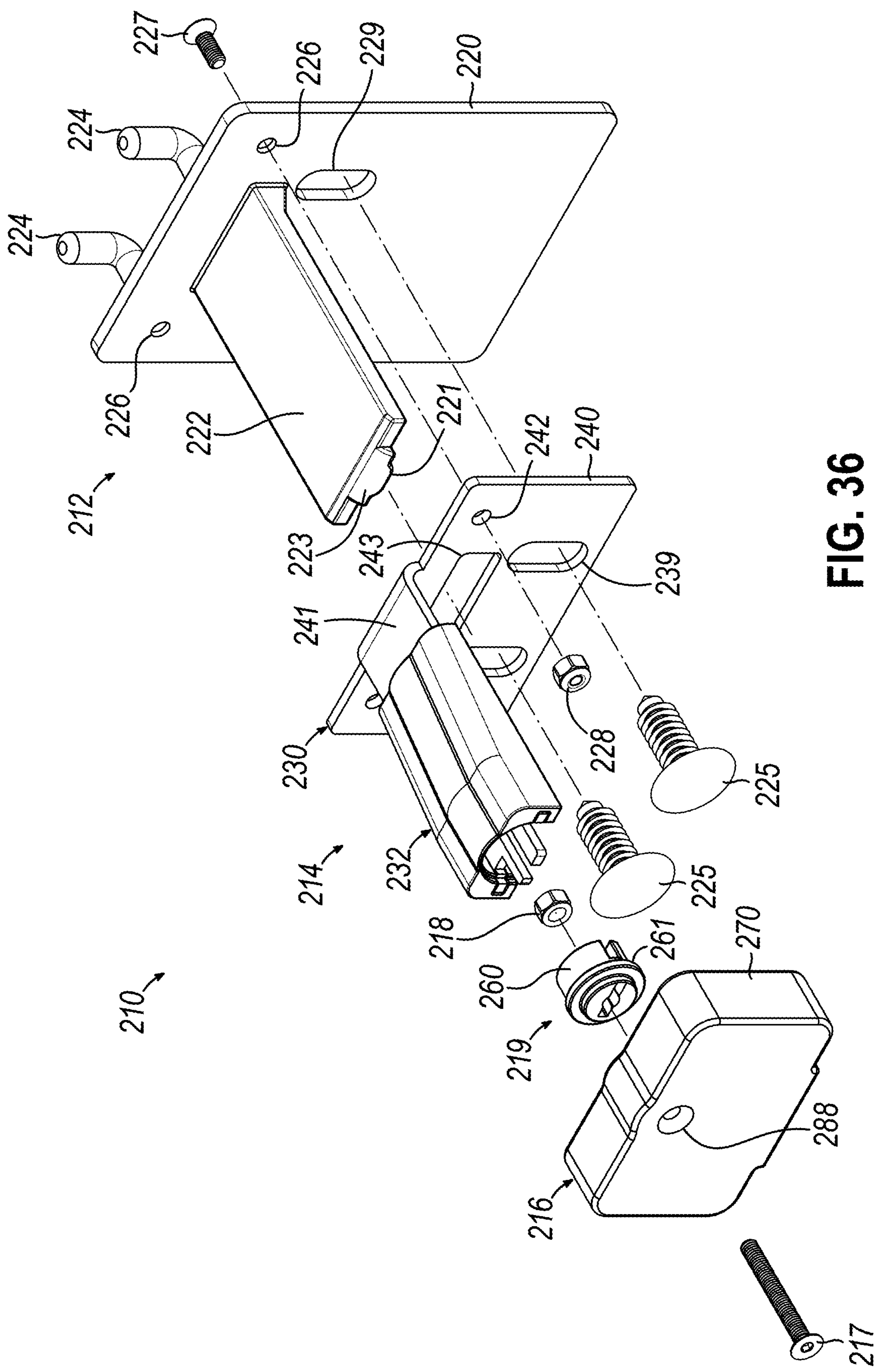
FIG. 36 depicts an exploded perspective view of the card holder of FIG. 33.

As shown in FIG. 36, hook body (212) of the present example includes a substantially flat baseplate (220) and a hanger (222) extending forwardly from baseplate (220) to a front end (223). In the example shown, front end (223) includes a detent in the form of a downwardly-extending ridge (221) configured to be selectively received within a corresponding portion of head cartridge (216), as described in greater detail below. Hook body (212) also includes a pair of pegs (224) extending rearwardly and/or upwardly relative to baseplate (220) for receipt within corresponding holes of a pegboard (not shown) of the fixture for mounting card holder (210) to the fixture. In the example shown, hook body (212) also includes a pair of upper bores (226) each extending through baseplate (220) and configured to receive respective fasteners in the form of screws (227) for facilitating secure attachment of bracket assembly (214) to hook body (212) via respective nuts (228); and a pair of lower slots (229) each extending through baseplate (220) and configured to receive respective fasteners in the form of Christmas tree clips (225) for facilitating secure attachment of hook body (212) to the fixture. In the example shown, the throat (T) is defined between front end (223) of hanger (222) and a portion of head cartridge (216), as described in greater detail below.

Figure 37:
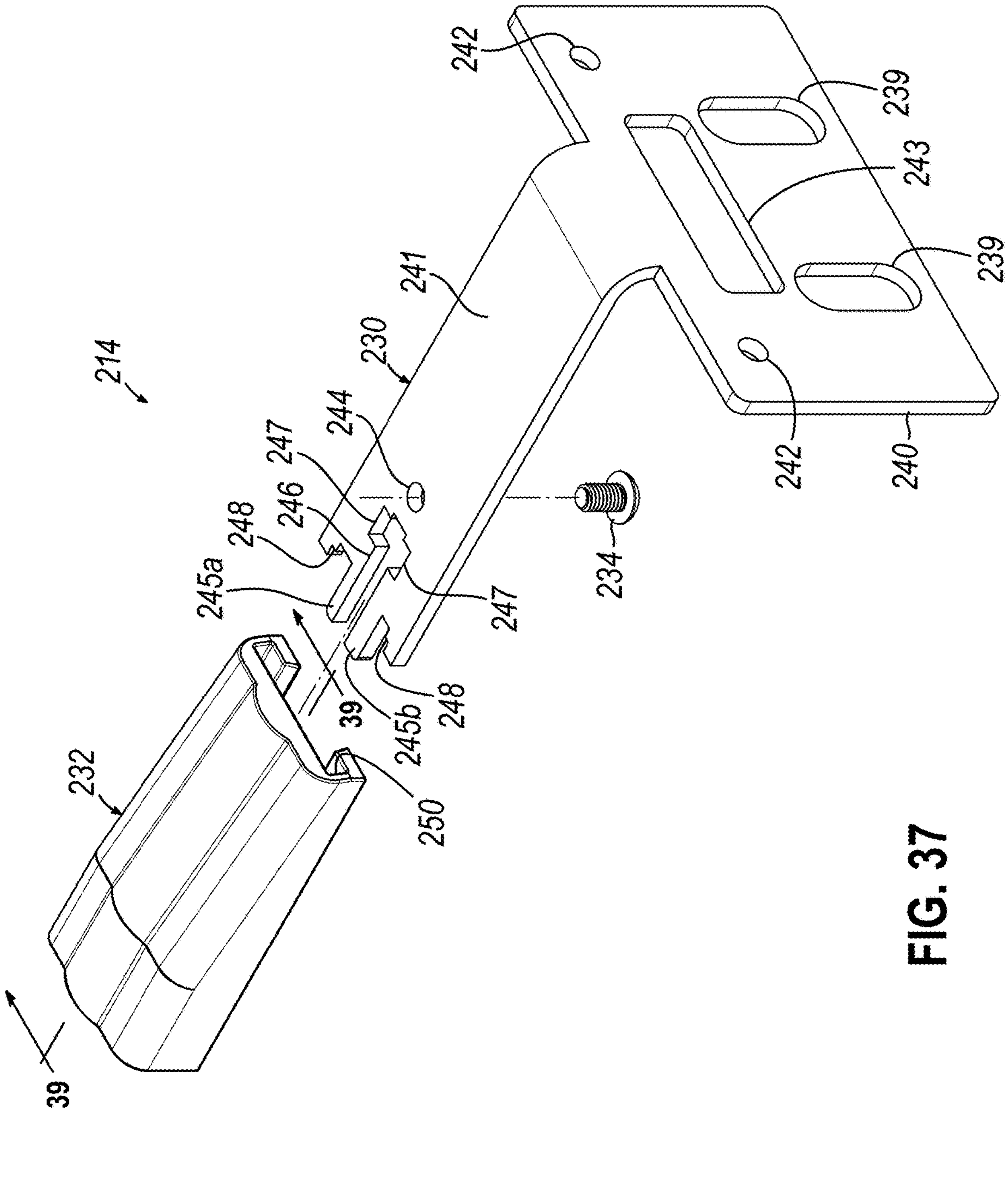
FIG. 37 depicts an exploded perspective view of a bracket assembly of the card holder of FIG. 33.

As shown in FIGS. 36 and 37, bracket assembly (214) of the present example includes a bracket (230) and a bracket cover (232) securely coupled to each other via a fastener in the form of a screw (234).

Figure 38:
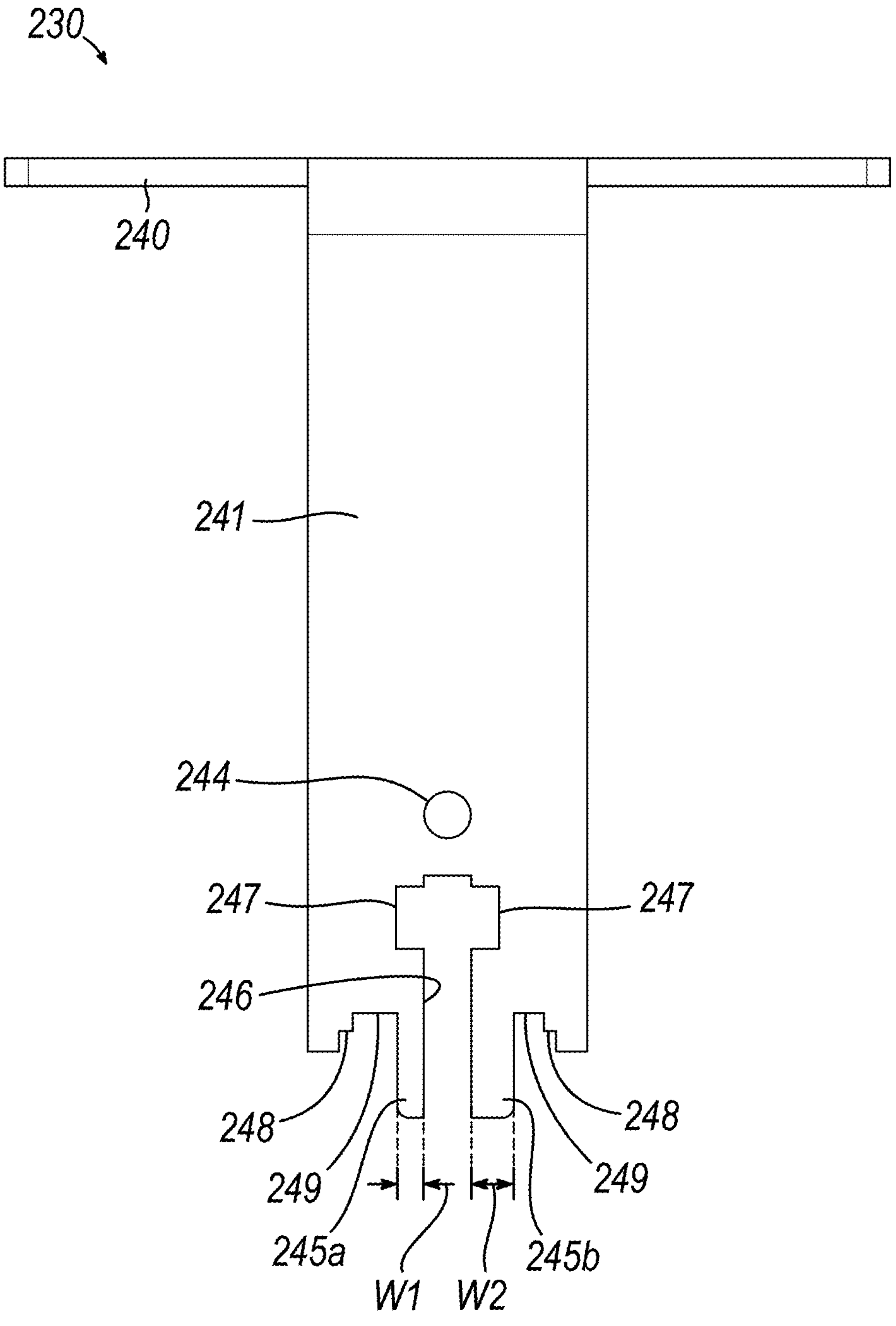
FIG. 38 depicts a top plan view of a bracket of the bracket assembly of FIG. 37.

As shown in FIG. 38, bracket (230) of the present example includes a substantially flat baseplate (240) and an elongate support plate (241) extending forwardly from baseplate (240). In the example shown, bracket (230) includes a pair of bores (242) each extending through baseplate (240) and configured to receive respective screws (227) for facilitating secure attachment of bracket assembly (214) to hook body (212) via respective nuts (228); an aperture (243) extending through baseplate (240) that is sized and configured to receive hanger (222) of hook body (212); and a pair of lower slots (239) each extending through baseplate (240) and configured to receive respective Christmas tree clips (225) for facilitating secure attachment of bracket (230) to the fixture. Bracket (230) also includes a bore (244) extending through support plate (241) and configured to receive screw (234) for facilitating secure attachment of bracket cover (232) to bracket (230). Support plate (241) of the present example defines a pair of front rails (245*a*, 245*b*) spaced apart from each other by a central slot (246) that is sized and configured to accommodate a rear portion of bolt (217). In the example shown, the pair of front rails (245*a*, 245*b*) includes a first front rail (245*a*) having a first width (W1), and a second front rail (245*b*) having a second width (W2) different from (e.g., greater than) the first width (W1), such that front rails (245*a*, 245*b*) are asymmetrical relative to central slot (246). As described in greater detail below, the asymmetrical configuration of front rails (245*a*, 245*b*) may prevent head cartridge (216) from being locked in the inactive position. A pair of lateral slots (247) extend laterally outwardly from central slot (246) and are sized and configured to accommodate locknut (218). In some versions, lateral slots (247) may be sized and shaped relative to locknut (218) such that interaction between the flats of locknut and the edges of lateral slots (247) inhibits rotation of locknut (218) about the rotation axis (RA). Bracket (230) of the present example also includes a pair of front recesses (248) and a pair of rear recesses (249).

Figure 39:
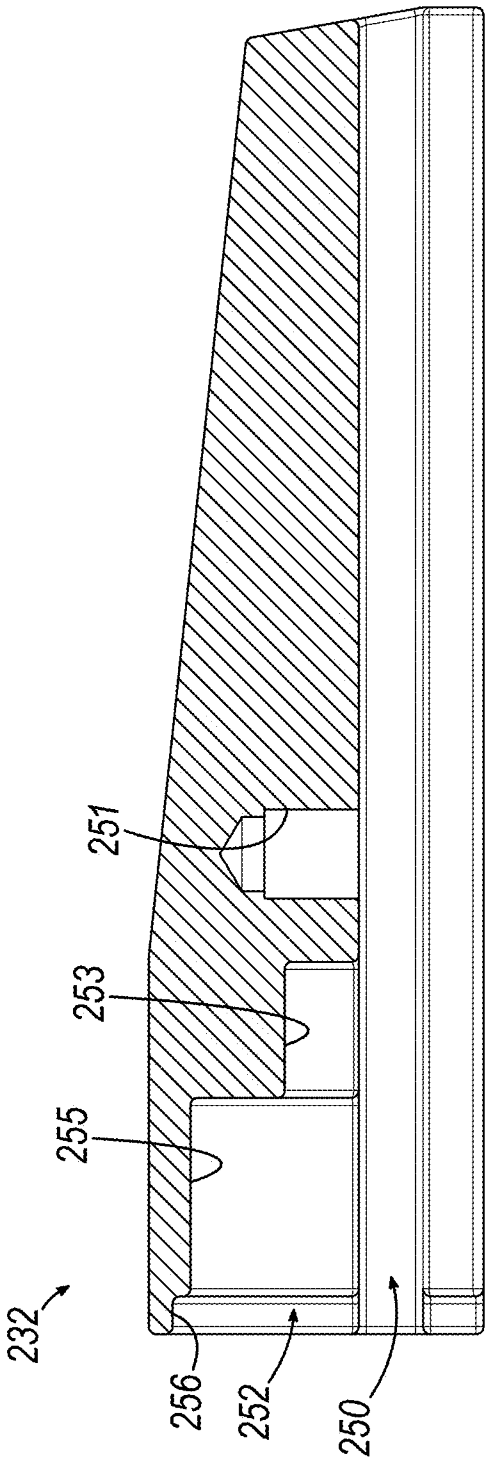
FIG. 39 depicts a cross-sectional side view of a bracket cover of the bracket assembly of FIG. 37, taken along line 39-39 in FIG. 37.

As shown in FIG. 39, bracket cover (232) of the present example includes an elongate slot (250) extending horizontally through bracket cover (232), from a front end of bracket cover (232) to a rear end of bracket cover (232), and configured to slidably receive at least a front portion of support plate (241). Bracket cover (232) also includes a threaded bore (251) extending upwardly from slot (250), and configured to receive screw (234) for facilitating secure attachment of bracket cover (232) to bracket (230). Bracket cover (232) of the present example also includes a multistage bore (252) extending rearwardly from the front end of bracket cover (232), and including a generally semi-cylindrical rear portion (253) sized and configured to accommodate locknut (218); a generally semi-cylindrical intermediate portion (255) sized and configured to accommodate a portion of bolt retainer (219); and a generally semi-cylindrical front portion (256) sized and configured to accommodate another portion of bolt retainer (219). As shown, front portion (256) is wider than intermediate portion (255), and intermediate portion (255) is wider than rear portion (253).

In the example shown, a lower surface of support plate (241) is spaced apart from an upper surface of hanger (222) by a first height (H1), and a lower surface of bracket cover (232) is spaced apart from the upper surface of hanger (222) by a second height (H2) that is less than the first height (H1), such that bracket cover (232) may limit the amount of vertical clearance provided above hanger (222). In some instances, the second height (H2) may be selected based on a distance between the hanger slot of the products (P) (or their packaging) and the top of the products (P) (or their packaging). For example, the second height (H2) may be selected to be only slightly greater than the distance between the hanger slot of the products (P) (or their packaging) and the top of the products (P) (or their packaging), such that when the hanger slots of multiple products (P) (or their packaging) receive hanger (222), the tops of at least some products (P) (or their packaging) may be positioned immediately below the lower surface of bracket cover (232). Thus, any attempt to deflect (e.g., bend) front end (223) of hanger (222) upwardly would cause the tops of at least some products (P) (or their packaging) to engage the lower surface of bracket cover (232), thereby resisting such deflection. In this manner, the interaction between bracket cover (232) and the products (P) that are hanging from hanger (222) may deter any attempts to circumvent head cartridge (216) by manipulating the throat (T) via upward deflection of front end (223) of hanger (222). Bracket cover (232) of the example shown has an increased length, at least relative to bracket cover (32) described above, such that the rear end of bracket cover (232) is substantially close to baseplate (240). It will be appreciated that the increased length of bracket cover (232) may enhance the ability of the products (P) that are hanging from hanger (222) to inhibit pinching of hanger (222) and support plate (241) toward each other.

Figure 40:
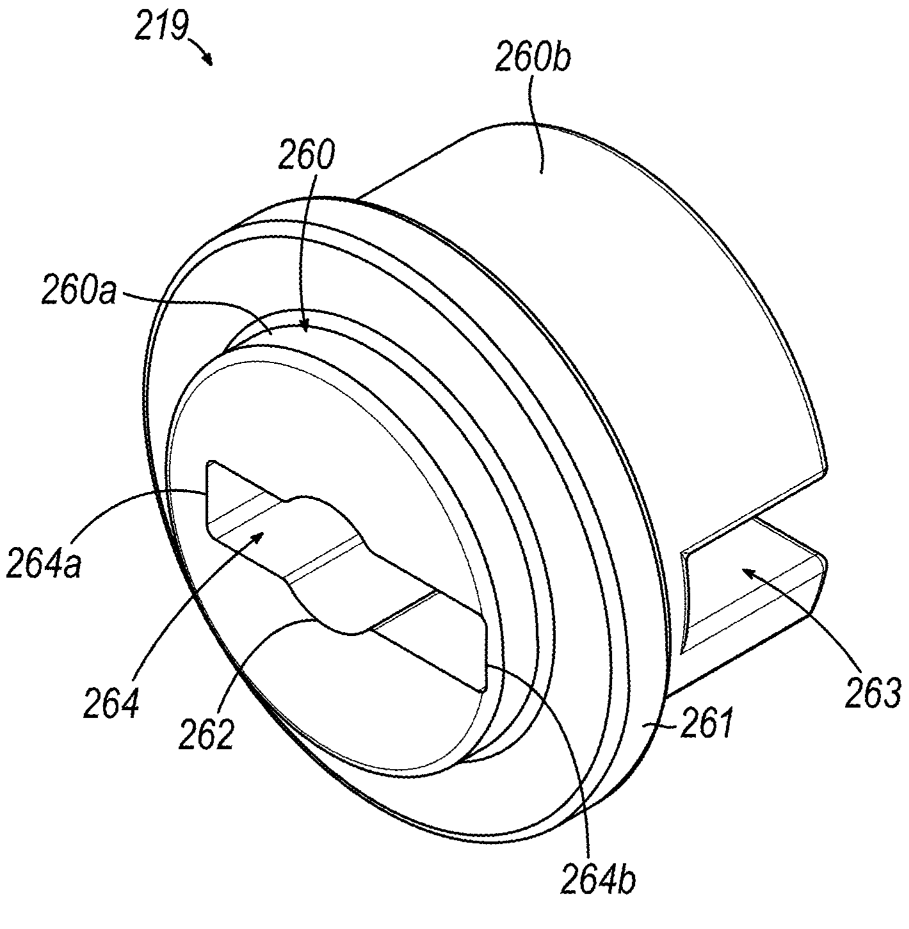
FIG. 40 depicts a perspective view of a pin retainer of the card holder of FIG. 33.
Figure 41:
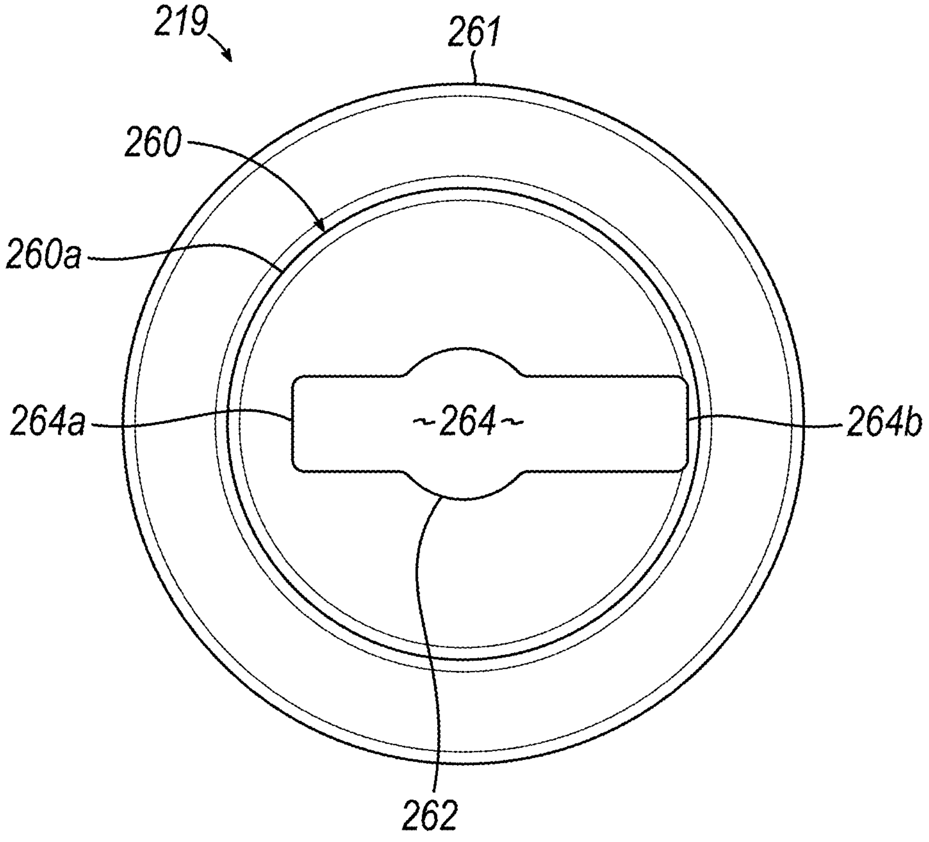
FIG. 41 depicts a front elevation view of the pin retainer of FIG. 40.

As shown in FIGS. 40 and 41, bolt retainer (219) of the present example includes a generally cylindrical body (260) having a front portion (260*a*) that is configured to be at least partially received within a corresponding portion of head cartridge (216); a rear portion (260*b*) that is configured to be at least partially received within rear recesses (249) of bracket (230), and that is further configured to be at least partially received within intermediate portion (255) of bore (252) of bracket cover (232); and a flange (261) extending radially outwardly from the front portion (260*a*) of body (260) and configured to be at least partially received within front recesses (248) of bracket (230), and further configured to be at least partially received within front portion (256) of bore (252) of bracket cover (232), such that flange (261) is configured to be sandwiched between a rear surface of front portion (256) of bore (252) and a rear surface of head cartridge (216). Bolt retainer (219) also includes a central bore (262) extending through body (260) and configured to receive bolt (217). Bolt retainer (219) of the present example also includes a rear slot (263) extending laterally across a rear portion of body (260) and configured to receive respective portions of support plate (241) of bracket (230) (e.g., such that a front end of rear slot (263) seats against a rear surface of rear recess (249)); and a front slot (264) extending laterally outwardly from either side of central bore (262) and configured to receive rails (245*a*, 245*b*) of bracket (230), such that bolt retainer (219) may be fixed against rotation relative to bracket (230). In the example shown, front slot (264) includes first and second slot portions (264*a*, 264*b*) having different widths from each other, such that first slot portion (264*a*) is configured to receive first front rail (245*a*), while second slot portion (264*b*) is configured to receive second front rail (245*b*).

Figure 42:
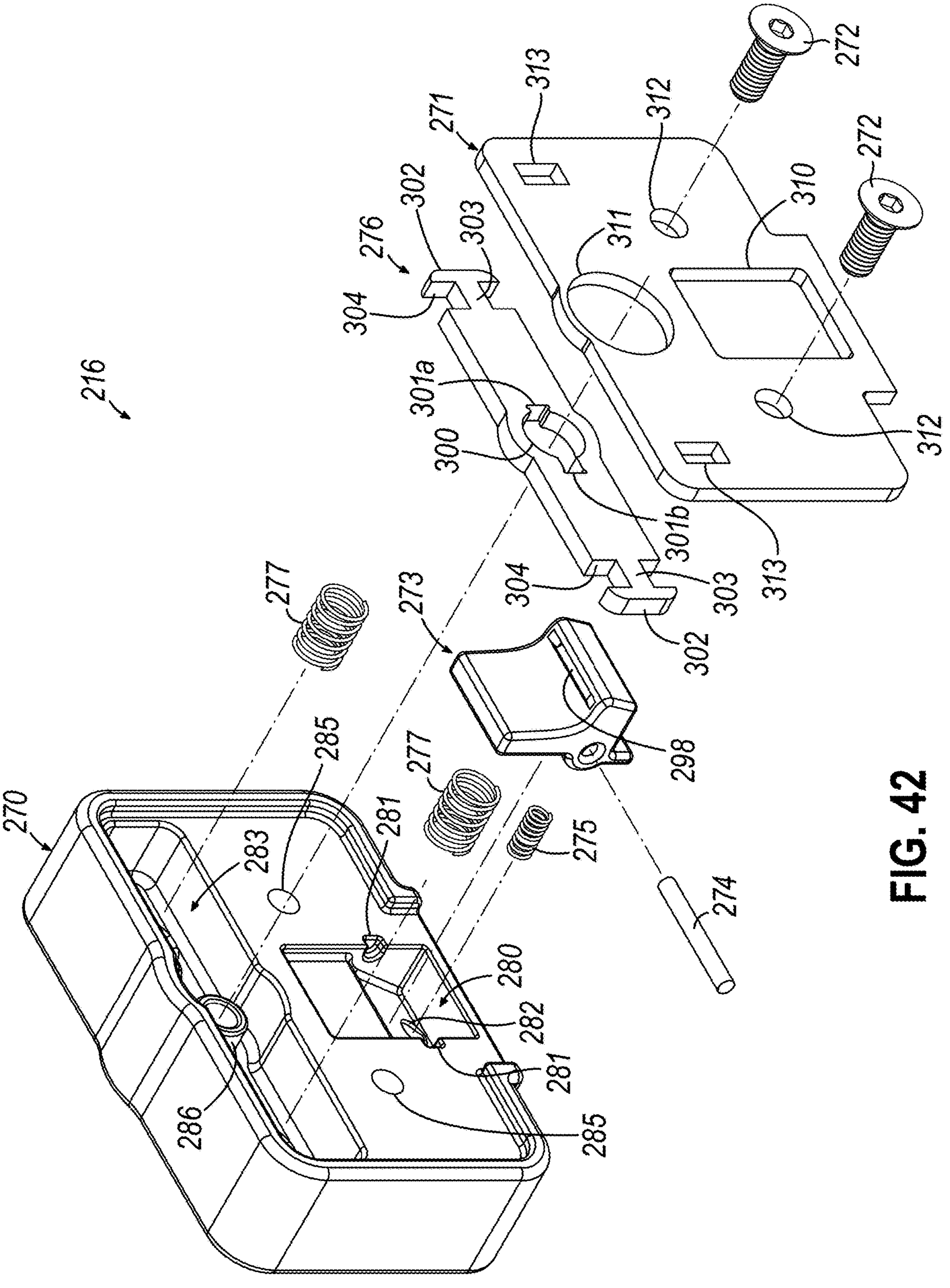
FIG. 42 depicts an exploded perspective view of a head cartridge of the card holder of FIG. 33.

As shown in FIG. 42, head cartridge (216) of the present example includes a housing (270) and a back plate (271) securely coupled to each other via a pair of fasteners in the form of screws (272). Head cartridge (216) also includes a gate in the form of a paddle (273) pivotably coupled to housing (270) via a substantially cylindrical rod (274), such that paddle (273) is pivotable about a pivot axis (PA) (e.g., defined by rod (274)) between a product-blocking position (see FIG. 34A) and a product-releasing position (see FIG. 34B); and a resilient biasing member in the form of a compression spring (275) configured to resiliently bias paddle (273) toward the blocking position. Head cartridge (216) of the present example further includes a lock in the form of a locking plate (276) slidably coupled to housing (270) such that locking plate (276) is slidable between a rearward, locked position (see FIG. 35A) and a forward, unlocked position (see FIG. 35B); and a pair of resilient biasing members in the form of compression springs (277) configured to resiliently bias locking plate (276) toward the locked position (e.g., in a rearward direction).

As shown in FIG. 42, housing (270) of the present example includes a paddle receptacle (280) configured to at least partially receive paddle (273) and to permit pivoting of paddle (273) therein relative to rod (274); a pair of laterally-opposed rod mounts (281) extending laterally outwardly from receptacle (280) and configured to receive respective ends of rod (274); and a bore (282) extending forwardly from receptacle (280) and configured to receive spring (275). Housing (270) also includes a locking plate receptacle (283) configured to receive locking plate (276) and to permit translation of locking plate (276) therein in a forward and/or rearward direction; and a pair of bores (284) extending forwardly from receptacle (283) and configured to receive respective springs (277). Housing (270) of the present example further includes a pair of threaded bores (285) extending forwardly from a rear surface of housing (270) and configured to receive respective screws (272) for facilitating secure attachment of back plate (271) to housing (270). Housing (270) also includes a collar (286) extending rearwardly from a front end of locking plate receptacle (283) and configured to be slidably received by a corresponding portion of locking plate (276) (e.g., at least when in the unlocked position). In some versions, a rear end of collar (286) may be configured to confront and/or abut front ends of rails (245*a*, 245*b*). Collar (286) at least partially defines a bore (287) configured to receive bolt (217). In the example shown, housing (270) also includes a countersink (288) extending rearwardly from a front surface of housing (270) to bore (287) and configured to receive a head of bolt (217).

Figure 43:
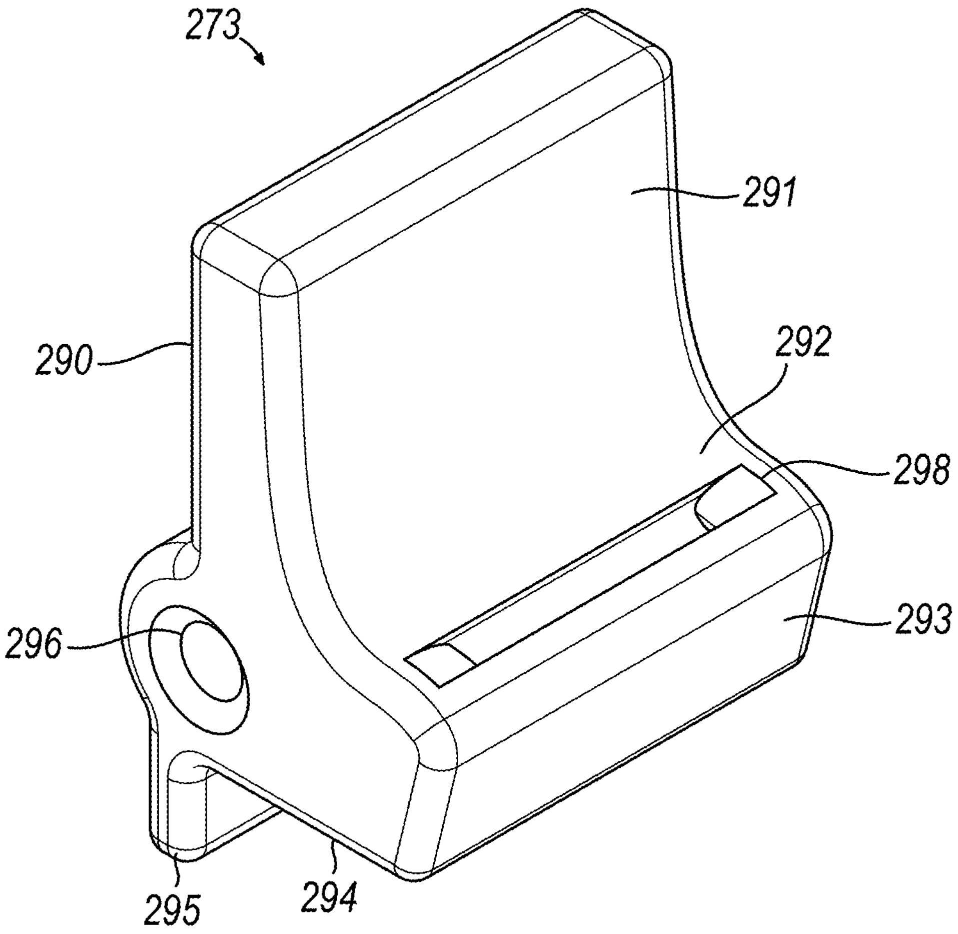
FIG. 43 depicts a perspective view of a paddle of the head cartridge of FIG. 42.

As shown in FIG. 43, paddle (273) of the present example includes a generally vertical front surface (290), a generally vertical first rear surface (291), a curved second rear surface (292) extending downwardly and rearwardly from first rear surface (291), a generally vertical third rear surface (293) extending downwardly from second rear surface (292), a lower surface (294) extending forwardly from a lower end of third rear surface (293), and a lower tab (295) extending downwardly from lower surface (294). Paddle (273) also includes a bore (296) configured to receive rod (274). In the example shown, paddle (273) further includes an indent in the form of a groove (298) extending downwardly from second rear surface (292) and configured to receive ridge (221) when paddle (273) is the blocking position.

In this regard, first and/or second rear surfaces (291, 92) may cooperate with ridge (221) of front end (223) of hanger (222) to at least partially define the throat (T) between head cartridge (216) and hook body (212). The distance(s) between ridge (221) of front end (223) of hanger (222) and first and/or second rear surfaces (291, 92) of paddle (273) may vary based on the angular position of paddle (273) about the pivot axis (PA), such that the configuration (e.g., size and/or shape) of the throat (T) may likewise vary based on the angular position of paddle (273) about the pivot axis (PA) to thereby vary the degree to which the throat (T) is constricted. For example, when paddle (273) is in the blocking position, ridge (221) may be received within groove (298), such that the throat (T) may be substantially fully closed off to prevent the passage of a product (P) therethrough; and when paddle (273) is in the releasing position, the distance(s) between ridge (221) of front end (223) of hanger (222) and first and/or second rear surfaces (291, 92) of paddle (273) may be at least slightly greater than a thickness of a product (P) while being less than a combined thickness of more than one product (P), such that the throat (T) may be sufficiently large to permit the passage of a single product (P) therethrough while still being sufficiently small to prevent the passage of multiple products (P) therethrough.

In some versions, ridge (221) and groove (298) may be sized and shaped relative to each other such that ridge (221)

is in contact (or near contact) with a lower surface of groove (298) when paddle (273) is in the blocking position. Thus, any attempt to deflect (e.g., bend) front end (223) of hanger (222) downwardly would cause the ridge (221) to bottom out against the lower surface of groove (298), thereby resisting such deflection. In this manner, the interaction between ridge (221) and groove (298) may deter any attempts to circumvent head cartridge (216) by manipulating the throat (T) via downward deflection of front end (223) of hanger (222).

Figure 44:
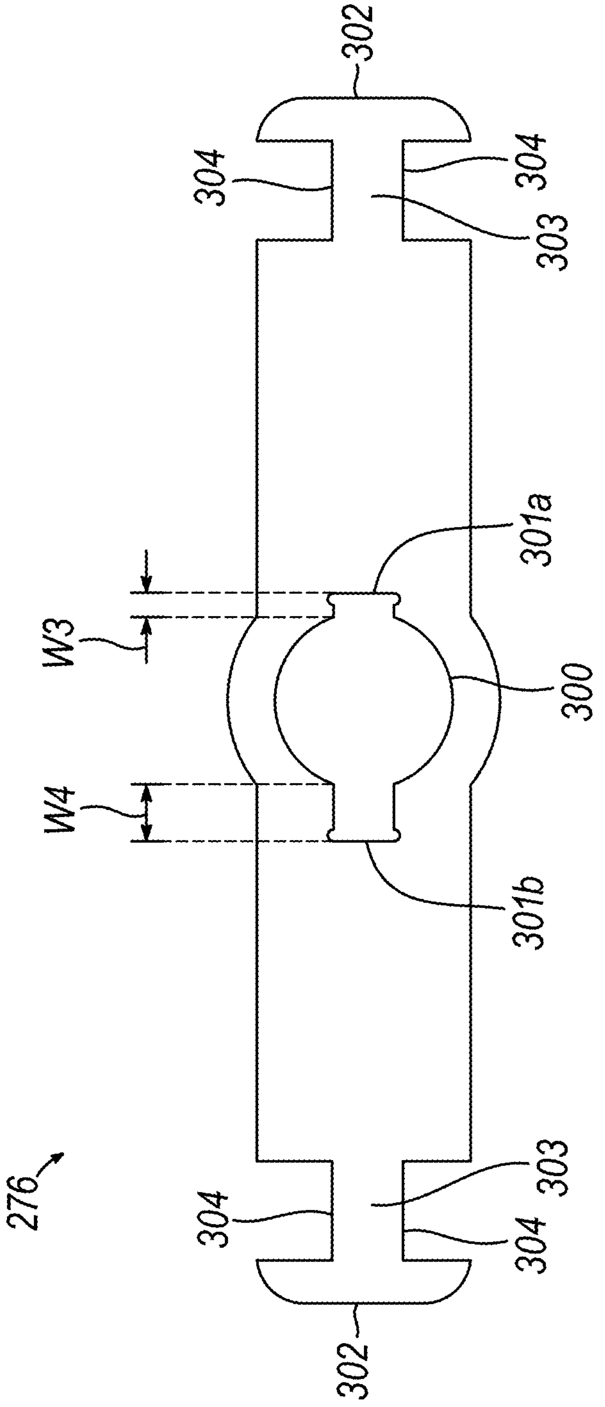
FIG. 44 depicts a front elevation view of a locking plate of the head cartridge of FIG. 42.

As shown in FIG. 44, locking plate (276) of the present example includes a central bore (300) configured to accommodate bolt (217) (e.g., when locking plate (276) is in the locked position) and collar (286) (e.g., when locking plate (276) is in the unlocked position); a pair of lateral slots (301*a*, 301*b*) extending laterally outwardly from central bore (300) and configured to slidably receive respective rails (245*a*, 245*b*) of bracket (230) when locking plate (276) is in the locked position, and configured to release the respective rails (245*a*, 245*b*) of bracket (230) when locking plate (276) is in the unlocked position; and a pair of wings (302) extending outwardly relative to bore (300) and configured to engage respective springs (277) for resiliently biasing locking plate (276) toward the locked position. Each wing (302) includes a respective rearwardly-facing actuation surface (303) configured to facilitate actuation of locking plate (276) from the locked position to the unlocked position, as described in greater detail below. Wings (302) of the present example each include a pair of cutouts (304) positioned above and below the respective actuation surfaces (303), to thereby provide each actuation surface (303) with a reduced surface area, at least relative to actuation surfaces (103) described above. It will be appreciated that the reduced surface areas of actuation surfaces (303) may increase the difficulty of engaging actuation surfaces (303) at the same time and thereby deter any attempts to unlock head cartridge (216) without security key (320) described below (e.g., “picking”).

In the example shown, the pair of lateral slots (301*a*, 301*b*) includes a first lateral slot (301*a*) having a third width (W3), and a second lateral slot (301*b*) having a fourth width (W4) different from the third width (W3), such that lateral slots (301*a*, 301*b*) are asymmetrical relative to central bore (300). In this regard, the third width (W3) of first lateral slot (301*a*) of the present example is slightly greater than the first width (W1) of first front rail (245*a*), and the fourth width (W4) of second lateral slot (301*b*) of the present example is slightly greater than the second width (W2) of second front rail (245*b*); such that first lateral slot (301*a*) is configured to receive first front rail (245*a*), while second lateral slot (301*b*) is configured to receive second front rail (245*b*). However, the third width (W3) of first lateral slot (301*a*) of the present example is substantially less than the second width (W2) of second front rail (245*b*), such that first lateral slot (301*a*) is not capable of receiving first front rail (245*a*). Thus, lateral slots (301*a*, 301*b*) may only be capable of receiving the respective rails (245*a*, 245*b*) when head cartridge (216) is in the active position, such that locking plate (276) may only be capable of translating into the locked position when head cartridge (216) is in the active position. In this manner, the asymmetrical configurations of front rails (245*a*, 245*b*) and lateral slots (301*a*, 301*b*) may prevent head cartridge (216) from being locked in the inactive position.

As shown in FIG. 42, back plate (271) of the present example includes an aperture (310) aligned with paddle receptacle (280) and configured to permit paddle (273) to extend rearwardly out of housing (270); a bore (311) aligned with collar (286) of housing (270) and central bore (300) of locking plate (276), and configured to receive front portion (260*a*) of bolt retainer (219); a pair of bores (312) aligned with bores (285) of housing (270) and configured to receive respective screws (272) for facilitating secure attachment of back plate (271) to housing (270); and a pair of apertures (313) aligned with respective actuation surfaces (303) of locking plate (276) and configured to provide limited access thereto for facilitating sliding of locking plate (276) from the locked position toward the unlocked position. In the example shown, the heads of fasteners (272) extend rearwardly relative to back plate (271) rather than being flush with back plate (271), such that the heads of fasteners (272) may further restrict the throat (T). For example, the heads of fasteners (272) may cooperate with front end (223) of hanger (222) to define respective lateral portions of the throat (T) on respective lateral sides of paddle (273)).

Figure 45:
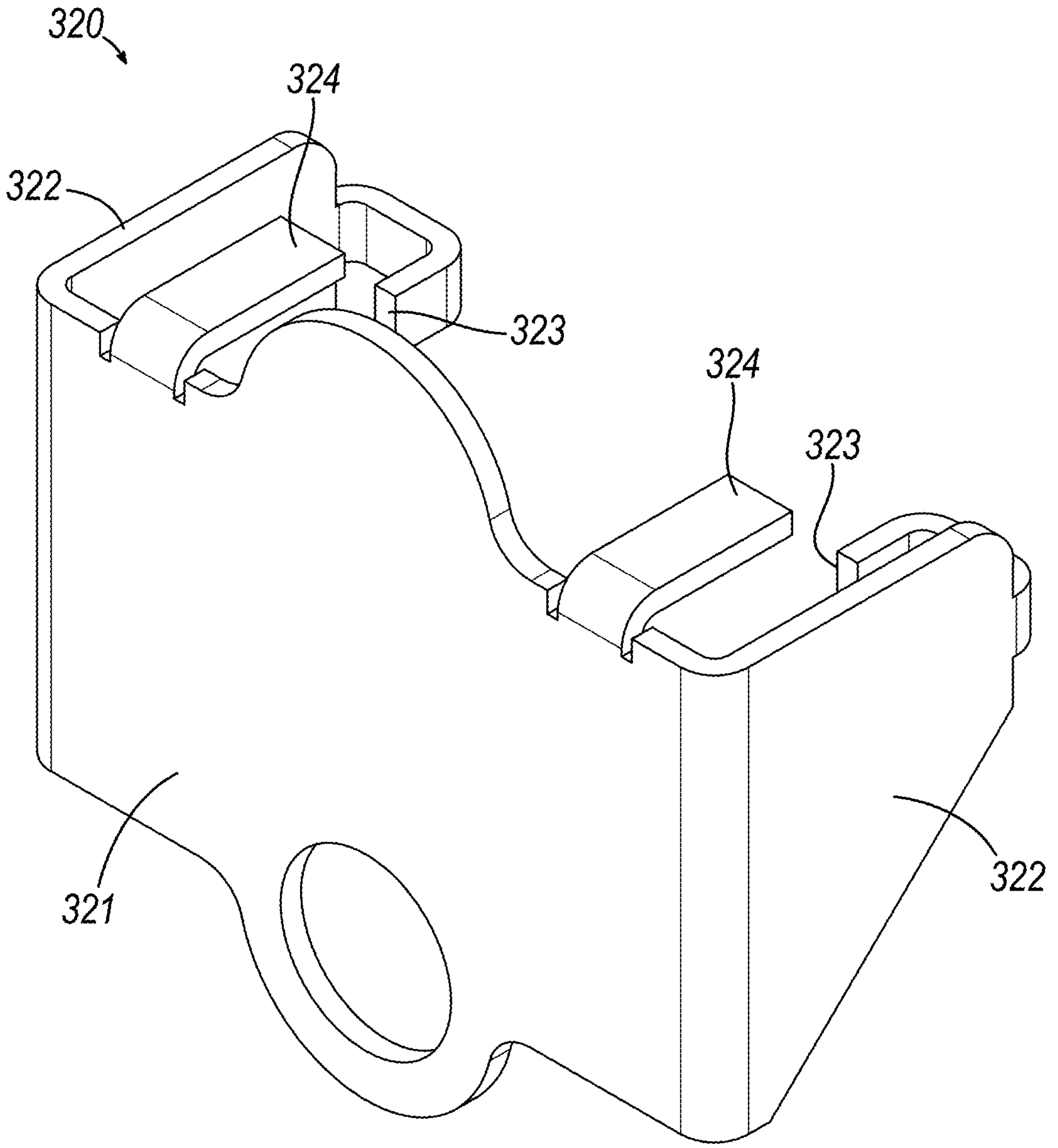
FIG. 45 depicts a perspective view of another example of a security key for use with the card holder of FIG. 33.
Figure 46:
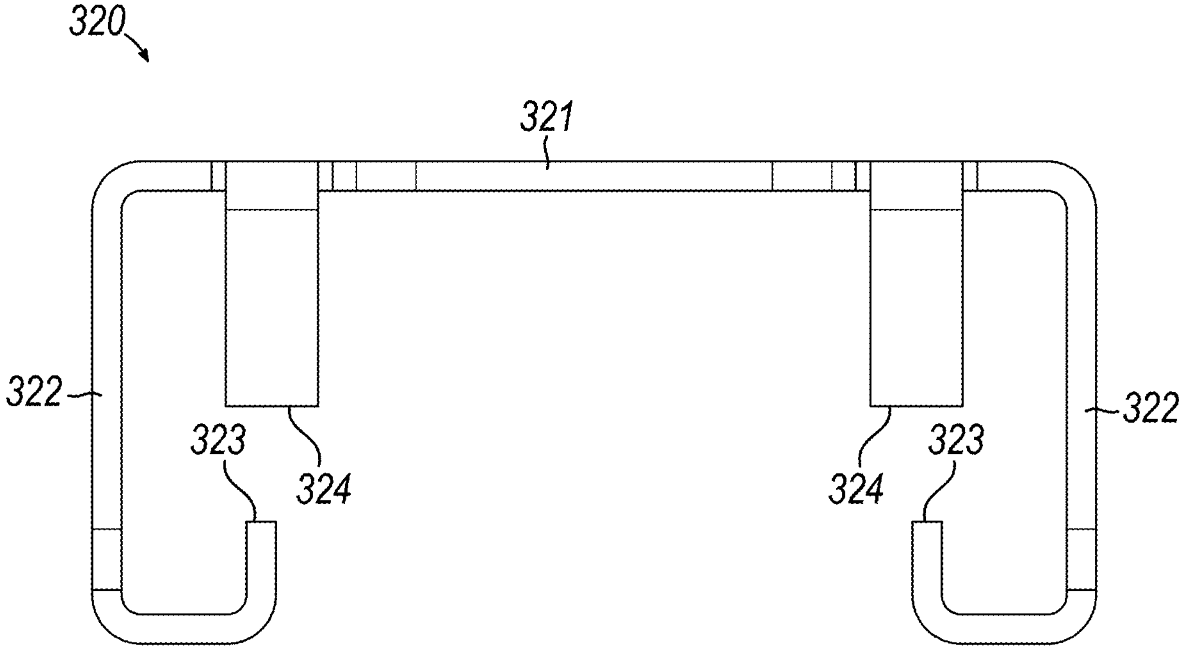
FIG. 46 depicts a top plan view of the security key of FIG. 45.

FIGS. 45 and 46 depict an example of a security key (320) that is configured for use with card holder (210). Security key (320) of the present example includes a front plate (321); a pair of arms (322) extending rearwardly from opposite sides of front plate (321); and a pair of fingers (323) extending laterally inwardly and forwardly from rear ends of respective arms (322). Fingers (323) are sized and configured to be simultaneously received within corresponding apertures (313) of back plate (271) for accessing the actuation surfaces (303) of the corresponding wings (302) of locking plate (276), such that fingers (323) are configured to slide locking plate (276) in a forward direction from the locked position toward the unlocked position in which slots (301*a*, 301*b*) release rails (245*a*, 245*b*) to permit rotation of head cartridge (216) from the active position to the inactive position. Front plate (321) may be configured to confront and/or engage the front surface of housing (270) while fingers (323) may be configured to generally wrap around a rear surface of back plate (271) and extend through the corresponding apertures (313) to simultaneously push the corresponding actuation surfaces (303) forward when security key (320) is engaged with card holder (210). In the example shown, security key (320) also includes a pair of tabs (324) extending rearwardly from an upper end of front plate (321). Tabs (324) may be sized and configured to confront and/or engage an upper surface of housing (270) when security key (320) is engaged with card holder (210).

Card holder (210) may be used in a manner similar to that described above in connection with FIGS. 32A-32D. When the merchandiser desires to load products (P) onto card holder (210), such as after depletion of products (P) from card holder (210), security key (320) may be engaged with card holder (210) while head cartridge (216) is initially in the active position to thereby slide locking plate (276) from the locked position to the unlocked position; and head cartridge (216) may then be rotated from the active position to the inactive position for enabling the merchandiser to load products (P) onto hanger (222). In some scenarios, security key (320) may be removed from card holder (210) after rotating head cartridge (216) out of the active position. In this regard, head cartridge (216) may not be capable of being locked in the inactive position as set forth above, such that removal of security key (320) from card holder (210) may not result in inadvertent locking of head cartridge (216) in the inactive position. Head cartridge (16) may then be rotated from the inactive position back to the active position to permit locking plate (76) to resiliently return to the locked position.

II. EXAMPLES OF COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus, comprising: (a) a hanger extending in a longitudinal direction to a front end, the hanger being configured to slidably support a plurality of products; (b) a bracket fixedly secured to the hanger; and (c) a head cartridge movably supported by the bracket such that the head cartridge is configured to move between an active position and an inactive position, the head cartridge including: (i) a gate configured to move between a product-blocking position and a product-releasing position when the head cartridge is in the active position to thereby adjust a throat defined between the gate and the front end of the hanger, wherein the throat is sized and configured to prevent any of the plurality of products from passing therethrough when the gate is in the product-blocking position, and wherein the throat is sized and configured to permit one of the plurality of products to pass therethrough when the gate is in the product-releasing position, and (ii) a lock configured to move between an unlocked position and a locked position, wherein the lock is configured to permit the head cartridge to move between the active and inactive positions when the lock is in the unlocked position, and wherein the lock is configured to prevent the head cartridge from moving between the active and inactive positions when the lock is in the locked position.

Example 2

The apparatus of Example 1, the head cartridge being in front of the front end of the hanger when the head cartridge is in the active position, the head cartridge being offset from the front end of the hanger when the head cartridge is in the inactive position.

Example 3

The apparatus of any of Examples 1 through 2, the head cartridge being configured to rotate about a rotation axis between the active position and the inactive position.

Example 4

The apparatus of Example 3, the rotation axis extending in the longitudinal direction.

Example 5

The apparatus of any of Examples 1 through 4, the gate being configured to pivot about a pivot axis between the product-blocking position and the product-releasing position.

Example 6

The apparatus of Example 5, the pivot axis extending in a lateral direction orthogonal to the longitudinal direction.

Example 7

The apparatus of any of Examples 1 through 6, the gate being resiliently biased toward the product-blocking position.

Example 8

The apparatus of any of Examples 1 through 7, the gate being configured to be cammingly engaged by the one of the plurality of products to thereby move the gate from the product-blocking position to the product-releasing position.

Example 9

The apparatus of any of Examples 1 through 8, one of the front end or the gate including one of a detent or an indent, the other of the front end or the gate including the other of a detent or an indent, the indent being configured to receive the detent when the gate is in the product-blocking position.

Example 10

The apparatus of any of Examples 1 through 9, the gate including a paddle.

Example 11

The apparatus of any of Examples 1 through 10, the lock being configured to translate in the longitudinal direction between the unlocked position and the locked position.

Example 12

The apparatus of any of Examples 1 through 11, the lock being resiliently biased toward the locked position.

Example 13

The apparatus of any of Examples 1 through 12, the lock being configured to move from the unlocked position to the locked position only when the head cartridge is in the active position.

Example 14

The apparatus of any of Examples 1 through 13, the lock including a locking plate.

Example 15

A system, comprising: (a) the apparatus of any of Examples 1 through 14; and (b) a key configured to move the lock from the locked position to the unlocked position.

Example 16

An apparatus, comprising: (a) a hanger extending in a longitudinal direction, the hanger being configured to slidably support a plurality of products; (b) a bracket fixedly secured to the hanger; and (c) a head cartridge rotatably supported by the bracket such that the head cartridge is configured to rotate about a rotation axis between an active position and an inactive position, the rotation axis extending in the longitudinal direction, the head cartridge including: (i) a paddle configured to pivot about a pivot axis between a product-blocking position and a product-releasing position when the head cartridge is in the active position, the pivot axis extending in a lateral direction orthogonal to the longitudinal direction, and (ii) a locking plate configured to translate in the longitudinal direction between an unlocked position and a locked position, wherein the locking plate is configured to permit the head cartridge to rotate between the active and inactive positions when the locking plate is in the unlocked position, and wherein the locking plate is configured to prevent the head cartridge from rotating between the active and inactive positions when the locking plate is in the locked position.

Example 17

The apparatus of Example 16, the paddle being resiliently biased toward the product-blocking position, the locking plate being resiliently biased toward the locked position.

Example 18

A system, comprising: (a) the apparatus of any of Examples 16 through 17; and (b) the plurality of products, the hanger slidably supporting the plurality of products.

Example 19

A method, comprising: (a) engaging a key with a head cartridge of a product holder, such that the key moves a lock of the head cartridge from a locked position in which the lock prevents movement of the head cartridge relative to a hanger of the product holder, to an unlocked position in which the lock permits movement of the head cartridge relative to the hanger; (b) moving the head cartridge relative to the hanger from an active position to an inactive position, wherein a movable gate of the head cartridge cooperates with an end of the hanger to define an adjustable throat when the head cartridge is in the active position; (c) loading a plurality of products onto the hanger; and (d) moving the head cartridge relative to the hanger from the inactive position to the active position.

Example 20

The method of Example 19, further comprising disengaging the key from the head cartridge, such that the lock moves from the unlocked position to the locked position after moving the head cartridge relative to the hanger from the inactive position to the active position.

III. MISCELLANEOUS

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. An apparatus, comprising:

(a) a hanger extending in a longitudinal direction to a front end, the hanger being configured to slidably support a plurality of products;

(b) a bracket fixedly secured to the hanger; and (c) a head cartridge movably supported by the bracket such that the head cartridge is configured to move between an active position and an inactive position, the head cartridge including:

(i) a gate configured to move between a product-blocking position and a product-releasing position when the head cartridge is in the active position to thereby adjust a throat defined between the gate and the front end of the hanger, wherein the throat is sized and configured to prevent any of the plurality of products from passing therethrough when the gate is in the product-blocking position, and wherein the throat is sized and configured to permit one of the plurality of products to pass therethrough when the gate is in the product-releasing position, and (ii) a lock configured to move between an unlocked position and a locked position, wherein the lock is configured to permit the head cartridge to move between the active and inactive positions when the lock is in the unlocked position, and wherein the lock is configured to prevent the head cartridge from moving between the active and inactive positions when the lock is in the locked position, the head cartridge being configured to rotate about a rotation axis between the active position and the inactive position.

2. The apparatus of claim 1, the head cartridge being in front of the front end of the hanger when the head cartridge is in the active position, the head cartridge being offset from the front end of the hanger when the head cartridge is in the inactive position.

3. The apparatus of claim 1, the rotation axis extending in the longitudinal direction.

4. The apparatus of claim 1, the gate being configured to pivot about a pivot axis between the product-blocking position and the product-releasing position.

5. The apparatus of claim 4, the pivot axis extending in a lateral direction orthogonal to the longitudinal direction.

6. The apparatus of claim 1, the gate being resiliently biased toward the product-blocking position.

7. The apparatus of claim 1, the gate being configured to be cammingly engaged by the one of the plurality of products to thereby move the gate from the product-blocking position to the product-releasing position.

8. An apparatus, comprising:

(a) a hanger extending in a longitudinal direction to a front end, the hanger being configured to slidably support a plurality of products;

(b) a bracket fixedly secured to the hanger; and (c) a head cartridge movably supported by the bracket such that the head cartridge is configured to move between an active position and an inactive position, the head cartridge including:

(i) a gate configured to move between a product-blocking position and a product-releasing position when the head cartridge is in the active position to thereby adjust a throat defined between the gate and the front end of the hanger, wherein the throat is sized and configured to prevent any of the plurality of products from passing therethrough when the gate is in the product-blocking position, and wherein the throat is sized and configured to permit one of the plurality of products to pass therethrough when the gate is in the product-releasing position, and (ii) a lock configured to move between an unlocked position and a locked position, wherein the lock is configured to permit the head cartridge to move between the active and inactive positions when the lock is in the unlocked position, and wherein the lock is configured to prevent the head cartridge from moving between the active and inactive positions when the lock is in the locked position, one of the front end or the gate including one of a detent or an indent, the other of the front end or the gate including the other of a detent or an indent, the indent being configured to receive the detent when the gate is in the product-blocking position.

9. The apparatus of claim 1, the gate including a paddle.

10. An apparatus, comprising:

(a) a hanger extending in a longitudinal direction to a front end, the hanger being configured to slidably support a plurality of products;

(b) a bracket fixedly secured to the hanger; and (c) a head cartridge movably supported by the bracket such that the head cartridge is configured to move between an active position and an inactive position, the head cartridge including:

(i) a gate configured to move between a product-blocking position and a product-releasing position when the head cartridge is in the active position to thereby adjust a throat defined between the gate and the front end of the hanger, wherein the throat is sized and configured to prevent any of the plurality of products from passing therethrough when the gate is in the product-blocking position, and wherein the throat is sized and configured to permit one of the plurality of products to pass therethrough when the gate is in the product-releasing position, and (ii) a lock configured to move between an unlocked position and a locked position, wherein the lock is configured to permit the head cartridge to move between the active and inactive positions when the lock is in the unlocked position, and wherein the lock is configured to prevent the head cartridge from moving between the active and inactive positions when the lock is in the locked position, the lock being configured to translate in the longitudinal direction between the unlocked position and the locked position.

11. An apparatus, comprising:

(a) a hanger extending in a longitudinal direction to a front end, the hanger being configured to slidably support a plurality of products;

(b) a bracket fixedly secured to the hanger; and (c) a head cartridge movably supported by the bracket such that the head cartridge is configured to move between an active position and an inactive position, the head cartridge including:

(i) a gate configured to move between a product-blocking position and a product-releasing position when the head cartridge is in the active position to thereby adjust a throat defined between the gate and the front end of the hanger, wherein the throat is sized and configured to prevent any of the plurality of products from passing therethrough when the gate is in the product-blocking position, and wherein the throat is sized and configured to permit one of the plurality of products to pass therethrough when the gate is in the product-releasing position, and (ii) a lock configured to move between an unlocked position and a locked position, wherein the lock is configured to permit the head cartridge to move between the active and inactive positions when the lock is in the unlocked position, and wherein the lock is configured to prevent the head cartridge from moving between the active and inactive positions when the lock is in the locked position, the lock being resiliently biased toward the locked position.

12. An apparatus, comprising:

(a) a hanger extending in a longitudinal direction to a front end, the hanger being configured to slidably support a plurality of products;

(b) a bracket fixedly secured to the hanger; and (c) a head cartridge movably supported by the bracket such that the head cartridge is configured to move between an active position and an inactive position, the head cartridge including:

(i) a gate configured to move between a product-blocking position and a product-releasing position when the head cartridge is in the active position to thereby adjust a throat defined between the gate and the front end of the hanger, wherein the throat is sized and configured to prevent any of the plurality of products from passing therethrough when the gate is in the product-blocking position, and wherein the throat is sized and configured to permit one of the plurality of products to pass therethrough when the gate is in the product-releasing position, and (ii) a lock configured to move between an unlocked position and a locked position, wherein the lock is configured to permit the head cartridge to move between the active and inactive positions when the lock is in the unlocked position, and wherein the lock is configured to prevent the head cartridge from moving between the active and inactive positions when the lock is in the locked position, the lock being configured to move from the unlocked position to the locked position only when the head cartridge is in the active position.

13. The apparatus of claim 1, the lock including a locking plate.

14. A system, comprising:

(a) the apparatus of claim 1; and (b) a key configured to move the lock from the locked position to the unlocked position.

15. An apparatus, comprising:

(a) a hanger extending in a longitudinal direction, the hanger being configured to slidably support a plurality of products;

(b) a bracket fixedly secured to the hanger; and (c) a head cartridge rotatably supported by the bracket such that the head cartridge is configured to rotate about a rotation axis between an active position and an inactive position, the rotation axis extending in the longitudinal direction, the head cartridge including:

(i) a paddle configured to pivot about a pivot axis between a product-blocking position and a product-releasing position when the head cartridge is in the active position, the pivot axis extending in a lateral direction orthogonal to the longitudinal direction, and (ii) a locking plate configured to translate in the longitudinal direction between an unlocked position and a locked position, wherein the locking plate is configured to permit the head cartridge to rotate between the active and inactive positions when the locking plate is in the unlocked position, and wherein the locking plate is configured to prevent the head cartridge from rotating between the active and inactive positions when the locking plate is in the locked position.

16. The apparatus of claim 15, the paddle being resiliently biased toward the product-blocking position, the locking plate being resiliently biased toward the locked position.

17. A system, comprising:

(a) the apparatus of claim 15; and (b) the plurality of products, the hanger slidably supporting the plurality of products.

* * * * *